(12) United States Patent
Gray et al.

(10) Patent No.: US 11,591,348 B2
(45) Date of Patent: Feb. 28, 2023

(54) ORGANOGOLD NONLINEAR OPTICAL CHROMOPHORES

(71) Applicant: CASE WESTERN RESERVE UNIVERSITY, Cleveland, OH (US)

(72) Inventors: Thomas G. Gray, Cleveland, OH (US); Joseph J. Mihaly, Youngstown, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 327 days.

(21) Appl. No.: 17/006,173

(22) Filed: Aug. 28, 2020

(65) Prior Publication Data

US 2021/0061819 A1    Mar. 4, 2021

Related U.S. Application Data

(60) Provisional application No. 62/892,974, filed on Aug. 28, 2019.

(51) Int. Cl.
*C07F 1/12* (2006.01)
*C09K 11/07* (2006.01)

(52) U.S. Cl.
CPC ............... *C07F 1/12* (2013.01); *C09K 11/07* (2013.01); *C09K 2211/1037* (2013.01); *C09K 2211/1044* (2013.01); *C09K 2211/1059* (2013.01)

(58) Field of Classification Search
CPC ....................................................... C07F 1/12
See application file for complete search history.

(56) References Cited

U.S. PATENT DOCUMENTS

| | | | |
|---|---|---|---|
| 6,686,143 | B1 | 2/2004 | Lok et al. |
| 9,944,627 | B2 | 4/2018 | Wong et al. |
| 9,972,791 | B2 | 5/2018 | Buchwald et al. |
| 10,141,513 | B2 | 11/2018 | Ikehira et al. |
| 2020/0224090 | A1 | 7/2020 | Tang et al. |

OTHER PUBLICATIONS

Stenger-Smith et al. "Cationic Au(I) complexes with aryl-benzothiazoles and their antimicrobial activity" Journal of Inorganic Biochemistry, 185, 2018, 80-85. (Year: 2018).*

* cited by examiner

*Primary Examiner* — Peter F Godenschwager
(74) *Attorney, Agent, or Firm* — Tarolli, Sundheim, Covell & Tummino LLP

(57) ABSTRACT

An organogold nonlinear optical chromophore includes gold (I) complexed with a benzothiazolyl-substituted fluorophore and optionally an organophosphine ligand or an N-heterocyclic carbene ligand.

18 Claims, 16 Drawing Sheets

(a)

(b)

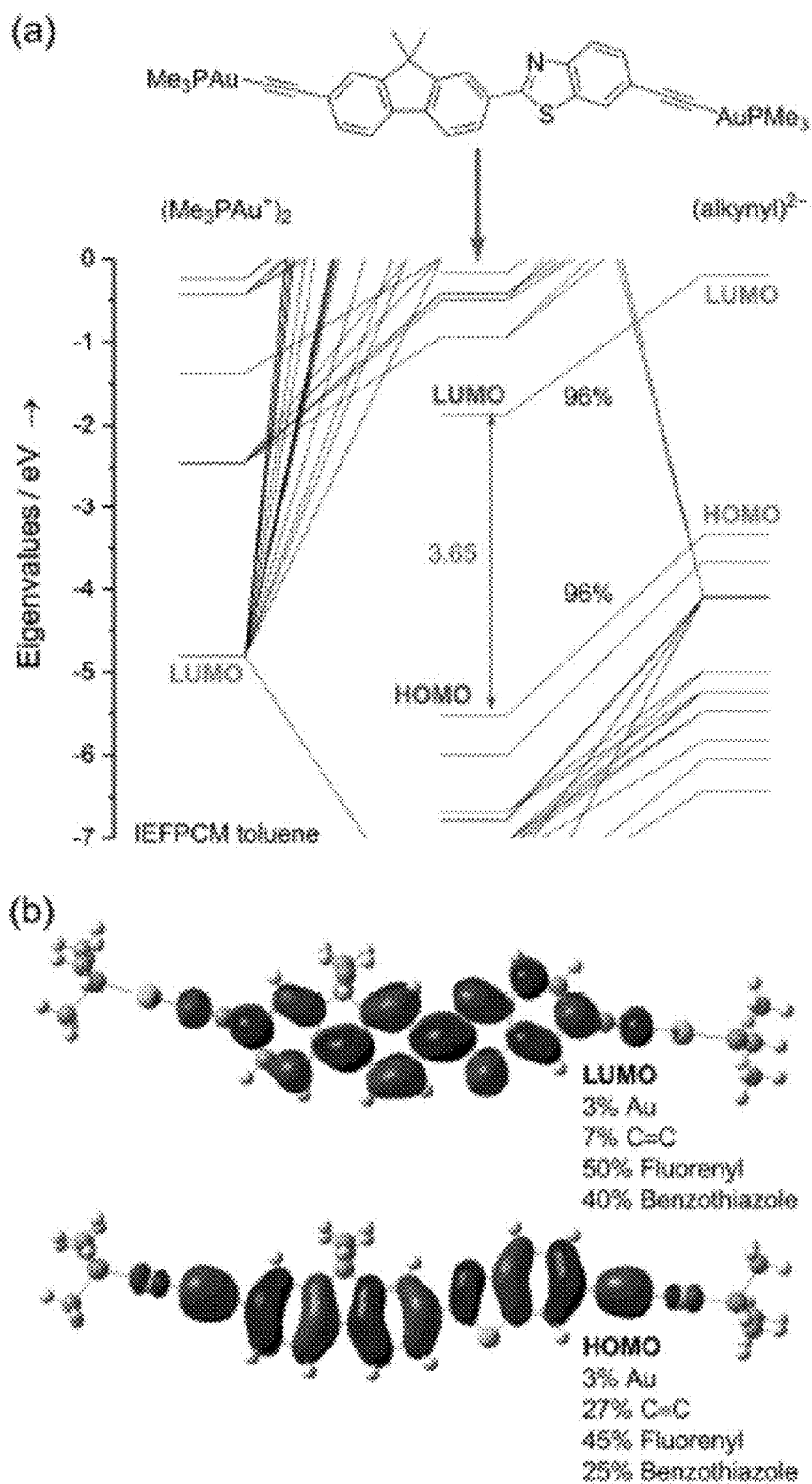
Figs. 15A-B

ORGANOGOLD NONLINEAR OPTICAL CHROMOPHORES

RELATED APPLICATION

This application claims priority from U.S. Provisional Application No. 62/892,974, filed Aug. 28, 2019, the subject matter of which is incorporated herein by reference in its entirety.

GOVERNMENT FUNDING

This invention was made with government support under Grant No. FA9550-18-1-0247 awarded by the Department of Defense. The United States government has certain rights in the invention.

BACKGROUND

Late d-block σ-organometallics have received sustained attention for excited-state properties that come about, in part, through the heavy-atom effect. When a heavy metal is covalently embedded in a conjugated organic chromophore, long-lived triplet excited states can be populated owing to the metal's spin-orbit coupling. The resulting complexes are phosphorescence emitters, often with radiative lifetimes in the microsecond range near 200 K. Potential applications include oxygen sensing, photodynamic therapy, solar energy harvesting, light-emitting diode construction, low-power upconversion, and nonlinear optics. More specifically, organometallic complexes have been extensively researched as chromophores for organic light-emitting diodes (OLEDs) both as colored displays and white light emitting materials for use in solid-state lighting technology (WOLEDs). Currently, two techniques are applied to generate white light and both are multicomponent: The first is a combination of red, green, and blue emission and the second employs use of complimentary emission, such as blue and orange. This leads to an often-complicated device fabrication/doping process to produce white light.

Several studies have emerged in an effort to realize single-component coordination compounds that emit white light both in solution and the solid state. The pursuit for such compounds has spanned from transition metal small molecules to heavy metal containing polymers. Much work on this problem has focused on platinum(II) and iridium(III) species.

A true single-component white emitter has been realized from two different iridium(III) based polymeric systems. Both systems were achieved by a combination of incorporating red, blue, and green emitting chromophores into the same polymeric backbone as well as combining singlet and triplet emitting chromophores to span the visible region. Both polymers demonstrated white emission through both photoluminescence and electroluminescence.

Platinum(II) compounds have also been achieved as a single-component white emitter. A variety of platinum(II) alkynyl compounds have been synthesized that demonstrated white light emission through combining monomeric and eximeric states to produce high energy blue and lower energy orange emission simultaneously in poly(methyl methacrylate) (PMMA) matrix.

Gold(I) and gold(III) complexes, though understudied, have also been explored. A trinuclear gold(I) cluster that achieved white light emission by regulating aggregation has been synthesized. The emission color could be tuned ultimately from monomer excimer equilibria where the excimer formation is facilitated by aurophilic interactions. Four gold(III) aryl complexes have also been synthesized, where three are white light emitters by CIE 1931 coordinates in dichloromethane solution and somewhat less so in PMMA films. White light emission can be achieved through controlling the amount of combined blue fluorescence and orange phosphoresce to yield emission covering the visible spectrum and therefore attaining white light.

SUMMARY

Embodiments described herein relate to organogold nonlinear optical chromophores and to their use in, for example, nonlinear optics, imaging agents, optical data storage, oxygen sensing, photodynamic therapy, solar energy harvesting, light emitting diode construction, and low-power up conversion. Advantageously, gold has one of the highest spin-orbit coupling of any d-block element. Gold(I) organometalics are more transparent to visible light than platinum analogues because of an absence of metal-ligand charge transitions. Gold is stable in multiple oxidation states and offers varied binding geometries. Multiple gold centers can be bound to the same chromophore without steric crowding. Binding a single gold atom to an organic chromophore promotes efficient population of triplet excited states.

In some embodiments, the organogold nonlinear optical chromophore can include gold(I) complexed with a fluorescent nonlinear optical dye. The fluorescent nonlinear optical dye can include a benzothiazolyl-substituted fluorophore. The benzothiazolyl-substituted fluorophore can be bound to the gold(I) through a gold-carbon σ-bond. The benzothiazolyl-substituted fluorophore can include, for example, a benzothiazole-fluorenyl moiety. The organogold nonlinear optical chromophore can also include an organophosphine ligand or an N-heterocyclic carbene ligand.

Attachment of gold to an organic fluorophore can generate dual (singlet and triplet) luminescence. Organophospine containing gold(I) complexes exhibit dual luminesce where the fluorescence and phosphorescence quantum yields are essentially equal, generating white light emission.

In some embodiments, the organogold nonlinear optical chromophore can include a compound having the following formula:

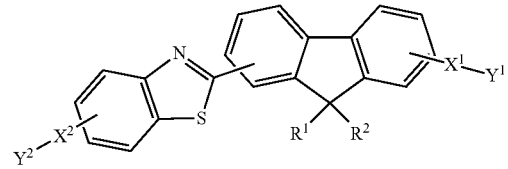

wherein:

$R^1$ and $R^2$ are each independently H, an alkyl, haloalkyl, cycloalkyl, alkylene-cycloalkyl, aryl, heteroaryl, alkylene-alkoxy, heterocyclyl, or alkylene-heterocyclyl;

$X^1$ and $X^2$ are each independently absent or a linker that includes an alkylene, alkenylene, or alkynylene group;

$Y^1$ and $Y^2$ are each independently absent or Au(I) linked to an organophosphine ligand or an N-heterocyclic carbene ligand; and at least one of $Y^1$ and $Y^2$ Au(I) linked to an organophosphine ligand or Au(I) linked to an N-heterocyclic carbene ligand.

In some embodiments, $R^1$ and $R^2$ are each independently a $C^1$-$C^6$ alkyl.

In other embodiments, $X^1$ and $X^2$ and $Y^2$ are absent and $Y^1$ is Au(I) linked to an organophosphine ligand or Au(I) linked to an N-heterocyclic carbene ligand.

In yet other embodiments, $X^1$ and $X^2$ each independently include an alkylene, alkenylene, or alkynylene group and $Y^1$ and $Y^2$ are each independently Au(I) linked to an organophosphine ligand or Au(I) linked to an N-heterocyclic carbene ligand.

In other embodiments, the compound can be selected from the group consisting of

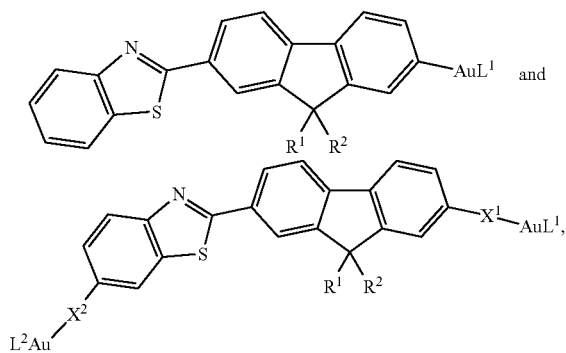

wherein, $R^1$ and $R^2$ are each independently H, an alkyl, haloalkyl, cycloalkyl, aryl, heteroaryl, alkylene-cycloalkyl, alkylene-alkoxy, heterocyclyl, or alkylene-heterocyclyl;

$X^1$ and $X^2$ are each independently a linker that includes an alkylene, alkenylene, or alkynylene group; and $L^1$ and $L^2$ are each independently an organophosphine ligand or an N-heterocyclic carbene ligand.

Other embodiments relate to a single molecule light emitter that exhibits non-excimeric state light emission, such as white light emission. The emitter can include gold(I) complexed with a benzothiazolyl-substituted fluorophore. The benzothiazolyl-substituted fluorophore can be bound to the gold(I) through a gold-carbon σ-bond. The benzothiazolyl-substituted fluorophore can include, for example, a benzothiazole-2,7-fluorenyl moiety. The complex can also include an organophosphine ligand or an N-heterocyclic carbene ligand bound to the gold(I).

BRIEF DESCRIPTION OF THE DRAWINGS

FIGS. 15(A-B) illustrate: (A) Frontier orbital energy diagram of model complex Au-DiBTF0'. (B) Kohn-Sham orbital plots (HOMO and LUMO). (Percentages are of electron density).

DETAILED DESCRIPTION

Figure 1:
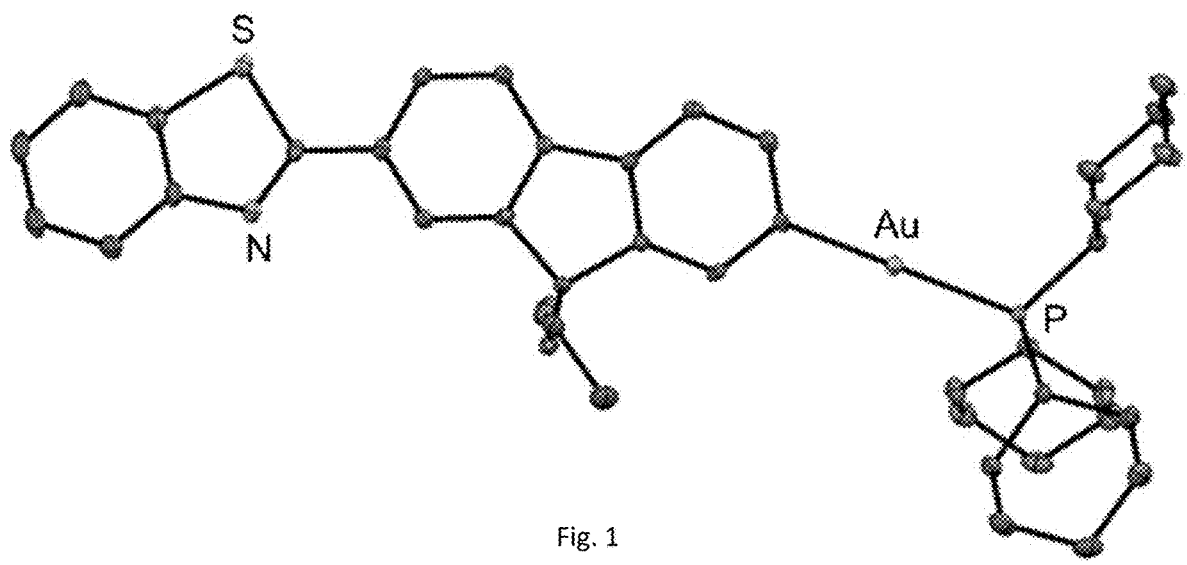
FIG. 1 illustrates thermal ellipsoid representation of AuBTF1 (50% probability level, 150 K). Hydrogen atoms are omitted for clarity. Unlabeled atoms are carbon.

While the following terms are believed to be well understood by one of ordinary skill in the art, the following definitions are set forth to facilitate explanation of the presently disclosed subject matter.

As used herein, the verb "comprise" as is used in this description and in the claims and its conjugations are used in its non-limiting sense to mean that items following the word are included, but items not specifically mentioned are not excluded. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

"Alkyl" or "alkyl group" refers to a fully saturated, straight or branched hydrocarbon chain radical having from one to twelve carbon atoms, and which is attached to the rest of the molecule by a single bond. Alkyls comprising any number of carbon atoms from 1 to 12 are included. An alkyl comprising up to 12 carbon atoms is a $C_1$-$C_{12}$ alkyl, an alkyl comprising up to 10 carbon atoms is a $C_1$-$C_{10}$ alkyl, an alkyl comprising up to 6 carbon atoms is a $C_1$-$C_6$ alkyl and an alkyl comprising up to 5 carbon atoms is a $C_1$-$C_5$ alkyl. A $C_1$-$C_5$ alkyl includes $C_5$ alkyls, $C_4$ alkyls, $C_3$ alkyls, $C_2$ alkyls and $C_1$ alkyl (i.e., methyl). A $C_1$-$C_6$ alkyl includes all moieties described above for $C_1$-$C_5$ alkyls but also includes $C_6$ alkyls. A $C_1$-$C_{10}$ alkyl includes all moieties described above for $C_1$-$C_5$ alkyls and $C_1$-$C_6$ alkyls, but also includes $C_7$, $C_8$, $C_9$ and $C_{10}$ alkyls. Similarly, a $C_1$-$C_{12}$ alkyl includes all the foregoing moieties, but also includes $C_{11}$ and $C_{12}$ alkyls. Non-limiting examples of $C_1$-$C_{12}$ alkyl include methyl, ethyl, n-propyl, i-propyl, sec-propyl, n-butyl, i-butyl, sec-butyl, t-butyl, n-pentyl, t-amyl, n-hexyl, n-heptyl, n-octyl, n-nonyl, n-decyl, n-undecyl, and n-dodecyl. Unless stated otherwise specifically in the specification, an alkyl group can be optionally substituted.

"Alkylene" or "alkylene chain" refers to a fully saturated, straight or branched divalent hydrocarbon chain radical, and having from one to twelve carbon atoms. Non-limiting examples of $C_1$-$C_{12}$ alkylene include methylene, ethylene, propylene, n-butylene, ethenylene, propenylene, n-butenylene, propynylene, n-butynylene, and the like. The alkylene chain is attached to the rest of the molecule through a single bond and to the radical group through a single bond. The points of attachment of the alkylene chain to the rest of the molecule and to the radical group can be through one carbon or any two carbons within the chain. Unless stated otherwise specifically in the specification, an alkylene chain can be optionally substituted.

"Alkenyl" or "alkenyl group" refers to a straight or branched hydrocarbon chain radical having from two to twelve carbon atoms, and having one or more carbon-carbon double bonds. Each alkenyl group is attached to the rest of the molecule by a single bond. Alkenyl group comprising any number of carbon atoms from 2 to 12 are included. An alkenyl group comprising up to 12 carbon atoms is a $C_2$-$C_{12}$ alkenyl, an alkenyl comprising up to 10 carbon atoms is a $C_2$-$C_{10}$ alkenyl, an alkenyl group comprising up to 6 carbon atoms is a $C_2$-$C_6$ alkenyl and an alkenyl comprising up to 5 carbon atoms is a $C_2$-$C_5$ alkenyl. A $C_2$-$C_5$ alkenyl includes $C_5$ alkenyls, $C_4$ alkenyls, $C_3$ alkenyls, and $C_2$ alkenyls. A $C_2$-$C_6$ alkenyl includes all moieties described above for $C_2$-$C_5$ alkenyls but also includes $C_6$ alkenyls. A $C_2$-$C_{10}$ alkenyl includes all moieties described above for $C_2$-$C_5$ alkenyls and $C_2$-$C_6$ alkenyls, but also includes $C_7$, $C_8$, $C_9$ and $C_{10}$ alkenyls. Similarly, a $C_2$-$C_{12}$ alkenyl includes all the foregoing moieties, but also includes $C_{11}$ and $C_{12}$ alkenyls. Non-limiting examples of $C_2$-$C_{12}$ alkenyl include ethenyl (vinyl), 1-propenyl, 2-propenyl (allyl), iso-propenyl, 2-methyl-1-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-nonenyl, 2-nonenyl, 3-nonenyl, 4-nonenyl, 5-nonenyl, 6-nonenyl, 7-nonenyl, 8-nonenyl, 1-decenyl, 2-decenyl, 3-decenyl, 4-decenyl, 5-decenyl, 6-decenyl, 7-decenyl, 8-decenyl, 9-decenyl, 1-undecenyl, 2-undecenyl, 3-undecenyl, 4-undecenyl, 5-undecenyl, 6-undecenyl, 7-undecenyl, 8-undecenyl, 9-undecenyl, 10-undecenyl, 1-dodecenyl, 2-dodecenyl, 3-dodecenyl, 4-dodecenyl, 5-dodecenyl, 6-dodecenyl, 7-dodecenyl, 8-dodecenyl, 9-dodecenyl, 10-dodecenyl, and 11-dodecenyl. Unless stated otherwise specifically in the specification, an alkyl group can be optionally substituted.

"Alkenylene" or "alkenylene chain" refers to a straight or branched divalent hydrocarbon chain radical, having from two to twelve carbon atoms, and having one or more carbon-carbon double bonds. Non-limiting examples of $C_2$-$C_{12}$ alkenylene include ethene, propene, butene, and the like. The alkenylene chain is attached to the rest of the molecule through a single bond and to the radical group through a single bond. The points of attachment of the alkenylene chain to the rest of the molecule and to the radical group can be through one carbon or any two carbons within the chain. Unless stated otherwise specifically in the specification, an alkenylene chain can be optionally substituted.

"Alkynyl" or "alkynyl group" refers to a straight or branched hydrocarbon chain radical having from two to twelve carbon atoms, and having one or more carbon-carbon triple bonds. Each alkynyl group is attached to the rest of the molecule by a single bond. Alkynyl group comprising any number of carbon atoms from 2 to 12 are included. An alkynyl group comprising up to 12 carbon atoms is a $C_2$-$C_{12}$ alkynyl, an alkynyl comprising up to 10 carbon atoms is a $C_2$-$C_{10}$ alkynyl, an alkynyl group comprising up to 6 carbon atoms is a $C_2$-$C_6$ alkynyl and an alkynyl comprising up to 5 carbon atoms is a $C_2$-$C_5$ alkynyl. A $C_2$-$C_5$ alkynyl includes $C_5$ alkynyls, $C_4$ alkynyls, $C_3$ alkynyls, and $C_2$ alkynyls. A $C_2$-$C_6$ alkynyl includes all moieties described above for $C_2$-$C_5$ alkynyls but also includes $C_6$ alkynyls. A $C_2$-$C_{10}$ alkynyl includes all moieties described above for $C_2$-$C_5$ alkynyls and $C_2$-$C_6$ alkynyls, but also includes $C_7$, $C_8$, $C_9$ and $C_{10}$ alkynyls. Similarly, a $C_2$-$C_{12}$ alkynyl includes all the foregoing moieties, but also includes $C_{11}$ and $C_{12}$ alkynyls. Non-limiting examples of $C_2$-$C_{12}$ alkenyl include ethynyl, propynyl, butynyl, pentynyl and the like. Unless stated otherwise specifically in the specification, an alkyl group can be optionally substituted.

"Alkynylene" or "alkynylene chain" refers to a straight or branched divalent hydrocarbon chain radical, having from two to twelve carbon atoms, and having one or more carbon-carbon triple bonds. Non-limiting examples of $C_2$-$C_{12}$ alkynylene include ethynylene, propargylene and the like. The alkynylene chain is attached to the rest of the molecule through a single bond and to the radical group through a single bond. The points of attachment of the alkynylene chain to the rest of the molecule and to the radical group can be through one carbon or any two carbons within the chain. Unless stated otherwise specifically in the specification, an alkynylene chain can be optionally substituted.

"Alkoxy" refers to a radical of the formula —OR$_a$ where R$_a$ is an alkyl, alkenyl or alknyl radical as defined above containing one to twelve carbon atoms. Unless stated otherwise specifically in the specification, an alkoxy group can be optionally substituted.

"Alkylamino" refers to a radical of the formula —NHR$_a$ or —NR$_a$R$_a$ where each R$_a$ is, independently, an alkyl, alkenyl or alkynyl radical as defined above containing one to twelve carbon atoms. Unless stated otherwise specifically in the specification, an alkylamino group can be optionally substituted.

"Alkylcarbonyl" refers to the —C(=O)R$_a$ moiety, wherein R$_a$ is an alkyl, alkenyl or alkynyl radical as defined above. A non-limiting example of an alkyl carbonyl is the methyl carbonyl ("acetal") moiety. Alkylcarbonyl groups can also be referred to as "C$_w$-C$_z$ acyl" where w and z depicts the range of the number of carbon in R$_a$, as defined above. For example, "C$_1$-C$_{10}$ acyl" refers to alkylcarbonyl group as defined above, where R$_a$ is C$_1$-C$_{10}$ alkyl, C$_2$-C$_{10}$ alkenyl, or C$_2$-C$_{10}$ alkynyl radical as defined above. Unless stated otherwise specifically in the specification, an alkyl carbonyl group can be optionally substituted.

"Aryl" refers to a hydrocarbon ring system radical comprising hydrogen, 6 to 18 carbon atoms and at least one aromatic ring. For purposes of this invention, the aryl radical can be a monocyclic, bicyclic, tricyclic or tetracyclic ring system, which can include fused or bridged ring systems. Aryl radicals include, but are not limited to, aryl radicals derived from phenyl (benzene), aceanthrylene, acenaphthylene, acephenanthrylene, anthracene, azulene, chrysene, fluoranthene, fluorene, as-indacene, s-indacene, indane, indene, naphthalene, phenalene, phenanthrene, pleiadene, pyrene, and triphenylene. Unless stated otherwise specifically in the specification, the term "aryl" is meant to include aryl radicals that are optionally substituted.

"Aralkyl" or "arylalkyl" refers to a radical of the formula —R$_b$-R$_c$ where R$_b$ is an alkylene group as defined above and R$_c$ is one or more aryl radicals as defined above. Aralkyl radicals include, but are not limited to, benzyl, diphenylmethyl and the like. Unless stated otherwise specifically in the specification, an aralkyl group can be optionally substituted.

"Aralkenyl" or "arylalkenyl" refers to a radical of the formula —R$_b$-R$_c$ where R$_b$ is an alkenylene group as defined above and R$_c$ is one or more aryl radicals as defined above. Unless stated otherwise specifically in the specification, an aralkenyl group can be optionally substituted.

"Aralkynyl" or "arylalkynyl" refers to a radical of the formula —R$_b$-R$_c$ where R$_b$ is an alkynylene group as defined above and R$_c$ is one or more aryl radicals as defined above. Unless stated otherwise specifically in the specification, an aralkynyl group can be optionally substituted.

"Carbocyclyl," "carbocyclic ring" or "carbocycle" refers to a ring structure, wherein the atoms which form the ring are each carbon. Carbocyclic rings can comprise from 3 to 20 carbon atoms in the ring. Carbocyclic rings include aryls and cycloalkyl. Cycloalkenyl and cycloalkynyl as defined herein. Unless stated otherwise specifically in the specification, a carbocyclyl group can be optionally substituted.

"Cycloalkyl" refers to a stable non-aromatic monocyclic or polycyclic fully saturated hydrocarbon radical consisting solely of carbon and hydrogen atoms, which can include fused, bridged, or spiral ring systems, having from three to twenty carbon atoms, preferably having from three to ten carbon atoms, and which is attached to the rest of the molecule by a single bond. Monocyclic cycloalkyl radicals include, for example, cyclopropyl, cyclobutyl, cyclopentyl, cyclohexyl, cycloheptyl, and cyclooctyl. Polycyclic cycloalkyl radicals include, for example, adamantyl, norbornyl, decalinyl, 7,7-dimethyl-bicyclo[2.2.1]heptanyl, and the like. Unless otherwise stated specifically in the specification, a cycloalkyl group can be optionally substituted.

"Cycloalkenyl" refers to a stable non-aromatic monocyclic or polycyclic hydrocarbon radical consisting solely of carbon and hydrogen atoms, having one or more carbon-carbon double bonds, which can include fused, bridged, or spiral ring systems, having from three to twenty carbon atoms, preferably having from three to ten carbon atoms, and which is attached to the rest of the molecule by a single bond. Monocyclic cycloalkenyl radicals include, for example, cyclopentenyl, cyclohexenyl, cycloheptenyl, cyclooctenyl, and the like. Polycyclic cycloalkenyl radicals include, for example, bicyclo[2.2.1]hept-2-enyl and the like. Unless otherwise stated specifically in the specification, a cycloalkenyl group can be optionally substituted.

"Cycloalkynyl" refers to a stable non-aromatic monocyclic or polycyclic hydrocarbon radical consisting solely of carbon and hydrogen atoms, having one or more carbon-carbon triple bonds, which can include fused, bridged, or spiral ring systems, having from three to twenty carbon atoms, preferably having from three to ten carbon atoms, and which is attached to the rest of the molecule by a single bond. Monocyclic cycloalkynyl radicals include, for example, cycloheptynyl, cyclooctynyl, and the like. Unless otherwise stated specifically in the specification, a cycloalkynyl group can be optionally substituted.

"Cycloalkylalkyl" refers to a radical of the formula —R$_b$-R$_d$ where R$_b$ is an alkylene, alkenylene, or alkynylene group as defined above and R$_d$ is a cycloalkyl, cycloalkenyl, cycloalkynyl radical as defined above. Unless stated otherwise specifically in the specification, a cycloalkylalkyl group can be optionally substituted.

"Haloalkyl" refers to an alkyl radical, as defined above, that is substituted by one or more halo radicals, as defined above, e.g., trifluoromethyl, difluoromethyl, trichloromethyl, 2,2,2-trifluoroethyl, 1,2-difluoroethyl, 3-bromo-2-fluoropropyl, 1,2-dibromoethyl, and the like. Unless stated otherwise specifically in the specification, a haloalkyl group can be optionally substituted.

"Haloalkenyl" refers to an alkenyl radical, as defined above, that is substituted by one or more halo radicals, as defined above, e.g., 1-fluoropropenyl, 1,1-difluorobutenyl, and the like. Unless stated otherwise specifically in the specification, a haloalkenyl group can be optionally substituted.

"Haloalkynyl" refers to an alkynyl radical, as defined above, that is substituted by one or more halo radicals, as defined above, e.g., 1-fluoropropynyl, 1-fluorobutynyl, and the like. Unless stated otherwise specifically in the specification, a haloalkynyl group can be optionally substituted.

"Heterocyclyl," "heterocyclic ring" or "heterocycle" refers to a stable 3- to 20-membered non-aromatic, partially aromatic, or aromatic ring radical which consists of two to twelve carbon atoms and from one to six heteroatoms selected from the group consisting of nitrogen, oxygen and sulfur. Heterocyclycl or heterocyclic rings include heteroaryls as defined below. Unless stated otherwise specifically in the specification, the heterocyclyl radical can be a monocyclic, bicyclic, tricyclic or tetracyclic ring system, which can include fused, bridged, and spiral ring systems; and the nitrogen, carbon or sulfur atoms in the heterocyclyl radical can be optionally oxidized; the nitrogen atom can be optionally quaternized; and the heterocyclyl radical can be partially or fully saturated. Examples of such heterocyclyl radicals include, but are not limited to, aziridinyl, oextanyl, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, 1,1-dioxo-thiomorpholinyl, pyridine-one, and the like. The point of attachment of the heterocyclyl, heterocyclic ring, or heterocycle to the rest of the molecule by a single bond is through a ring member atom, which can be carbon or nitrogen. Unless stated otherwise specifically in the specification, a heterocyclyl group can be optionally substituted.

"Heterocyclylalkyl" refers to a radical of the formula —$R_b$-$R_e$, where $R_b$ is an alkylene group as defined above and $R_e$ is a heterocyclyl radical as defined above. Unless stated otherwise specifically in the specification, a heterocyclylalkyl group can be optionally substituted.

"Heterocyclylalkenyl" refers to a radical of the formula —$R_b$-$R_e$, where $R_b$ is an alkenylene group as defined above and $R_e$ is a heterocyclyl radical as defined above. Unless stated otherwise specifically in the specification, a heterocyclylalkenyl group can be optionally substituted.

"Heterocyclylalkynyl" refers to a radical of the formula —$R_b$-$R_e$, where $R_b$ is an alkynylene group as defined above and $R_e$ is a heterocyclyl radical as defined above. Unless stated otherwise specifically in the specification, a heterocyclylalkynyl group can be optionally substituted.

"N-heterocyclyl" refers to a heterocyclyl radical as defined above containing at least one nitrogen and where the point of attachment of the heterocyclyl radical to the rest of the molecule is through a nitrogen atom in the heterocyclyl radical. Unless stated otherwise specifically in the specification, a N-heterocyclyl group can be optionally substituted.

"Heteroaryl" refers to a 5- to 20-membered ring system radical one to thirteen carbon atoms and one to six heteroatoms selected from the group consisting of nitrogen, oxygen and sulfur, as the ring member. For purposes of this invention, the heteroaryl radical can be a monocyclic, bicyclic, tricyclic or tetracyclic ring system, which can include fused or bridged ring systems, wherein at least one ring containing a heteroatom ring member is aromatic. The nitrogen, carbon or sulfur atoms in the heteroaryl radical can be optionally oxidized and the nitrogen atom can be optionally quaternized. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, pyrazolopyridine, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e., thienyl). Unless stated otherwise specifically in the specification, a heteroaryl group can be optionally substituted.

"N-heteroaryl" refers to a heteroaryl radical as defined above containing at least one nitrogen and where the point of attachment of the heteroaryl radical to the rest of the molecule is through a nitrogen atom in the heteroaryl radical. Unless stated otherwise specifically in the specification, an N-heteroaryl group can be optionally substituted.

"Heteroarylalkyl" refers to a radical of the formula —$R_b$-$R_f$ where $R_b$ is an alkylene chain as defined above and $R_f$ is a heteroaryl radical as defined above. Unless stated otherwise specifically in the specification, a heteroarylalkyl group can be optionally substituted.

"Heteroarylalkenyl" refers to a radical of the formula —$R_b$-$R_f$ where $R_b$ is an alkenylene, chain as defined above and $R_f$ is a heteroaryl radical as defined above. Unless stated otherwise specifically in the specification, a heteroarylalkenyl group can be optionally substituted.

"Heteroarylalkynyl" refers to a radical of the formula —$R_b$-$R_f$ where $R_b$ is an alkynylene chain as defined above and $R_f$ is a heteroaryl radical as defined above. Unless stated otherwise specifically in the specification, a heteroarylalkynyl group can be optionally substituted.

"Thioalkyl" refers to a radical of the formula —$SR_a$ where $R_a$ is an alkyl, alkenyl, or alkynyl radical as defined above containing one to twelve carbon atoms. Unless stated otherwise specifically in the specification, a thioalkyl group can be optionally substituted.

The term "substituted" used herein means any of the above groups (e.g., alkyl, alkylene, alkenyl, alkenylene, alkynyl, alkynylene, alkoxy, alkylamino, alkylcarbonyl, thioalkyl, aryl, aralkyl, carbocyclyl, cycloalkyl, cycloalkenyl, cycloalkynyl, cycloalkylalkyl, haloalkyl, heterocyclyl, N-heterocyclyl, heterocyclylalkyl, heteroaryl, N-heteroaryl, heteroarylalkyl, heteroarylalkenyl, heteroarylalkynyl, etc.) wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom, such as oxygen in oxo, carbonyl, carboxyl, and ester groups; and nitrogen in groups such as imines, oximes, hydrazones, and nitriles.

For example, "substituted" includes any of the above groups in which one or more hydrogen atoms are replaced with —$NR_gR_h$, —$NR_gC(=O)R_h$, —$NR_gC(=O)NR_gR_h$, —$NR_gC(=O)OR_h$, —$NR_gSO_2R_h$, —$OC(=O)NR_gR_h$, —$OR_g$, —$SR_g$, —$SOR_g$, —$SO_2R_g$, —$OSO_2R_g$, —$SO_2OR_g$, =$NSO_2R_g$, and —$SO_2NR_gR_h$. "Substituted" also means any of the above groups in which one or more hydrogen atoms are replaced with —$C(=O)R_g$, —$C(=O)OR_g$, —$C(=O)NR_gR_h$, —$CH_2SO_2R_g$, —$CH_2SO_2NR_gR_h$. In the foregoing, $R_g$ and $R_h$ are the same or different and independently hydrogen, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, cyano, hydroxyl, imino, nitro, oxo, thioxo, halo, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl group. In addition, each of the foregoing substituents can also be optionally substituted with one or more of the above substituents.

As used herein, the symbol

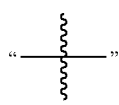

(hereinafter can be referred to as "a point of attachment bond") denotes a bond that is a point of attachment between two chemical entities, one of which is depicted as being attached to the point of attachment bond and the other of which is not depicted as being attached to the point of attachment bond. For example,

indicates that the chemical entity "A" is bonded to another chemical entity via the point of attachment bond. Furthermore, the specific point of attachment to the non-depicted chemical entity can be specified by inference. For example, the compound

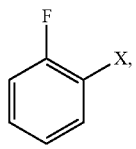

wherein X is

infers that the point of attachment bond is the bond by which X is depicted as being attached to the phenyl ring at the ortho position relative to fluorine.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

Throughout the description, where compositions are described as having, including, or comprising, specific components, it is contemplated that compositions also consist essentially of, or consist of, the recited components. Similarly, where methods or processes are described as having, including, or comprising specific process steps, the processes also consist essentially of, or consist of, the recited processing steps. Further, it should be understood that the order of steps or order for performing certain actions is immaterial so long as the compositions and methods described herein remains operable. Moreover, two or more steps or actions can be conducted simultaneously.

Embodiments described herein relate to organogold nonlinear optical chromophores and to their use in, for example, nonlinear optics, imaging agents, optical data storage, oxygen sensing, photodynamic therapy, solar energy harvesting, light emitting diode construction, and low-power up conversion. Advantageously, gold has one of the highest spin-orbit coupling of any d-block element. Gold(I) organometallics are more transparent to visible light than platinum analogues because of an absence of metal-ligand charge transitions. Gold is stable in multiple oxidation states and offers a varied binding geometries. Multiple gold centers can be bound to the same chromophore without steric crowding. Binding a single gold atom to an organic chromophore promotes efficient population of triplet excited states.

In some embodiments, the organogold nonlinear optical chromophore can include gold(I) complexed with a fluorescent nonlinear optical dye. The fluorescent nonlinear optical dye can include a benzothiazolyl-substituted fluorophore. The benzothiazolyl-substituted fluorophore can be bound to the gold(I) through a gold-carbon σ-bond. The benzothiazolyl-substituted fluorophore can include, for example, a benzothiazole-2,7-fluorenyl moiety. The organogold nonlinear optical chromophore can also include an organophosphine ligand or an N-heterocyclic carbene ligand.

Attachment of a single gold center to an organic fluorophore can generate dual (singlet and triplet) luminescence. Organophospine containing gold(I) complexes exhibit dual luminesce where the fluorescence and phosphorescence quantum yields are essentially equal, generating white light emission.

In some embodiments, the organogold nonlinear optical chromophore can include having the following formula:

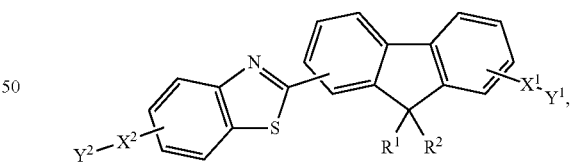

wherein:

$R^1$ and $R^2$ are each independently H, an alkyl, haloalkyl, cycloalkyl, alkylene-cycloalkyl, aryl, heteroaryl, alkylene-alkoxy, heterocyclyl, or alkylene-heterocyclyl;

$X^1$ and $X^2$ are each independently absent or a linker that includes an alkylene, alkenylene, or alkynylene group;

$Y^1$ and $Y^2$ are each independently absent or Au(I) linked to an organophosphine ligand or an N-heterocyclic carbene ligand; and at least one of $Y^1$ and $Y^2$ Au(I) linked to an organophosphine ligand or Au(I) linked to an N-heterocyclic carbene ligand.

In some embodiments, $R^1$ and $R^2$ are a $C^1$-$C^6$ alkyl, such as a methyl, ethyl, propyl, butyl, pentyl, or hexyl group.

In other embodiments, $R^1$ and $R^2$ are the same.

In other embodiments, $X^1$ and $X^2$ and $Y^2$ are each independently absent and $Y^1$ is Au(I) linked to an organophosphine ligand or Au(I) linked to an N-heterocyclic carbene ligand.

In yet other embodiments, $X^1$ and $X^2$ each independently include an alkylene, alkenylene, or alkynylene group and $Y^1$ and $Y^2$ are each independently Au(I) linked to an organophosphine ligand or Au(I) linked to an N-heterocyclic carbene ligand.

In other embodiments, $X^1$ and $X^2$ are each independently an alkynylene or a substituted or unsubstituted triazolylene.

In some embodiments, the organophosphine ligand has the formula —P($R^3$)$_3$, wherein $R^3$ is an alkyl, haloalkyl, cycloalkyl, aryl, heterocyclyl, heteroaryl each of which is optionally substituted with one or more $R^4$. $R^4$ is oxo, halogen, —CN, —N($R^5$)$_2$, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with $R^5$. $R^5$ is halogen, alkyl, or alkoxy.

In other embodiments, $R^3$ is a methyl (Me), ethyl, isopropyl (i-Pr), butyl, cyclohexyl (Cy), or phenyl (Ph), each of which is optionally substituted with a halogen, alkyl, or alkoxy.

In some embodiments, the N-heterocyclic carbene ligand has the following formula:

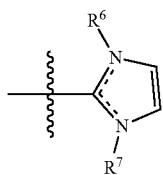

wherein $R^6$ and $R^7$ are each independently an alkyl, haloalkyl, cycloalkyl, aryl, heterocyclyl, heteroaryl each of which is optionally substituted with one or more $R^8$. $R^8$ is oxo, halogen, —CN, —N($R^5$)$_2$, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with $R^9$. $R^9$ is halogen, alkyl, or alkoxy.

In some embodiments, $R^6$ and $R^7$ are the same.

In other embodiments, the organogold nonlinear optical chromophore can include a compound having the following formula:

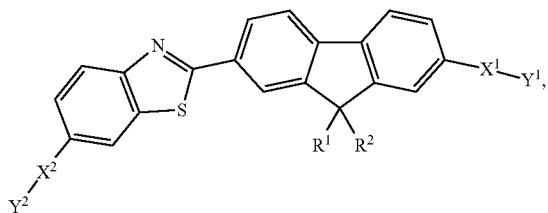

wherein:
$R^1$ and $R^2$ are each independently H, an alkyl, haloalkyl, cycloalkyl, aryl, heteroaryl, alkylene-cycloalkyl, alkylene-alkoxy, heterocyclyl, or alkylene-heterocyclyl;

$X^1$ and $X^2$ are each independently absent or a linker that includes an alkylene, alkenylene, or alkynylene group;

$Y^1$ and $Y^2$ are each independently absent or Au(I) linked to an organophosphine ligand or an N-heterocyclic carbene ligand; and at least one of $Y^1$ and $Y^2$ Au(I) linked to an organophosphine ligand or Au(I) linked to an N-heterocyclic carbene ligand.

In some embodiments, $R^1$ and $R^2$ are a $C^1$-$C^6$ alkyl, such as a methyl, ethyl, propyl, butyl, pentyl, or hexyl group.

In other embodiments, $R^1$ and $R^2$ are the same.

In other embodiments, $X^1$ and $X^2$ and $Y^2$ are absent and $Y^1$ is Au(I) linked to an organophosphine ligand or Au(I) linked to an N-heterocyclic carbene ligand.

In yet other embodiments, $X^1$ and $X^2$ each independently include an alkylene, alkenylene, or alkynylene group and $Y^1$ and $Y^2$ are each independently Au(I) linked to an organophosphine ligand or Au(I) linked to an N-heterocyclic carbene ligand.

In other embodiments, $X^1$ and $X^2$ are each independently an alkynylene or a substituted or unsubstituted triazolylene.

In some embodiments, the organophosphine ligand has the formula —P($R^3$)$_3$, wherein $R^3$ is an alkyl, haloalkyl, cycloalkyl, aryl, heterocyclyl, heteroaryl each of which is optionally substituted with one or more $R^4$. $R^4$ is oxo, halogen, —CN, —N($R^5$)$_2$, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with $R^5$. $R^5$ is halogen, alkyl, or alkoxy.

In other embodiments, $R^3$ is a methyl (Me), ethyl, isopropyl (i-Pr), butyl, cyclohexyl (Cy), or phenyl (Ph), each of which is optionally substituted with a halogen, alkyl, or alkoxy.

In some embodiments, the N-heterocyclic carbene ligand has the following formula:

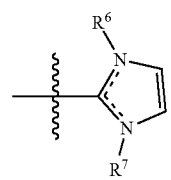

wherein $R^6$ and $R^7$ are each independently an alkyl, haloalkyl, cycloalkyl, aryl, heterocyclyl, heteroaryl each of which is optionally substituted with one or more $R^8$. $R^8$ is oxo, halogen, —CN, —N($R^5$)$_2$, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with $R^9$. $R^9$ is halogen, alkyl, or alkoxy.

In some embodiments, $R^6$ and $R^7$ are the same.

In other embodiments, the compound can be selected from the group consisting of

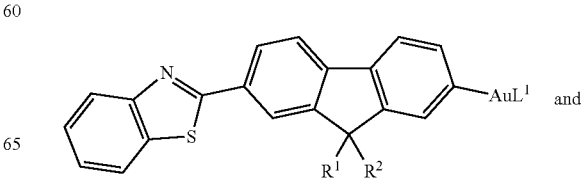

and

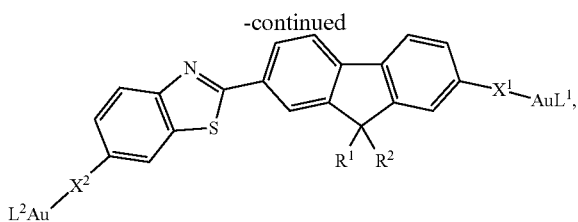

wherein,

R¹ and R² are each independently H, an alkyl, haloalkyl, cycloalkyl, alkylene-cycloalkyl, aryl, heteroaryl, alkylene-alkoxy, heterocyclyl, or alkylene-heterocyclyl;

X¹ and X² are each independently a linker that includes an alkylene, alkenylene, or alkynylene group; and L¹ and L² are each independently an organophosphine ligand or an N-heterocyclic carbene ligand.

In some embodiments, the organophosphine ligand has the formula —P(R³)₃, wherein R³ is an alkyl, haloalkyl, cycloalkyl, aryl, heterocyclyl, heteroaryl each of which is optionally substituted with one or more R⁴. R⁴ is oxo, halogen, —CN, —N(R⁵)₂, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with R⁵. R⁵ is halogen, alkyl, or alkoxy.

In other embodiments, R³ is a methyl (Me), ethyl, isopropyl (i-Pr), butyl, cyclohexyl (Cy), or phenyl (Ph), each of which is optionally substituted with a halogen, alkyl, or alkoxy.

In some embodiments, the N-heterocyclic carbene ligand has the following formula:

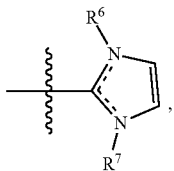

wherein R⁶ and R⁷ are each independently an alkyl, haloalkyl, cycloalkyl, aryl, heterocyclyl, heteroaryl each of which is optionally substituted with one or more R⁸. R⁸ is oxo, halogen, —CN, —N(R⁵)₂, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with R⁹. R⁹ is halogen, alkyl, or alkoxy.

In some embodiments, R¹ and R² are a C¹-C⁶ alkyl, such as a methyl, ethyl, propyl, butyl, pentyl, or hexyl group.

In other embodiments, R¹ and R² are the same.

In some embodiments, R⁶ and R⁷ are the same.

In other embodiments, the compound can be selected from the group consisting of

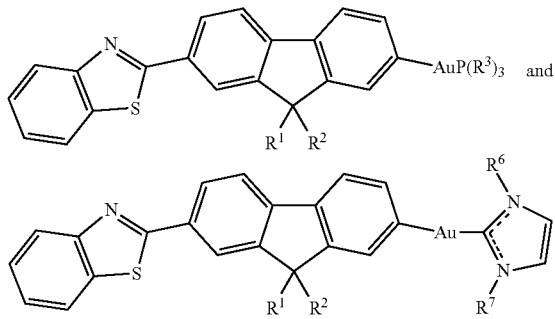

wherein,

R¹ and R² are each independently H, an alkyl, haloalkyl, cycloalkyl, aryl, heterocryl, alkylene-cycloalkyl, alkylene-alkoxy, heterocyclyl, or alkylene-heterocyclyl;

R³ is an alkyl, haloalkyl, cycloalkyl, aryl, heterocyclyl, heteroaryl each of which is optionally substituted with one or more R⁴;

R⁴ is oxo, halogen, —CN, —N(R⁵)₂, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with R⁵;

R⁵ is halogen, alkyl, or alkoxy.

R⁶ and R⁷ are each independently an alkyl, haloalkyl, cycloalkyl, aryl, heterocyclyl, heteroaryl each of which is optionally substituted with one or more R⁸;

R⁸ is oxo, halogen, —CN, —N(R⁵)₂, —OH, —O-alkylene-OH, —S(O)$_m$-alkyl, —C(O)-alkyl, —C(O)-cycloalkyl, alkyl, -alkylene-O-alkyl, alkoxy, haloalkyl, cycloalkyl, heterocyclyl, or -alkylene-aryl optionally substituted with R⁹;

and R⁹ is halogen, alkyl, or alkoxy.

In some embodiments, R¹ and R² are a C¹-C⁶ alkyl, such as a methyl, ethyl, propyl, butyl, pentyl, or hexyl group.

In other embodiments, R¹ and R² are the same.

In some embodiments, R⁶ and R⁷ are the same.

In other embodiments, R³ is a methyl (Me), ethyl, isopropyl (i-Pr), butyl, cyclohexyl (Cy), or phenyl (Ph), each of which is optionally substituted with a halogen, alkyl, or alkoxy.

In other embodiments, the compound can be selected from the group consisting of:

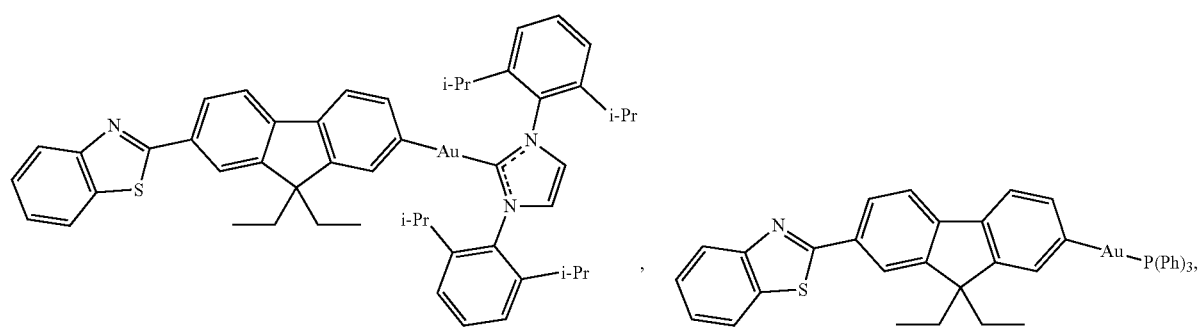

-continued
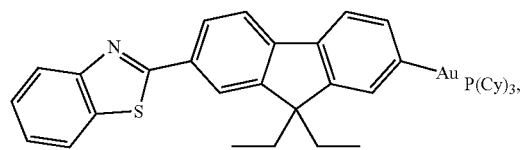
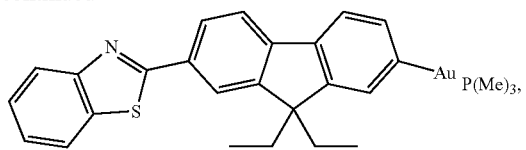
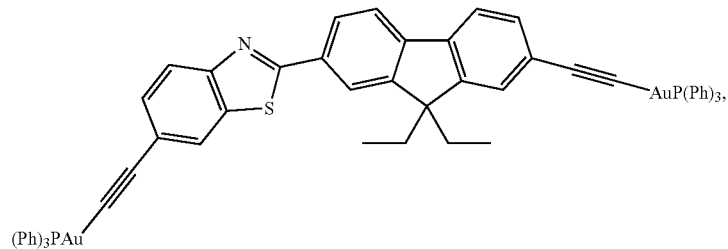
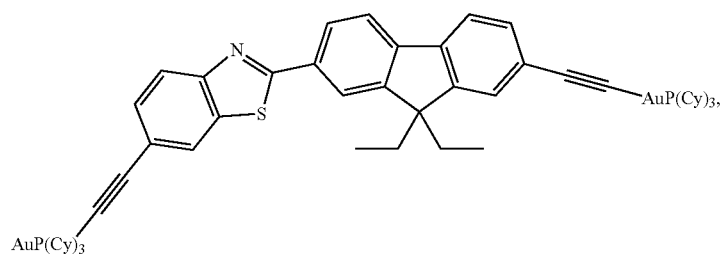
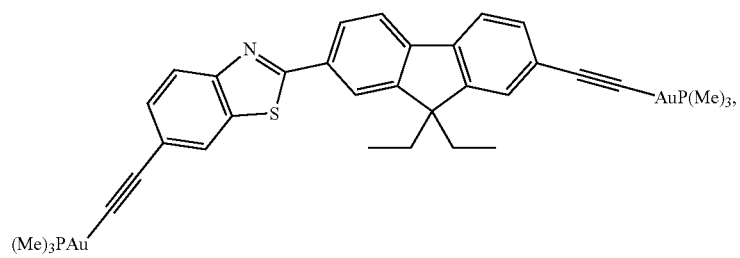
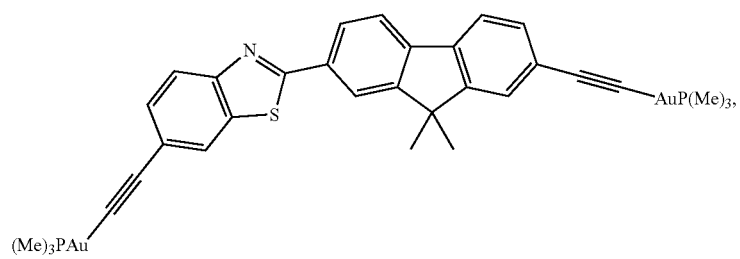
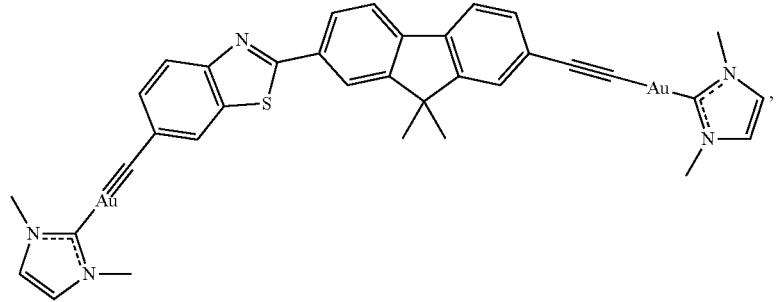

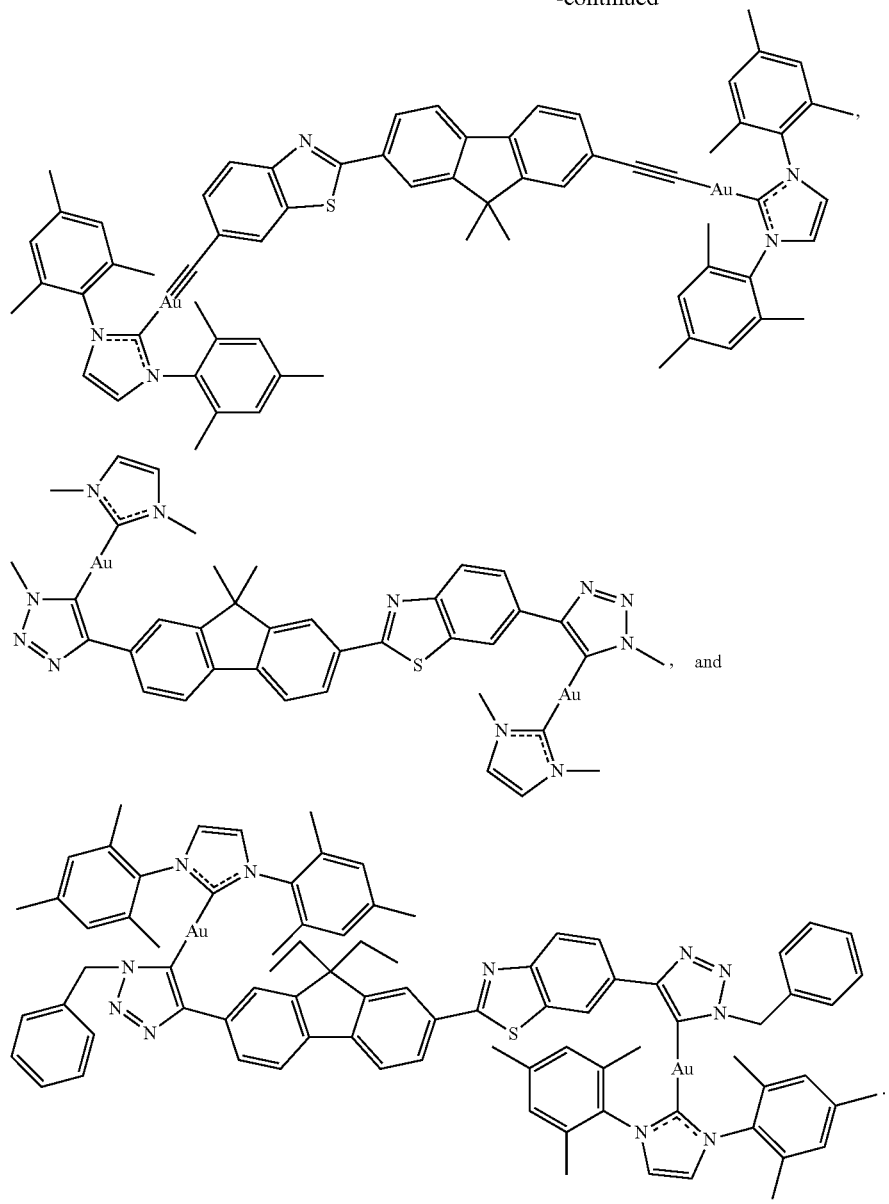

Other embodiments relate to a single molecule light emitter exhibiting non-excimeric state light emission that includes a compound described herein. The emitter can include gold(I) complexed with a benzothiazolyl-substituted fluorophore. The benzothiazolyl-substituted fluorophore can be bound to the gold(I) through a gold-carbon σ-bond. The benzothiazolyl-substituted fluorophore can include, for example, a benzothiazole-2,7-fluorenyl moiety. The emitter can also include an organophosphine ligand or an N-heterocyclic carbene ligand bound to the gold(I).

Example 1

This Example describes the synthesis, structural authentication, and optical characterization of gold(I) complexes of benzothiazolyl-substituted fluorophores. Ancillary ligands on gold are organophosphines and an N-heterocyclic carbene.

Materials and Methods

All experimental procedures were carried out under an inert atmosphere of argon using standard Schlenk line techniques. Microanalyses (C, H, and N) were undertaken by Midwest Microlab and Atlantic Microlab. Mass spectrometry was performed at the University of Cincinnati Mass Spectrometry facility. (Phosphine)gold(I) chloride and (i-Pr2NHC)AuCl were prepared according to literature procedures. The corresponding gold(I) bromides were prepared by reacting one equivalent of gold(I) chloride with five equivalents of potassium bromide in a 1:1 mixture of DCM/Water, extraction in DCM yielded the bromides quantitatively. 2-(9,9-Diethyl-7-(4,4,5,5-tetramethyl-1,3,2-dioxaborolan-2-yl)-9H-fluoren-2-yl)benzo[d]thiazole was purchased from Synovel Labs. Dry 2-propanol, benzene, dichloromethane, pentane, and cesium carbonate was purchased from Sigma Aldrich and used as received. $^1$H NMR experiments were performed on a Bruker-500 Ascend Advanced III HD NMR spectrometer operating at 500.24 MHz. All NMR experiments were run at a millimolar concentration. 1H chemical shifts are reported in parts per million (δ) with integration and multiplicity (s=singlet, d=doublet, t=triplet, q=quartet, dd=doublet of doublets, dt=doublet of triplets, td=triplet of doublets, ddd=doublet of doublet of doublets, and m=multiplet), measured from tetramethylsilane (0 ppm) and are referenced to residual solvent in $CDC_{13}$ (7.26 ppm). $^{31}P\{^1H\}$ NMR, chemical shifts were determined relative to concentrated $H_3PO=$.

Instrumentation

Ground-state UV/vis absorption spectra were measured using a Cary 5000 spectrophotometer. Visible luminescence spectra were obtained using an Edinburgh Instruments FLS980 spectrometer. The samples were excited using a 450 W xenon lamp attached to a Czerny-Turner monochromator (300 nm focal length, 1800 grooves/mm grating, 1.8 nm/mm linear dispersion). The emission signal is collected at 90° relative to the excitation source and passed through a Czerny-Turner monochromator (300 nm focal length, 1800 grooves/mm grating, 1.8 nm/mm linear dispersion) prior to being collected with a Hamamatsu R928P side window photomultiplier in a cooled housing (Operating temperature: −20° C.). The CIE 1931 chromaticity diagram was generated using the Chromaticity Diagram app in the Origin software. 77K luminescence spectra were collected using the visible luminescence setup described above. The samples were frozen in a dewar filled with liquid nitrogen prior to being lowered into the sample chamber. NIR luminescence spectra were obtained using the same excitation source and monochromators, but with a Hamamatsu R5509-72 Photomultiplier in a nitrogen-flow cooled housing (Operating temperature: −80° C.). Luminescence lifetimes were collected using an Edinburgh Instruments OB920 spectrometer. The fluorescence lifetimes were determined using time-correlated single-photon counting. The samples were excited using a 375 nm pulsed LED source with a pulse duration of 60 ps. The fluorescence signal was observed at 415 nm for all samples. Reconvolution fits of the fluorescence decay traces and the IRF were completed using the Edinburgh Instruments F900 software package. The phosphorescence lifetimes were collected using multi-channel scaling. The samples were excited using a pulsed xenon flashlamp with a 1.2 μs pulse width and an average power of 60 W attached to a Seya-Namioka monochromator (100 nm focal length, 1200 grooves/mm grating). The samples were all excited at 348 nm and the phosphorescence signal was observed at 540 nm. The decay traces were fit using monoexponential decay kinetics. Prior to the collection of the phosphorescence lifetime data, the samples were deaerated with three freeze-pump-thaw cycles. The final achieved vacuum pressure is included with lifetime data. All lifetime measurements were collected in duplicate. The lifetime fits and residuals for the fluorescence and phosphorescence decays are shown in FIG. S10.

Nanosecond transient absorption and delayed fluorescence measurements were performed using an Edinburgh Instruments LP920. Samples were excited using the frequency tripled output (355 nm) of a Qswitched Nd:YAG laser (Quantel Vibrant, pulse width approximately 5 ns). Transient absorption spectra were collected using an Andor iStar ICCD camera. Transient absorption kinetics were collected using a Hamamatsu R928 PMT and a Tektronix TDS 3012C Digital Storage Oscilloscope. Electronic synchronization was controlled via the Edinburgh Instruments F900 software package. Laser excitation of the samples was aligned 90° relative to the white light probe. For single-wavelength kinetic measurements, the probe entered a Czerny-Turner monochromator (300 nm focal length, 1800 grooves/mm grating, 1.8 nm/mm linear dispersion) before being passed to the PMT. For transient absorption spectra, the image from the grating was imaged onto the ICCD camera. The delayed fluorescence and triplet-triplet annihilation experiments were collected using the freeze-pump-thaw degassed samples used for the collection of the phosphorescence lifetimes. Excited-state extinction coefficient measurements were collected in aerated toluene solution.

Ultrafast transient absorption measurements were performed using a modified version of the femtosecond pump-probe UV-Vis spectrometer described elsewhere. 12 Briefly, 4 mJ, 45 fs pulses at 785 nm with a 1 kHz repetition rate were obtained from a cryogenically-cooled Ti:Sapphire regenerative amplifier (KM Labs Wyvern 1000-10). Approximately 5% (0.2 mJ) was reflected into the experiment, which was split into pump and probe (90% and 10%, respectively) using a beam splitter. The pump beam was directed into a frequency doubler (CSK Super Tripler) and then focused into the sample. The probe beam was delayed in a computer-controlled optical delay (Newport MM4000 250 mm linear positioning stage) and then focused into a sapphire plate to generate white light continuum. The white light was then overlapped with the pump beam in a 2 mm quartz cuvette and then coupled into a CCD detector (Ocean Optics 52000 UV-VIS). Data acquisition was controlled by software developed by Ultrafast Systems LLC. Global analysis of the lifetime of each chromophore at 10 unique wavelengths was also performed with the Ultrafast Systems LLC Surface Xplorer software package. All of the decays are fit well with monoexponential decay kinetics. The value represented in Table 1 is the average of this global lifetime analysis. All ultrafast data were collected in aerated toluene solutions.

TABLE 1

Summary of AuBTF Photophysical Properties

| Complex | AuBTF0 | AuBTF1 | AuBTF2 |
|---|---|---|---|
| $\lambda_{ABS}$/nm | 359 | 360 | 364 |
| ($10^4$ $M^{-1}cm^{-1}$) | (5.34 ± 0.68) | (5.95 ± 0.18) | (5.80 ± 0.18) |
| $^A\lambda_{FL}$ (nm) | 388 | 389 | 397 |
| $\phi_{FL}$ | 0.08 ± 0.01 | 0.09 ± 0.03 | 0.22 ± 0.01 |
| $\tau_{FL}$ – TCSPC (ps) | 79.3 | 89.4 | 229 |
| $\tau_{FL}$ – TA (ps) | 84.5 ± 4.6 | 95.4 ± 2.3 | 279 ± 10 |
| $k_r$ ($s^{-1}$) | 9.4 × $10^8$ | 9.5 × $10^8$ | 7.9 × $10^8$ |
| $k_{nr}$ ($s^{-1}$) | 1.5 × $10^9$ | 1.1 × $10^9$ | 5.4 × $10^8$ |
| $k_{ISC}$ ($s^{-1}$) | 9.3 × $10^9$ | 8.5 × $10^9$ | 2.3 × $10^9$ |
| $^B\lambda_{PHOS}$ (nm) | 538 | 538 | 541 |
| $\phi_{TRIPLET}$ | 0.79 ± 0.01 | 0.81 ± 0.02 | 0.63 ± 0.03 |
| $\phi_{PHOS}$ | 0.09 ± 0.01 | 0.07 ± 0.01 | 0.11 ± 0.01 |
| $\tau_{PHOS}$ (μs) | 810 ± 70 | 766 ± 8 | 872 ± 59 |
| Vac. Pressure (mTorr) | 89 | 90 | 87 |
| $k_T$ ($s^{-1}$) | 1,220 | 1,290 | 1,140 |
| $k_{TT}$ ($M^{-1}s^{-1}$) | 1.3 ± 0.1 × $10^{10}$ | 1.2 ± 0.1 × $10^{10}$ | 1.4 ± 0.1 × $10^{10}$ |
| $\Delta\epsilon_{T_1-T_n}/\lambda$ nm | 547 | 550 | 562 |
| ($10^4$ $M^{-1}$ $cm^{-1}$) | (9.14 ± 0.50) | (10.1 ± 0.1) | (9.40 ± 0.10) |
| $\Delta\epsilon_{S_1-S_n}/\lambda$ nm | 567 (13.7) | 588 (15.6) | 557 (15.0) |
| ($10^4$ $M^{-1}$ $cm^{-1}$) | | | |

All Data collected in room temperature toluene.
$^A$Estimated from the peak maximum of the dilute luminescence spectrum used for the reabsorption correction in fluorescence quantum yield experiments.
$^B$Estimated from the peak maximum of the phosphorescence signal.

Absolute Luminescence Quantum Yield Measurements

Figure 10:
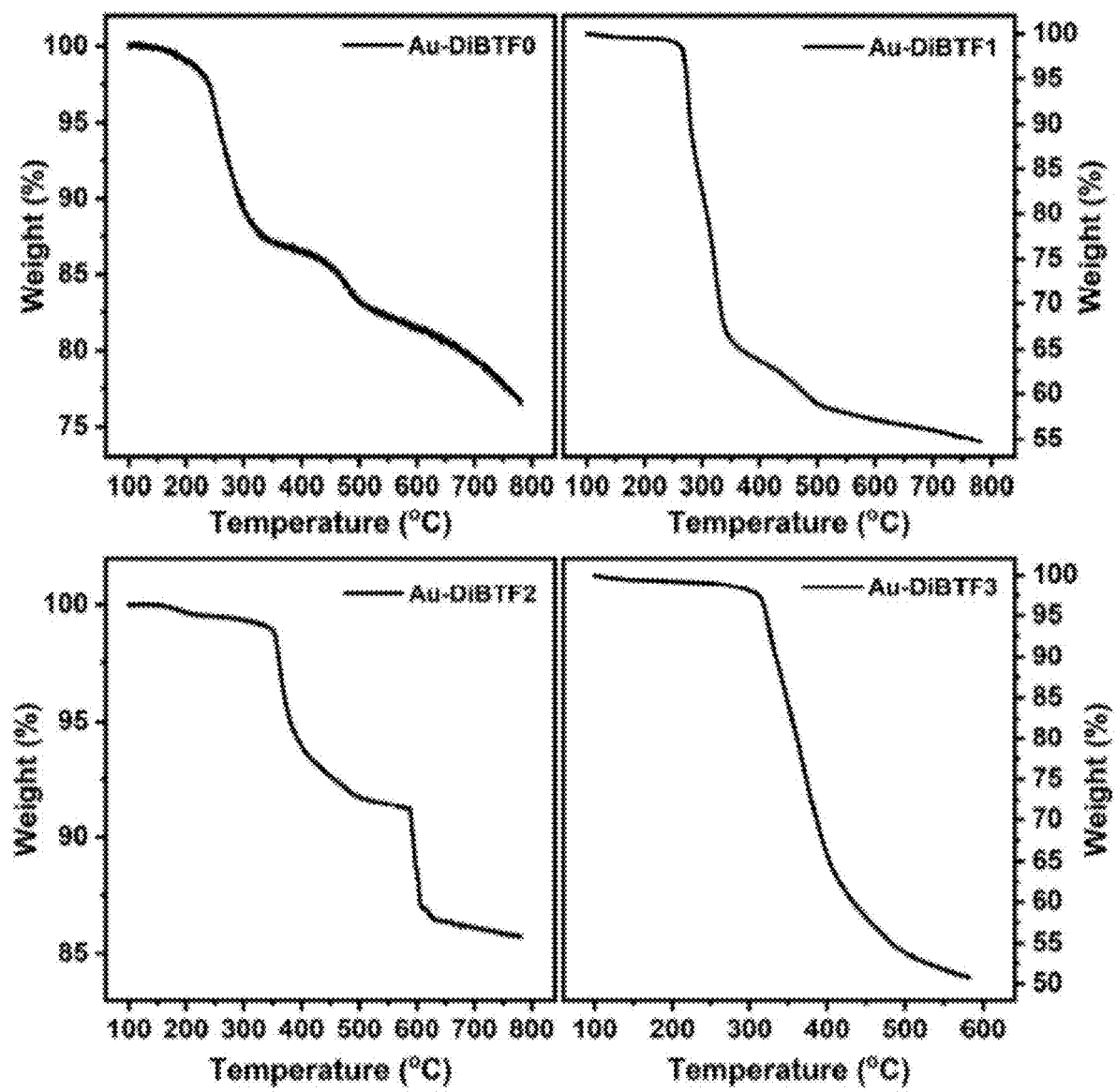
FIG. 10 illustrates thermogravimetric analysis of Au-DiBTF0 (top left), Au-DiBTF1 (top right), Au-DiBTF2 (bottom left), and Au-DiBTF3 (bottom right).

Fluorescence quantum yield values were determined using an integrating sphere compatible with the Edinburgh Instruments FLS980 system. The excitation intensity was set by placing a blank toluene solution into the sample chamber. The emission slits were set to 0.8 mm and the excitation slits (5 mm) were adjusted until 1 million counts were observed at the PMT. All of the samples were excited at 300 nm. The luminescence signal was collected from 280-600 nm using a 0.3 nm step size. The luminescence signal was averaged 3 times for each trial. Each quantum yield was collected in duplicate. The fraction of light absorbed was determined by integrating the excitation signal of the blank sample and the excitation signal obtained from the particular AuBTF sample and subtracting the values. The excitation signal was integrated from 295-305 nm. The raw fluorescence intensity signal was integrated from the crossing point of the toluene blank signal and the AuBTF sample signal to 600 nm. The raw fluorescence intensity spectra were corrected for sample reabsorption. The concentrated samples had a ground state absorbance value of 0.1 at 310 nm. The concentrated samples were diluted by a factor of 10 and the emission spectra were recollected in order to determine the extent of reabsorption loss. The data used to determine the fluorescence quantum yield values for all of the AuBTF complexes is show in FIG. 10.

Relative Luminescence Quantum Yield Measurements

The phosphorescence quantum yield values for the AuBTF complexes and photosensitized singlet oxygen phosphorescence quantum yield values in aerated samples of the AuBTF complexes were determined using relative quantum yield measurements. The equation used to determine the luminescence quantum yield of a sample using a reference standard is given below in equation 1.

$$\Phi_{f,x} = \Phi_{f,std} \frac{F_x}{F_{std}} \frac{f_{std}(\lambda_{ex,std})}{f_x(\lambda_{ex,x})} \frac{\eta_x^2}{\eta_{std}^2} \quad (1)$$

Figure 11:
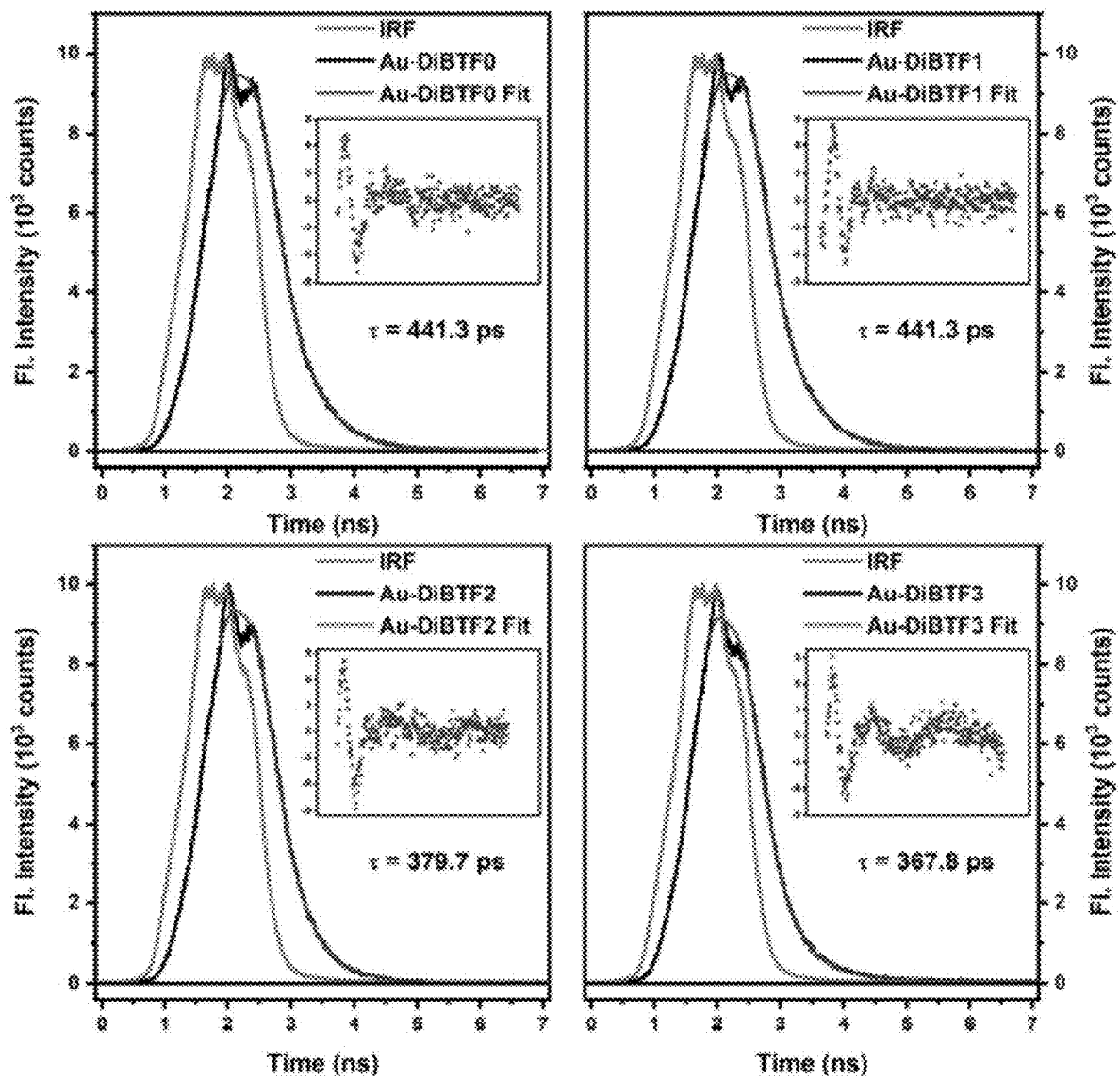
FIG. 11 illustrates TCSPC Fluorescence Lifetimes of Au-DiBTF0 (top left), Au-DiBTF1 (top right), Au-DiBTF2 (bottom left), and Au-DiBTF3 (bottom right) collected in aerated toluene. Lifetimes were collected in duplicate, and the average values are reported in Table 1.
Figure 12:
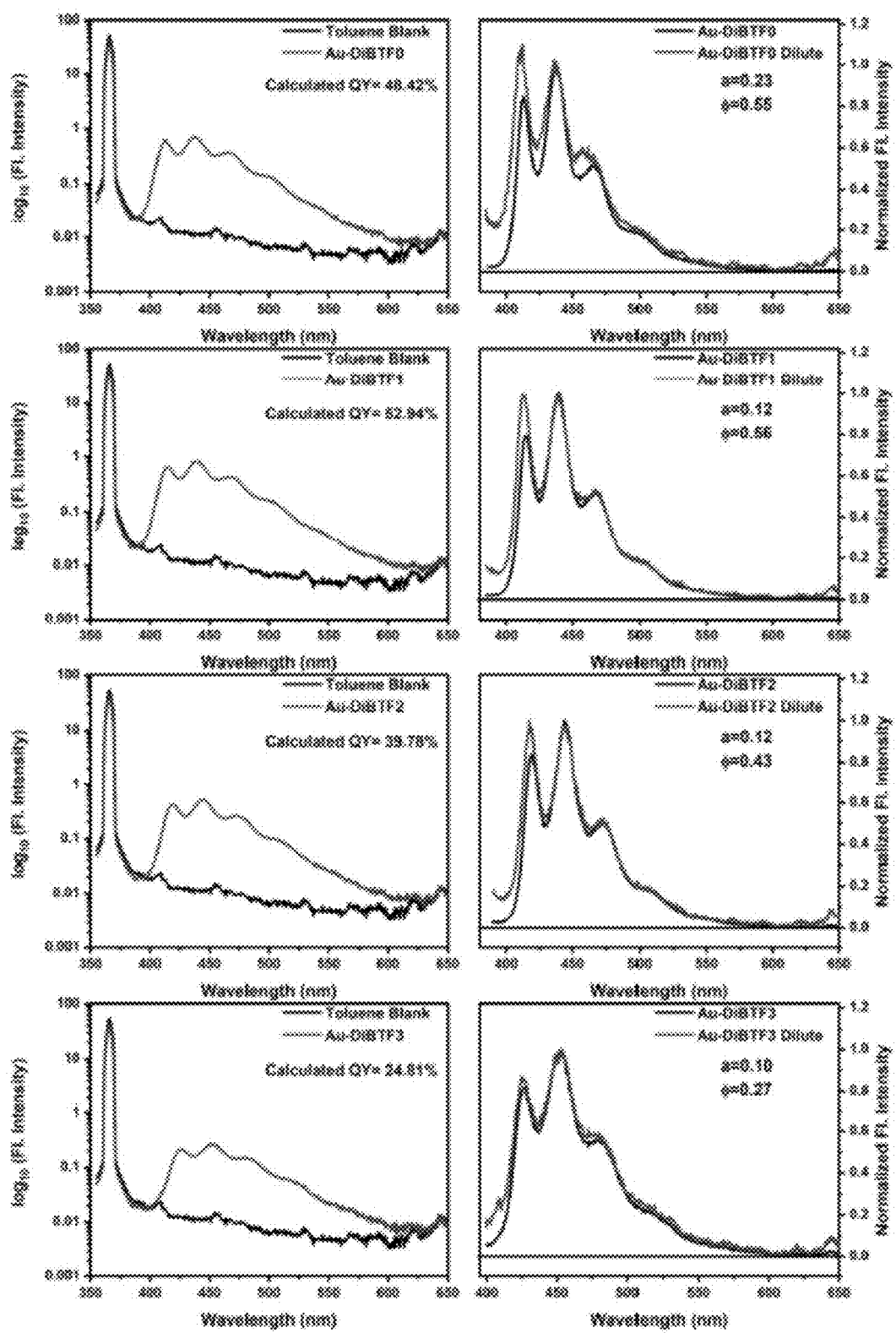
FIG. 12 illustrates fluorescence Quantum Yields of Au-DiBTF0 (top), Au-DiBTF1 (middle top), Au-DiBTF2 (middle bottom), and Au-DiBTF3 (bottom) collected in aerated toluene. The fluorescence quantum yields were collected in duplicate where the average value is reported in Table 1.

$\Phi_{f,std}$ is the luminescence quantum yield of the reference standard, Fx and Fstd are the integrated luminescence intensity values obtained from the unknown and reference standard, $f_x$ ($\lambda_{ex,x}$) and $f_{std}$ ($\lambda_{ex,std}$) represent the fraction of light absorbed by the unknown and reference standard, and $\eta^2$ x and $\eta^2$ std are the indices of refraction for the solvents used to collect the luminescence spectra of the unknown and reference. The index of fraction correction is only applied in instances when the solvent used to collect the luminescence spectra of the unknown and reference differ. The phosphorescence quantum yields for the AuBTF complexes were determined using Rhodamine 6G as the reference standard. The samples were absorbance matched at 348 nm. The samples were excited using an excitation slit width of 1.25 mm. The luminescence signal was collected from 450-700 nm using 1 nm steps with an emission slit width of 0.50 mm. The luminescence signal was averaged 5 times for each trial. The phosphorescence spectra were integrated from 500-750 nm. The phosphorescence quantum yield experiments were performed in duplicate for AuBTF0 and AuBTF1 and in triplicate for AuBTF2. The AuBTF luminescence spectra were collected in toluene. The Rhodamine 6G luminescence spectrum was collected in EtOH. The equation was corrected using the index of refraction values reported in the Handbook of Photochemistry. The ground-state absorption correction for the AuBTF and Rhodamine 6G samples used the average absorption value from 347-349 nm to account for the linear dispersion of the excitation monochromator. The luminescence spectra of Rhodamine 6G was corrected for reabsorption. A quantum yield value of 0.95 was applied to the integrated intensity of the corrected luminescence spectrum of Rhodamine 6G. The absorption and luminescence data used to determine the phosphorescence quantum yields of the AuBTF complexes are shown in FIG. 11. The photosensitized singlet oxygen phosphorescence quantum yields for the AuBTF complexes were determined using phenazine as the reference standard. The reference and AuBTF luminescence spectra were collected in benzene. The samples were absorbance matched at 361 nm. The samples were excited using an excitation slit width of 3.0 mm. The luminescence signal was collected from 1240-1330 nm using 1 nm steps with an emission slit width of 21.0 mm. The luminescence signal was averaged 50 times for each trial. The singlet oxygen phosphorescence spectra were integrated from 1250-1320 nm. The groundstate absorption correction for the AuBTF and phenazine samples used the average absorption value from 359-363 nm to account for the linear dispersion of the excitation monochromator. A quantum yield value of 0.88 was applied to the integrated intensity of the photosensitized singlet oxygen phosphorescence from the phenazine reference sample. The phosphorescence quantum yield experiments were performed in duplicate for all of the AuBTF complexes. The absorption and luminescence data used to determine the singlet oxygen phosphorescence quantum yields are shown in FIG. 12.

Triplet Excited-State Extinction Coefficient Determination

The excited-state extinction coefficients of the AuBTF triplet states were determined using a relative actinometry method with [Ru(bpy)3]$^{2+}$ as a standard. Standard methods for the determination of the excited-state extinction coefficients and the tabulation of the triplet-triplet absorption spectra of a multitude of molecules are presented elsewhere. The equation used to determine the excited-state extinction coefficient of a sample using a reference standard is given below in equation 2.

$$\Delta\varepsilon_{T,\lambda} = \frac{\Delta\varepsilon_{Ru,\lambda}(\Delta A_{X,\lambda}/\Delta A_{Ru,\lambda})}{\phi_T} \frac{\eta_x^2}{\eta_{Ru}^2} \quad (2)$$

$\Delta_{\varepsilon Ru,\lambda}$ is the difference between the excited- and ground-state extinction coefficients of [Ru(bpy)3]$^{2+}$ at a particular wavelength, $\Delta_{Ax,\lambda}$ is the absorbance change at a particular wavelength of the unknown compound following laser excitation, $\Delta_{ARu,\lambda}$ is the absorbance change at a particular wavelength of [Ru(bpy)3]$^{2+}$ following laser excitation, φT is the intersystem crossing efficiency for the unknown sample, and $\eta^2$ x and $\eta^2$ Ru are the indices of refraction of the solvents used to collected the transient absorption traces of the unknown sample and [Ru(bpy)3]$^{2+}$. The [Ru(bpy)3]$^{2+}$ reference sample and the AuBTF samples were absorbance matched and excited at 355 nm. A value of 20,800 M$^{-1}$ cm$^{-1}$ was used as the value of $\Delta_{\varepsilon Ru,\lambda}$ at 370 nm in CH$_3$CN. This value is based on the literature value for the excited-state extinction coefficient in water at 364 nm 19 of 25,400 M$^{-1}$ cm$^{-1}$ and a ground-state extinction coefficient of 4,600 M$^{-1}$ cm$^{-1}$ at 364 nm determined in our laboratory. It is assumed the Δε value at the maximum in water (364 nm) is equal to the value at the maximum in CH$_3$CN (370 nm). The value of φT is the estimated triplet yield determined from the photosensitized singlet oxygen phosphorescence quantum yields. The data were obtained in aerated solutions of toluene (AuBTF complexes) and acetonitrile ([Ru(bpy)3]$^{2+}$). The equation was corrected using the index of refraction values reported in the Handbook of Photochemistry. The values for ΔAx and ΔARu were determined from monoexponential fits of transient absorption decay traces. The weighting factor from the fits was used as the maximum ΔA value to account for the response time of the instrument. The transient absorption traces used in the excited-state extinction coefficient determinations were all collected using laser pulse energies of <200 μJ in an effort to avoid the deleterious effects of nonlinear optical behavior at high laser pulse energies.20 The value of Δε was determined at three different laser pulse energies. This multiple pulse energy treatment was completed on a second sample. The value of Δε given in Table 1 is the average of these 6 trials. The full Δε vs. wavelength spectrum for the AuBTF complexes was obtained from the ΔA spectra of the complexes 50 ns after the laser pulse. The ΔA spectra were normalized at the wavelength where Δε was determined and then multiplied by the value of Δε determined from the relative actinometry experiments.

Delayed Fluorescence

Figure 5:
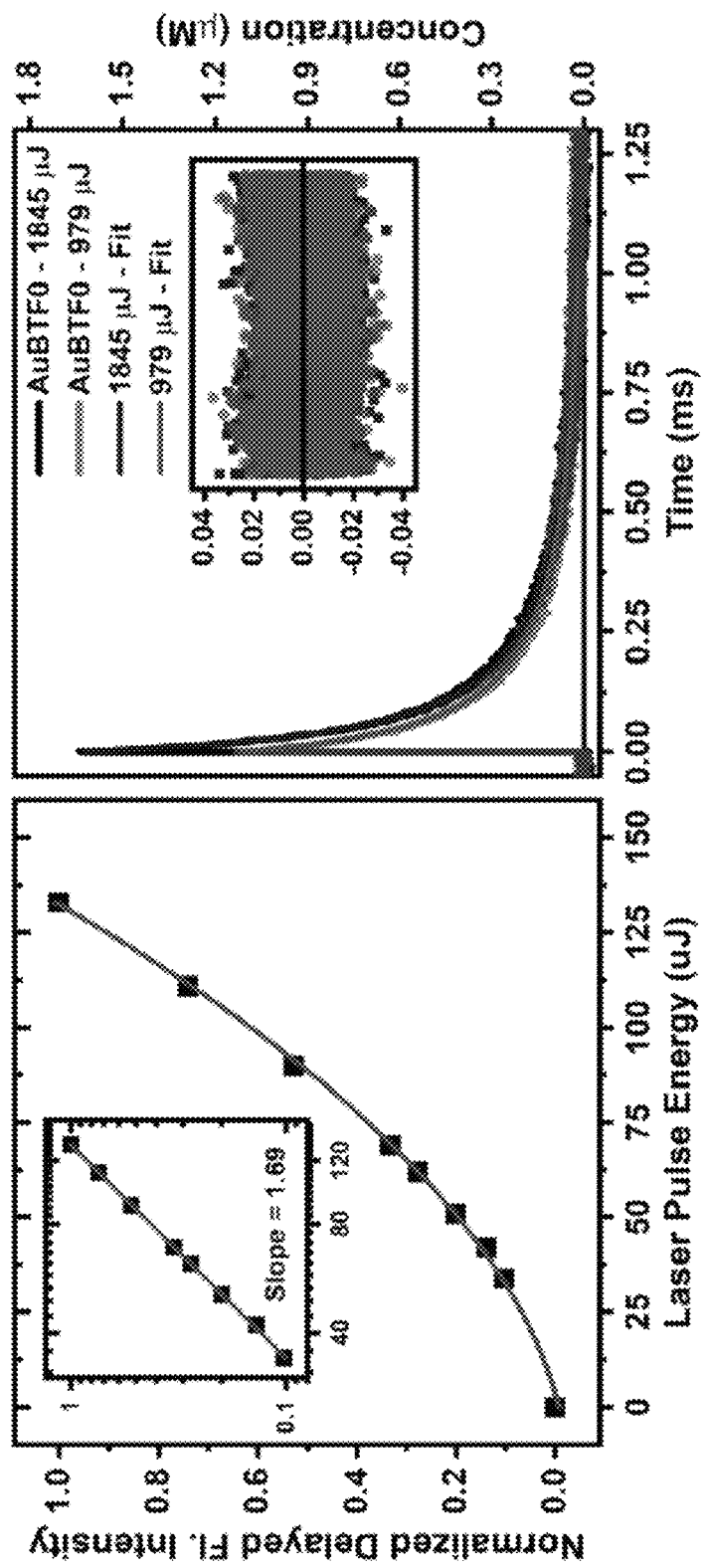
FIG. 5 illustrates (left) Plot of the normalized, integrated fluorescence intensity vs. laser pulse energy for a sample of AuBTF0 following three freeze-pump-thaw cycles in toluene. The fit line represents the best quadratic fit of the data. The double logarithm plot of the same data is inset with the slope obtained from a linear fit listed. (Right) Triplet-triplet annihilation fitting of excited-state decay traces of AuBTF0 in freeze-pump-thaw deaerated toluene. The inset depicts the residuals of both data fits.
Figure 13:
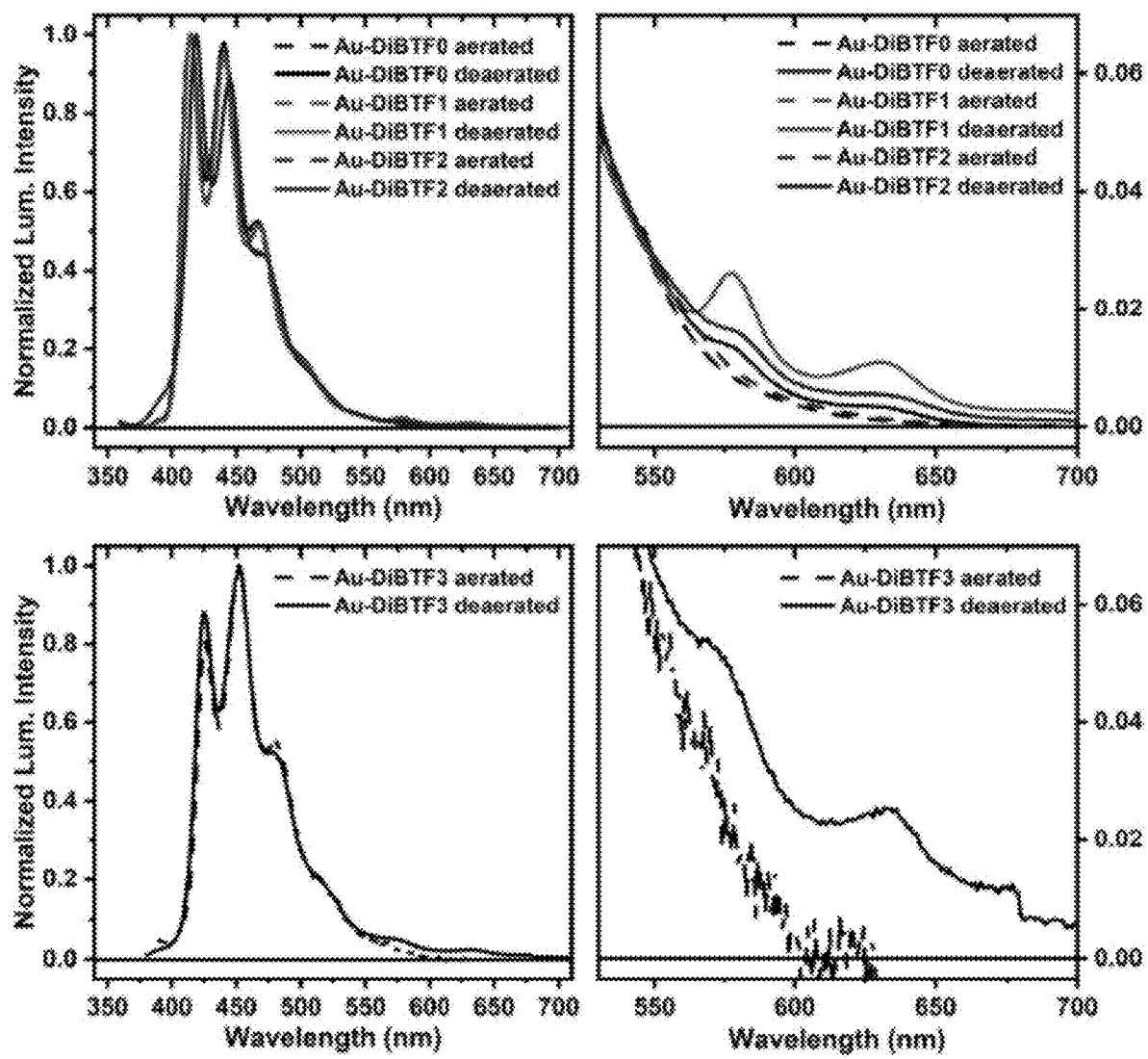
FIG. 13 illustrates plots showing (Top) Aerated (solid) and deaerated (dashed) luminescence spectra of Au-DiBTF0, Au-DiBTF1, Au-DiBTF2 and (Bottom) aerated (solid) and deaerated (dashed) luminescence spectra of Au-DiBTF3 collected in toluene. The figure clearly demonstrates quenching of the phosphorescence by dissolved oxygen in solution.

The delayed fluorescence behavior of the AuBTF complexes was examined at various laser pulse energies. The data were collected in freeze-pump-thaw deaerated toluene solutions. Laser pulse energies were measured using a Laser Precision Corp. RJP-735 pyroelectric energy probe and Laser Probe Inc. Rj-7620 energy ratiometer. The delayed fluorescence signal was collected using the Andor iStar ICCD camera with a gate delay of 50 μs after the laser pulse and a gate width of 90 μs. The fluorescence signal at each laser energy was averaged over 20 laser shots. The integrated fluorescence intensity at each laser energy was obtained by integrating the spectra from 375-500 nm. These integrated intensity values were normalized relative to the integrated intensity at the highest laser energy and plots of normalized, integrated fluorescence intensity vs. laser pulse energy were generated for each of the AuBTF complexes. Double logarithm plots were also generated for these data sets. The data collected for AuBTF0 are shown in FIG. 5 and the data collected for AuBTF1 and AuBTF2 are shown in FIG. 13. Delayed fluorescence experiments were collected using the freeze-pump-thaw degassed samples used in the collection of the phosphorescence lifetimes.

Triplet-Triplet Annihilation Fitting

The delayed fluorescence experiments established the contribution of triplet-triplet annihilation to the decay of the AuBTF excited-states in toluene solution. The triplettriplet annihilation rate constant can be determined using equation 3.

$$[^3M^*]_t = \frac{[^3M^*]_0 e^{-k_T t}}{1 + [^3M^*]_0 (k_{TT}/k_T)(1 - e^{-k_T t})} \quad (3)$$

Figure 14:
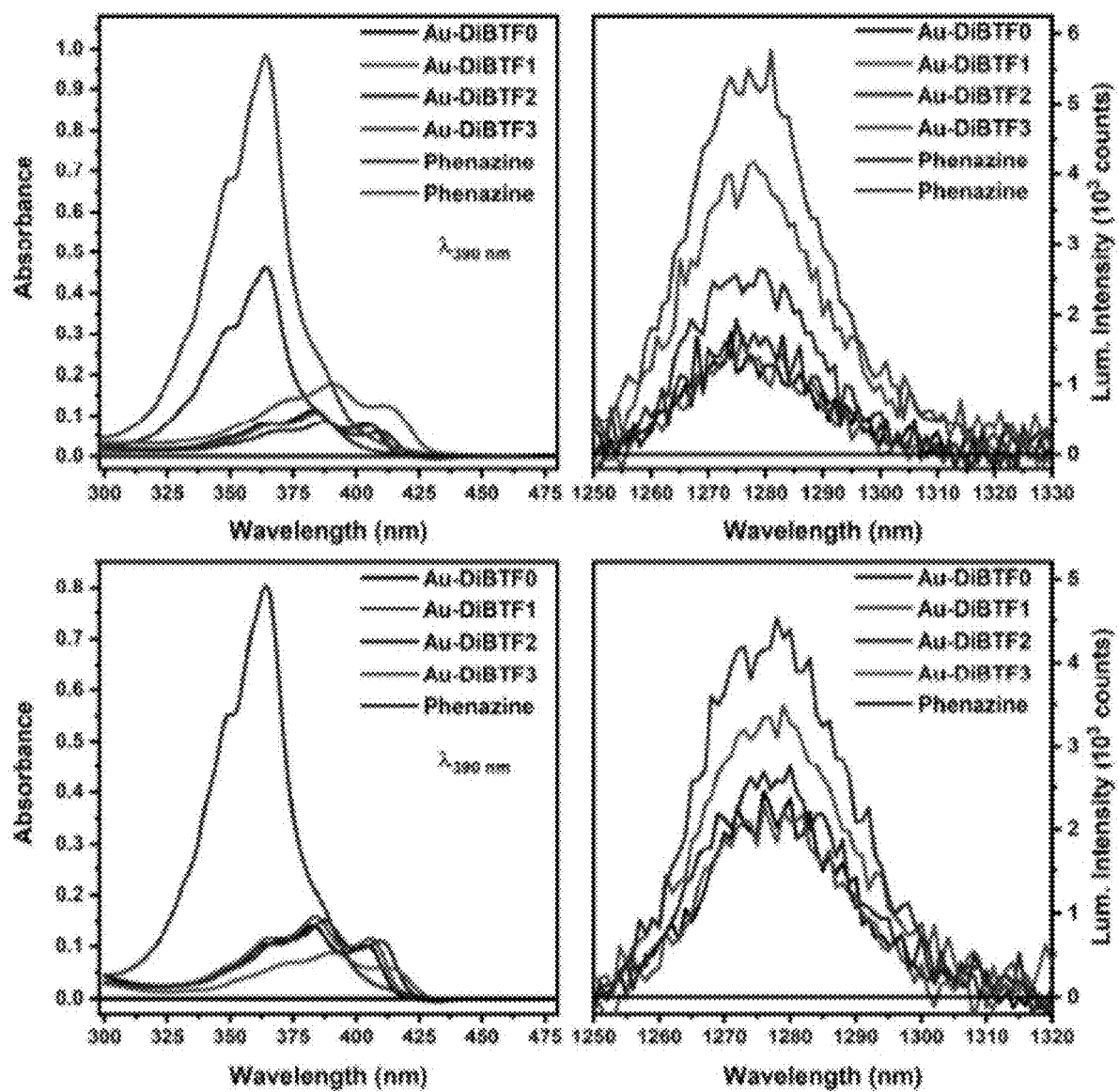
FIG. 14 illustrates plots showing singlet oxygen phosphorescence triplet quantum Yields collected in aerated toluene. Phenazine was used as the reference standard for both trials, and all complexes were excited at 390 nm. The average of trial 1 (top) and trial 2 (bottom) is reported in Table 1.
Figure 16A:
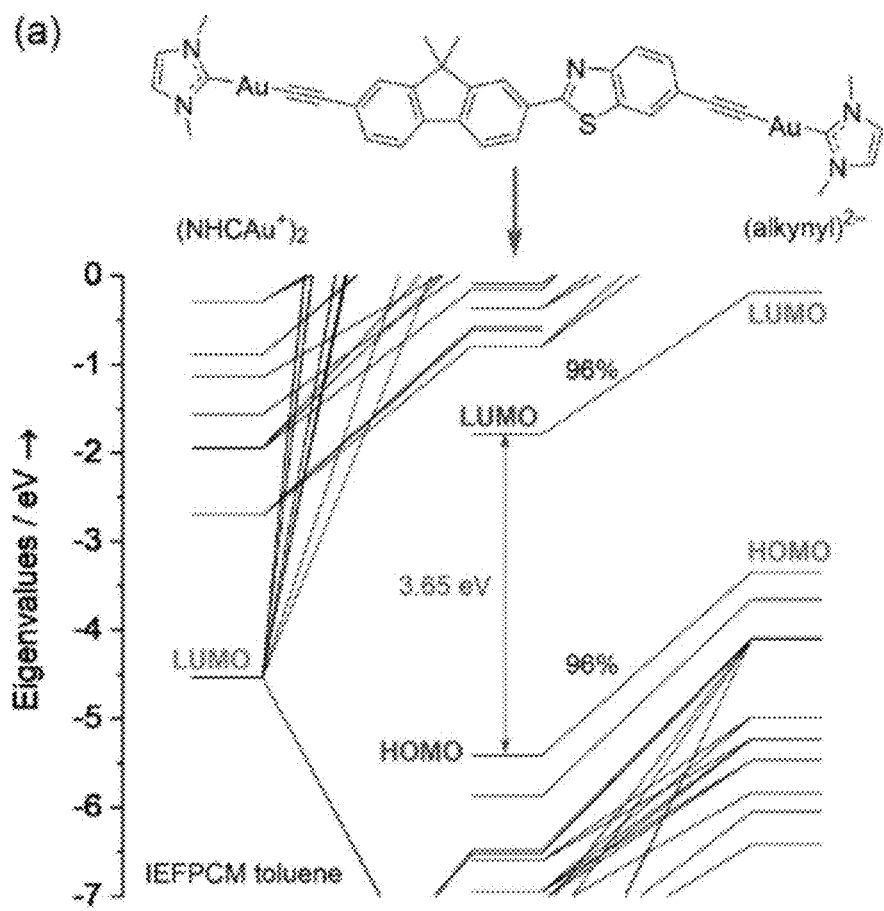
FIGS. 16(A-B) illustrate: (A) Frontier orbital energy diagram of model complex Au-DiBTF2'. (B) Kohn-Sham orbital plots (HOMO and LUMO). (Percentages are of electron density).
Figure 16B:
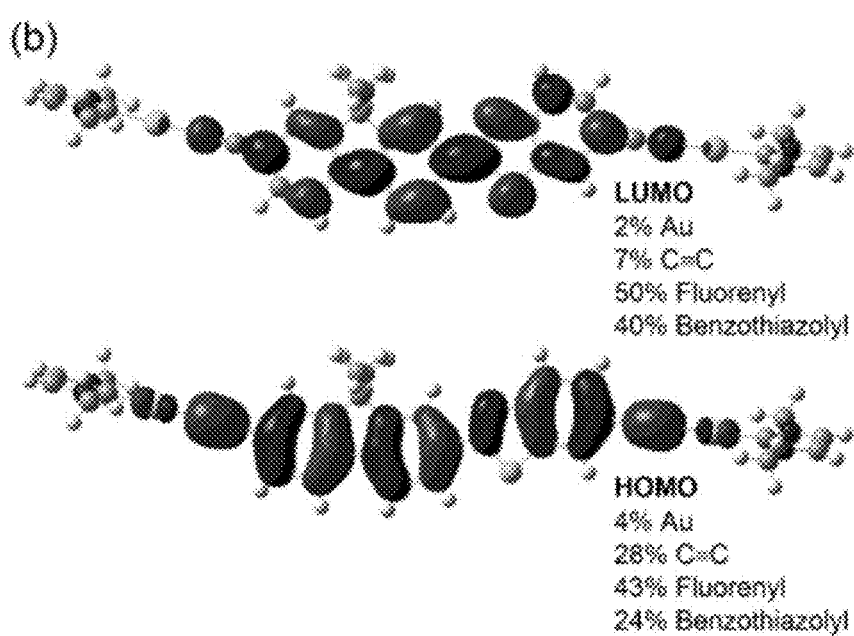
Figure 17A:
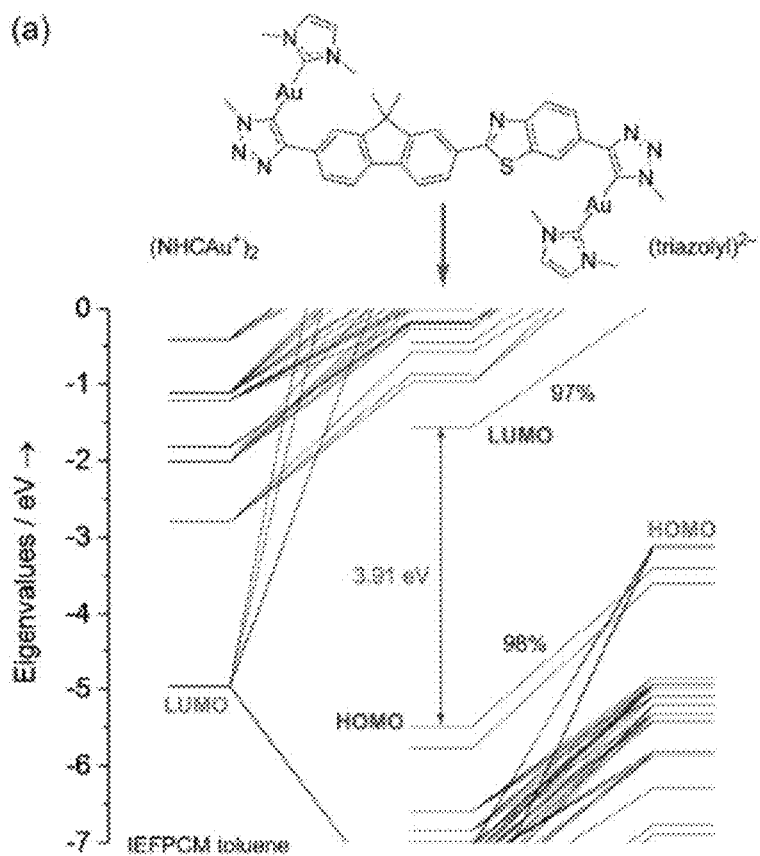
FIGS. 17(A-B) illustrate: (A) Frontier orbital energy diagram of model complex Au-DiBTF3'. (B) Kohn-Sham orbital plots (HOMO and LUMO). (Percentages are of electron density).
Figure 17B:
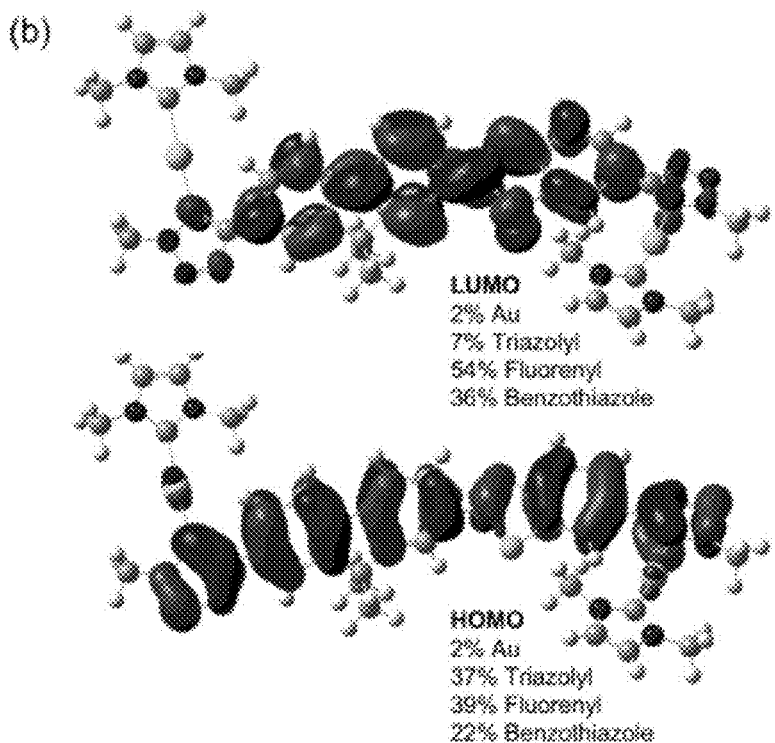

$[^3M^*]t$ is the triplet excited-state concentration at some time following laser excitation, $[^3M^*]0$ is the initial excited-state concentration following laser excitation, kT is the rate constant for the intrinsic decay of the triplet excited-state (τT=), and kTT is the triplet-triplet annihilation rate constant. The triplet excited-state decay traces collected in transient absorption experiments are expressed in units of Δabsorbance vs. time. In order to fit these data, the decay traces are converted from Δabsorbance units to concentration using the previously determined excited-state extinction coefficients. The lifetime values for the triplet excited-states were previously determined. The value of kT from these lifetime measurements was input into the fit equation and held constant when fitting the data. Decay traces were collected at two laser pulse energies (~1 mJ and ~2 mJ per pulse). The values of kTT presented in Table 1 represent the average of the values obtained when fitting both decay traces. The data collected for AuBTF0 are shown in FIG. 5 and the data collected for AuBTF1 and AuBTF2 are shown in FIG. 14. Triplet-triplet annihilation experiments were collected using the freeze-pump-thaw degassed samples used in the collection of the phosphorescence lifetimes.

Estimation of Singlet Excited-State Extinction Coefficient

Our previous determinations of the quantum yield of triplet state formation and the triplet excited-state extinction coefficient allow for the estimation of the singlet excited-state extinction coefficient from the picosecond transient absorption data. This extinction coefficient can be determined using equation 4.

$$\Delta \varepsilon_{S_1-S_n} = \Delta \varepsilon_{T_1-T_n} \frac{\Delta A_{S_1-S_n} \phi_T}{\Delta A_{T_1-T_n}} \quad (4)$$

$$\varepsilon S_1 - S_n$$

$\varepsilon S_1-S_n$ is the singlet excited-state extinction coefficient, $\varepsilon T_1-T_n$ is the triplet excited-state extinction coefficient, $\Delta A_{S_1}-S_n$ is the maximum change in absorbance of the 0 ps time trace in the picosecond transient absorption data, $\Delta A_{T_1}-T_n$ is the maximum change in absorbance of the 500 ps time trace for AuBTF0 and AuBTF1 and the 1000 ps time trace for AuBTF2 in the picosecond transient absorption data, and $\Phi_T$ is the quantum yield of triplet state formation.

Synthesis, NMR, Mass Spectrometry and Elemental Analysis

AuBTF0

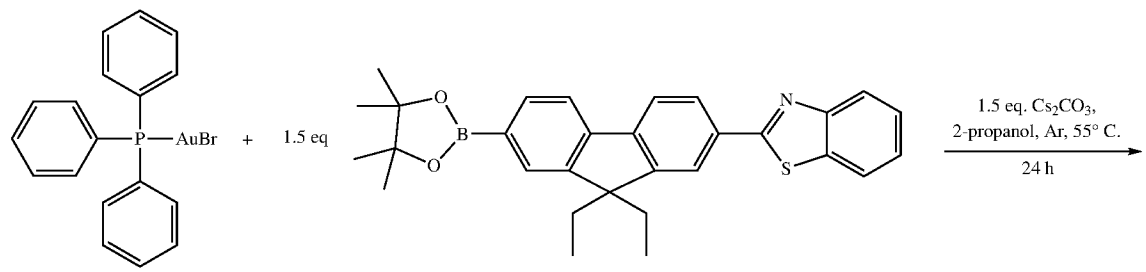

-continued

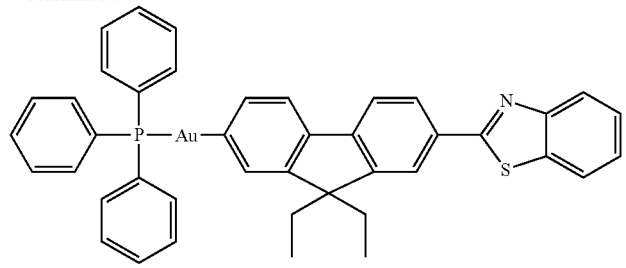

To a flame-dried 25 mL round bottom flask equipped with a stir bar was added (100.05 mg, 0.186 mmol) of Ph3PAuBr, (133.97 mg, 0.278 mmol) of pinacolboronate ester, and (181.08 mg, 0.556 mmol) of $Cs_2CO_3$. The flask was purged with argon for 15 min, after which 5 mL of dry 2-propanol was added via syringe. The vessel was then shielded from light and heated at 55° C. for 24 h. The contents of the flask were then cooled to room temperature yielding a bright yellow suspension that was concentrated in vacuo. The crude product was dissolved in 5×5 mL portions of benzene and filtered over Celite to yield a yellow solution which was concentrated under reduced pressure. This crude product was then subjected to vapor diffusion crystallization using dichloromethane as the solvent and pentanes as the antisolvent (111.23 mg, 72%). $^1$H NMR (500 MHz, chloroform-d) δ 8.08 (d, J=10.8 Hz, 2H), 8.00 (d, J=9.0 Hz, 1H), 7.90 (d, J=7.9 Hz, 1H), 7.74 (d, J=7.9 Hz, 1H), 7.70 (d, J=7.2 Hz, 1H), 7.62 (dt, J=14.7, 7.4 Hz, 8H), 7.49 (q, J=7.7 Hz, 10H), 7.37 (t, J=7.2 Hz, 1H), 2.16-2.10 (m, 4H), 0.37 (t, J=7.3 Hz, 6H). $^{31}$P NMR (121 MHz, CDCl3) δ (ppm): 43.58. HRMS (FT-ICR, [M+H]+) m/z calcd for MH+ C42H36NPSAu+ 814.19661, found 814.19680. Anal. Calcd for: C51H56AuN3S: C, (61.99); H, (4.34); N, (1.72). Found: C, (61.83); H, (4.54); N, (1.75).

AuBTF1

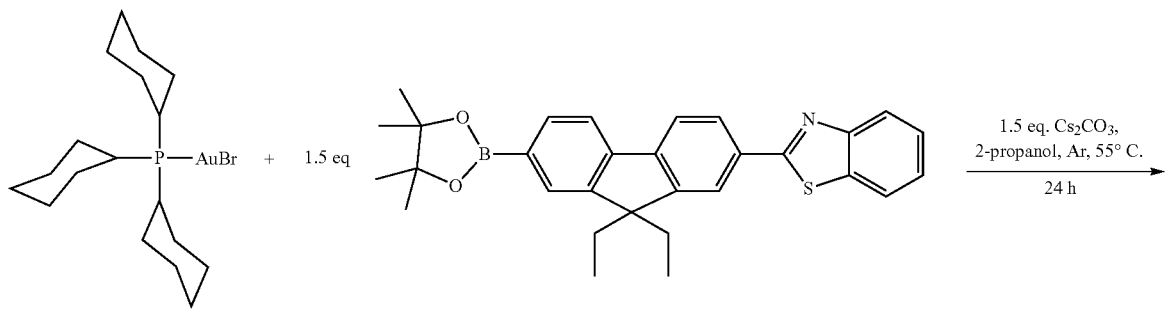

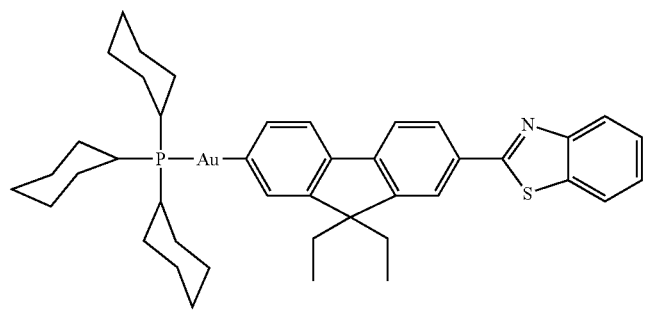

To a flame-dried 25 mL round bottom flask equipped with a stir bar was added 100.05 mg (0.180 mmol) of Cy3PAuBr, 130.17 mg (0.270 mmol) of pinacolboronate ester, and 175.86 mg (0.540 mmol) of Cs$_2$CO$_3$. The flask was purged with argon for 15 min, after which 5 mL of dry 2-propanol was added via syringe. The vessel was then shielded from light and heated at 55° C. for 24 h. The contents of the flask were then cooled to room temperature yielding a bright yellow suspension that was concentrated in vacuo. The crude product was dissolved in 5×5 mL portions of benzene and filtered through Celite to yield a yellow solution which was concentrated under reduced pressure. This crude product was then subjected to vapor diffusion crystallization using dichloromethane as the solvent and pentanes as the anti-solvent. (110.56 mg, 76%). $^1$H NMR (500 MHz, chloroform-d) δ 8.09-8.05 (m, 2H), 7.98 (dd, J=7.8, 1.7 Hz, 1H), 7.90 (d, J=7.9 Hz, 1H), 7.72 (d, J=7.9 Hz, 1H), 7.66 (d, J=7.3 Hz, 1H), 7.54-7.46 (m, 3H), 7.36 (t, J=7.5 Hz, 1H), 2.18-2.02 (m, 15H), 1.92-1.86 (m, 7H), 1.75 (d, J=9.0 Hz, 4H), 1.32 (h, J=12.7, 11.2 Hz, 11H), 0.38 (t, J=7.3 Hz, 6H).31P NMR (121 MHz, CDCl3) δ (ppm): 57.07. HRMS (FT-ICR, [M+H]+) m/z calcd for MH+C42H54NPSAu+ 832.33746, found 832.33739. Anal. Calcd for: C$_{42}$H$_{35}$AuNPS: C, (60.64); H, (6.42); N, (1.68). Found: C, (60.91); H, (6.56); N, (1.75).

AuBTF2

The crude product was dissolved in 5×5 mL portions of benzene and filtered through Celite to yield a yellow solution which was subsequently concentrated under reduced pressure. This crude product was then subjected to vapor diffusion crystallization using dichloromethane as the solvent and pentanes as the antisolvent. (77.23 mg, 53%) Yield. 1H NMR (500 MHz, chloroform-d) δ 8.04 (d, J=8.2 Hz, 1H), 8.00 (d, J=1.8 Hz, 1H), 7.95-7.80 (m, 2H), 7.60 (d, J=7.9 Hz, 1H), 7.47 (dt, J=16.1, 8.0 Hz, 3H), 7.40 (d, J=7.4 Hz, 1H), 7.32 (dd, J=21.2, 7.6 Hz, 5H), 7.16 (s, 2H), 7.09 (d, J=7.3 Hz, 1H), 7.03 (s, 1H), 2.71 (hept, Page 43 of 69 Dalton Transactions S 13 J=7.1 Hz, 4H), 1.93 (qq, J=14.1, 7.2 Hz, 4H), 1.42 (d, J=6.8 Hz, 12H), 1.25 (d, J=6.8 Hz, 12H), 0.33 (t, J=7.3 Hz, 6H). HRMS (FT-ICR, [M+H]+) m/z calcd for MH+C51H57N3SAu+940.39332, found 940.39341. Anal. Calcd for: C51H56AuN3S: C, (65.16); H, (6.00); N, (4.47). Found: C, (65.11); H, (6.19); N, (4.44).

Calculations

Spin-restricted and time-dependent density-functional theory computations proceeded in Gaussian 16 rev. A.03.2 Geometries were optimized with the 6-31G(d) basis set for nonmetal atoms and the Stuttgard-Dresden effective core potential and basis set for Au.3 Optimizations proceeded without constraints, and harmonic frequency calculations found all real vibrational frequencies, confirming that converged structures are local energy minima. Final single-point

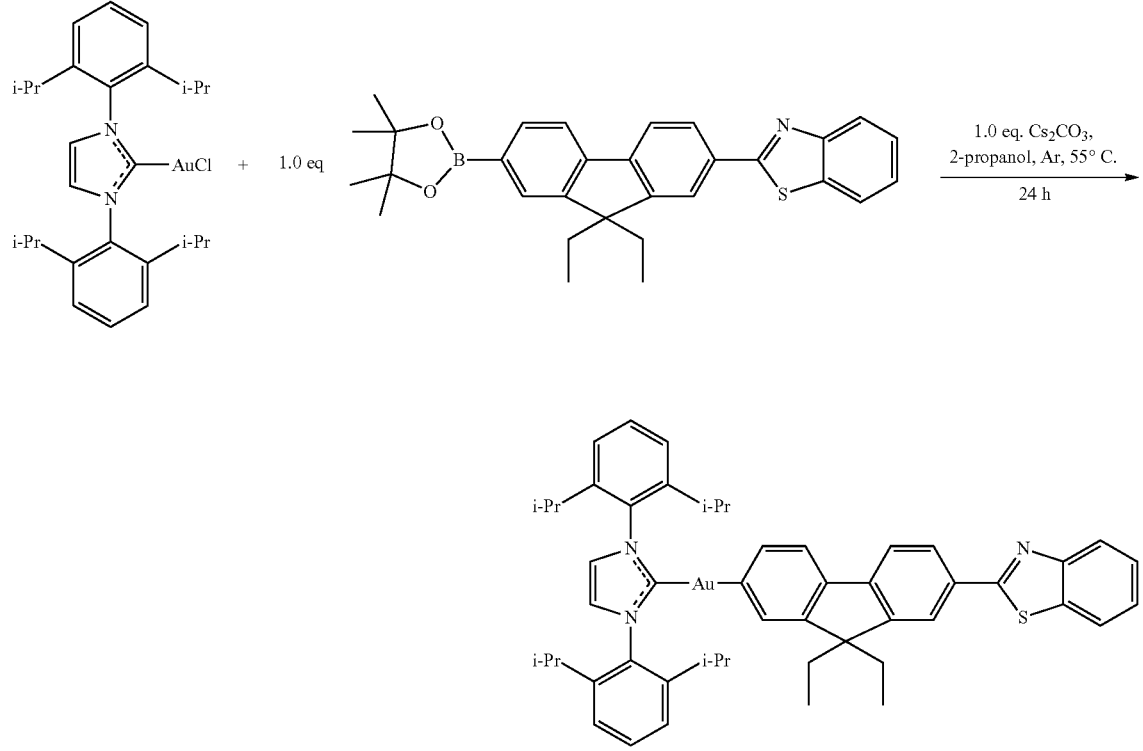

To a flame-dried 25 mL round bottom flask equipped with a stir bar was added 96.00 mg (0.155 mmol) of IPrAuCl, 74.40 mg (0.155 mmol) of pinacolboronate ester, and 100.70 mg (0.310 mmol) of Cs2CO3. The flask was then purged with argon for 15 min, after which 5 mL of dry 2-propanol was added via syringe. The vessel was then shielded from light and heated at 55° C. for 24 h. The contents of the flask were then allowed to cool to room temperature yielding a bright yellow suspension that was concentrated in vacuo.

calculations employed the exchange and correlation functionals of Perdew, Burke, and Ernzerhof (PBE0),4 and the TZVP basis set of Godbelt, Andzelm, and co-workers for nonmetals. For metal atoms, the Stuttgart-Dresden effective core potential and basis set were used; scalar relativistic effects are included implicitly. Continuum solvation in toluene was imposed using the integral equation formalism of the polarizable continuum model. Population analyses were performed with the AOMix-CDA program of Gorelsky.

TABLE 2

AuBTF1: Summary of calculated electronic transitions to Franck-Condon singlet states. MO 181: HOMO; MO 182: LUMO

| # | nm | 1000 cm$^{-1}$ | eV | f | Assignment | |
|---|------|-------|-------|--------|---------------------------|---------------------------|
| 1 | 372.9 | 26.82 | 3.325 | 1.6354 | 181 → 182(98.3%) (HOMO → LUMO) | |
| 2 | 303.6 | 32.94 | 4.084 | 0.0030 | 180 → 182(94.2%) | |
| 3 | 292.5 | 34.19 | 4.239 | 0.0149 | 178 → 182(45.3%) | 181 → 183(18.2%) |
|   |       |       |       |        | 177 → 182(11.5%) | |
| 4 | 291.8 | 34.26 | 4.248 | 0.0123 | 179 → 182(82.2%) | |
| 5 | 285.2 | 35.07 | 4.348 | 0.0421 | 181 → 183(24.5%) | 176 → 182(23.4%) |
|   |       |       |       |        | 177 → 182(16.6%) | 178 → 182(13.1%) |
| 6 | 279.0 | 35.84 | 4.443 | 0.0931 | 177 → 182(63.0%) | 178 → 182(29.7%) |
| 7 | 264.4 | 37.83 | 4.690 | 0.1960 | 181 → 183(41.5%) | 181 → 184(20.5%) |
|   |       |       |       |        | 181 → 185(15.7%) | 176 → 182(12.1%) |
| 8 | 259.7 | 38.50 | 4.774 | 0.0210 | 181 → 184(49.2%) | 176 → 182(31.3%) |
| 9 | 257.0 | 38.91 | 4.825 | 0.0021 | 181 → 186(64.4%) | 181 → 185(30.0%) |
| 10 | 253.7 | 39.41 | 4.886 | 0.0008 | 173 → 182(92.5%) | |
| 11 | 253.6 | 39.43 | 4.889 | 0.0258 | 181 → 185(36.1%) | 181 → 186(20.0%) |
|    |       |       |       |        | 181 → 184(13.4%) | 176 → 182(12.5%) |
| 12 | 245.0 | 40.81 | 5.060 | 0.0064 | 175 → 182(94.7%) | |
| 13 | 241.9 | 41.35 | 5.126 | 0.0184 | 180 → 183(53.0%) | 180 → 185(18.5%) |
| 14 | 240.6 | 41.56 | 5.153 | 0.0024 | 181 → 187(60.1%) | 180 → 183(11.8%) |
| 15 | 240.6 | 41.57 | 5.154 | 0.0102 | 180 → 186(35.1%) | 181 → 187(27.7%) |
|    |       |       |       |        | 180 → 185(12.2%) | |
| 16 | 238.2 | 41.97 | 5.204 | 0.0060 | 180 → 185(31.1%) | 180 → 189(19.8%) |
|    |       |       |       |        | 180 → 184(19.5%) | 180 → 186(16.4%) |
| 17 | 237.2 | 42.16 | 5.227 | 0.0560 | 181 → 189(37.5%) | 179 → 183(17.0%) |
|    |       |       |       |        | 180 → 186(16.4%) | |
| 18 | 235.5 | 42.46 | 5.264 | 0.0258 | 181 → 188(80.2%) | |

Results
Results and Discussion

Reaction of the known 62 (pinacolato)boron ester with (phosphine)gold(I) bromide or (Nheterocyclic carbene)gold(I) chloride 63-68 at 55° C. afforded the corresponding (aryl)gold(I) species AuBTF0 (72% yield), AuBTF1 (76% yield), and AuBTF2 (53% yield), Scheme 1, which were isolated by vapor diffusion of pentane into concentrated dichloromethane solutions, to afford diffraction-quality crystals. A thermal ellipsoid depiction of AuBTF1, which is representative, appears as FIG. 1. The gold-aryl-carbon bond length of AuBTF1 is 2.0498(16) Å; the goldphosphorus distance is 2.2950(4) Å, and the phosphorus-gold-carbon angle is 177.63(5). These metrics are typical for complexes of gold(I).64, 67, 69-71 Metrics of the BTF ligand are unexceptional. None of the three structures shows evidence for π-stacking of aryls.

Ground-State Absorption and Luminescence Spectroscopy

Figure 2:
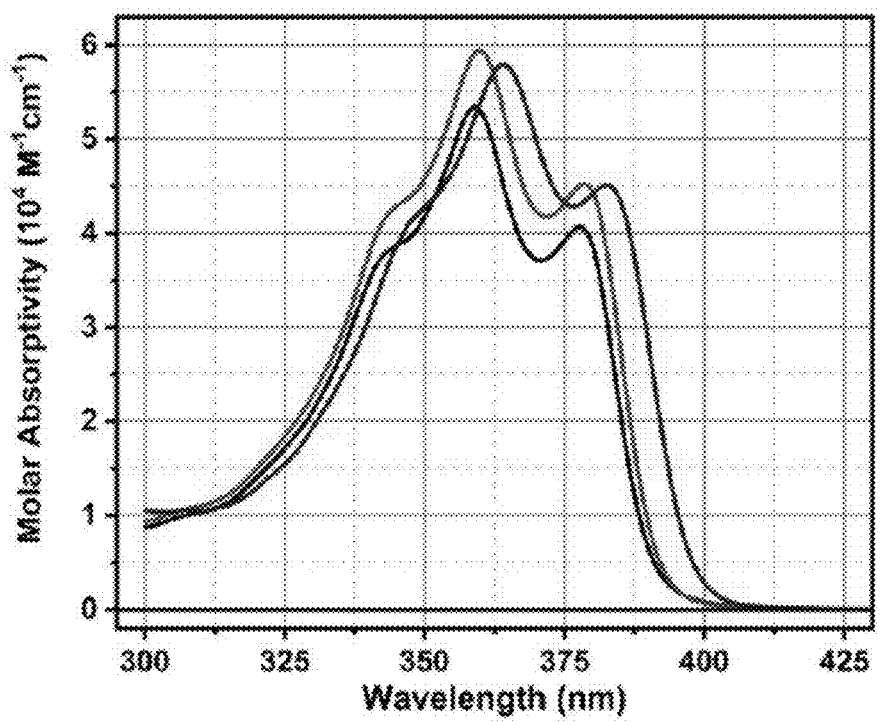
FIG. 2 illustrates ground-state absorption spectra of AuBTF0, AuBTF1, and AuBTF2 collected in toluene.
Figure 3:
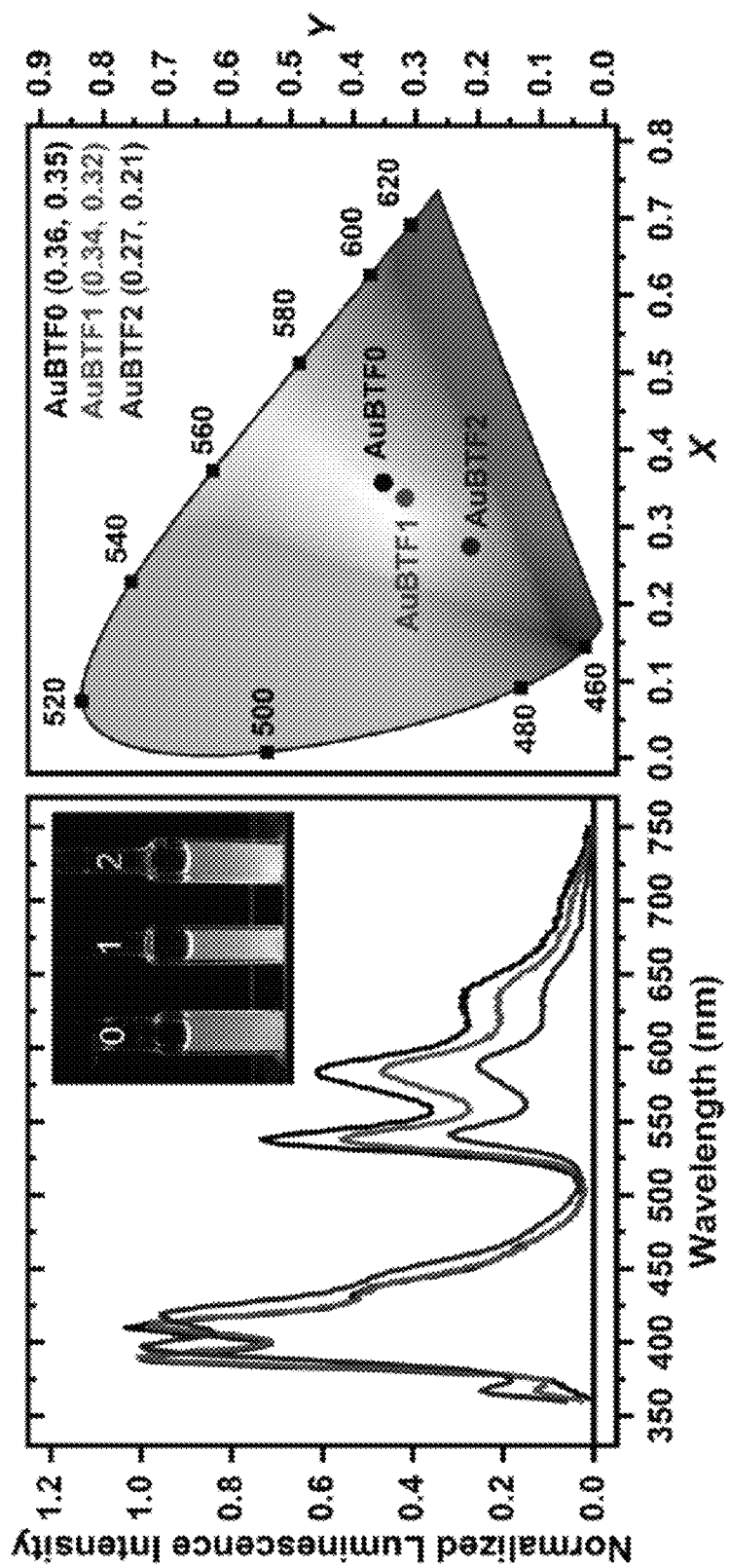
FIG. 3 illustrates normalized dual emission spectra (left) and CIE 1931 chromaticity diagram (right) AuBTF0, AuBTF1, and AuBTF2 following three freeze-pump-thaw cycles in toluene. Inset: Image of luminescence from freeze-pump-thaw deaerated samples of the complexes. The cuvettes are on the surface of a UV hand lamp and being irradiated from the bottom of the cell.

The ground-state absorption spectra in molar absorptivity units are in shown in FIG. 2. The normalized dual emission spectra obtained following three freeze-pump-thaw cycles in toluene and the corresponding CIE 1931 chromaticity diagram are shown in FIG. 3. Pertinent wavelength and ground-state extinction coefficient values are reported in Table 1. The spectral band shapes of the ground-state absorption spectra are identical for all complexes. They are characterized by two well-resolved absorption maxima at wavelengths longer than 350 nm and a high-energy shoulder at approximately 340 nm. The energies of the absorption transitions are controlled by the ancillary ligand attached to the Au(I) atom. The two phosphine containing complexes have absorption transitions that occur at nearly identical energies with maxima occurring at 359 nm for AuBTF0 and 360 nm for AuBTF1. The installation of the N-heterocyclic carbene ligand results in a slight bathochromic shift resulting in an AuBTF2 absorption maximum at 364 nm. The ground-state extinction coefficients are similar for the complexes; all have values on the order of $5 \times 10^4$ M·cm$^{-1}$. The emission spectra following three freeze-pump-thaw cycles in toluene are characterized by dual luminescence. The spectral band shapes of the observed fluorescence and phosphorescence from all of the complexes are indistinguishable and highly structured. Fluorescence and phosphorescence maxima follow the same energetic ordering as the ground-state absorption maxima: AuBTF0≈AuBTF1>AuBTF2. The fluorescence and phosphorescence energies of the complexes are similar with the respective energies of AuBTF0, AuBTF1, and AuBTF2 all occurring within 10 nm of each other. The presence of dual luminescence indicates that intersystem crossing to form the triplet state competes with radiative and non-radiative decay from the singlet state. Fluorescence and phosphorescence lifetime, fluorescence quantum yield, phosphorescence quantum yield (FIG. 11), and intersystem crossing quantum yield (FIG. 12) experiments were all performed in toluene to gain insight into these excited-state dynamics. The detailed procedures used in the collection of these data are provided in the ESI. AuBTF0 and AuBTF1 display nearly identical fluorescence and intersystem crossing behavior. Their fluorescence lifetimes are both on the order of 90 ps, their fluorescence quantum values are essentially 0.10, and their intersystem crossing quantum yields are approximately 0.80. On the other hand, AuBTF2 has a fluorescence lifetime of 229 ps, a fluorescence quantum yield of 0.22, and an intersystem crossing yield of 0.63. Changing the ancillary ligand in these complexes from a phosphine to an N-heterocyclic carbene changes the luminescence lifetime by a factor of three, the fluorescence quantum yield by a factor of two, and lowers the intersystem crossing efficiency by twenty-five percent. The combination of these lifetime and quantum yield results allow for the determination of the radiative (kr), non-radiative (knr), and intersystem crossing (kisc) rate constants. Predictably, the values of kr, knr, and kisc for AuBTF0 and AuBTF1 are equivalent. Intersystem crossing is the dominant kinetic pathway in AuBTF0 and AuBTF1 with a rate constant of $9 \times 10^9$ s$^{-1}$. This is an order of magnitude greater than the rate constants for radiative and non-radiative decay in these complexes. The kinetic behavior of AuBTF2 is remarkably different. Intersystem crossing is still the dominant kinetic pathway in this complex but its rate constant is a factor of four slower than in AuBTF0 and AuBTF1. Not only is the rate of intersystem crossing diminished in AuBTF2 but the magnitude of knr is also a factor of two smaller than in AuBTF0 and AuBTF1. The phosphorescence quantum yield is less sensitive to structural variations in these molecules, with nearly identical values of approximately 0.10. The combination of the diminished rates of intersystem crossing and nonradiative decay in AuBTF2 and the similar values for the phosphorescence quantum yields across the series of AuBTF complexes has direct implications on the white light emission behavior of these complexes. In AuBTF0 and AuBTF1, the fluorescence and phosphorescence quantum yields are equivalent; the resulting dual emission appears white. In AuBTF2, the fluorescence quantum yield is a factor of two larger than the phosphorescence quantum yield, and the resulting emission appears violet in color. This dramatic change in the luminescence color is demonstrated in the inset of FIG. 3 and CIE 1931 chromaticity diagram. Phosphorescence Lifetimes. Due to the efficient phosphorescence in these systems we were also able to collect phosphorescence lifetimes. The complexes all possess phosphorescence lifetimes on the order of 1 ms following three freeze-pump-thaw cycles in toluene. It should be noted that the observed lifetime is highly dependent upon the lowest vacuum pressure achieved during the freeze-pump-thaw deaeration cycles. Vacuum pressures of less than 100 mTorr are achieved using our evacuation set-up. This corresponds to oxygen concentrations of approximately 1 μmol. The Stern-Volmer relationship can be used to evaluate the magnitude of excited-state quenching under these conditions. The Stern-Volmer relationship is shown in Equation 1,72, (1) $\tau 0 \ \tau=1+kq\tau 0[Q]$ where $\tau 0$ is the freeze-pump-thaw deaerated lifetime of the complex, $\tau$ is the lifetime in the presence of oxygen, kq is the bimolecular quenching constant, [Q] is the concentration of dissolved oxygen in the solution. A vast majority of charge neutral organic molecules have kq values on the order of Page 13 of 69 Dalton Transactions 9 $1\times10^{10}$ and $1\times10^{9}$ $M^{-1}s^{-1}$. Evaluation of the Stern-Volmer equation using our experimentally observed phosphorescence lifetime values and estimated oxygen concentration values with bimolecular quenching constants of $1\times10^{10}$ and $1\times10^{9} M^{-1}s^{-1}$ return $\tau 0/\tau$ values of 11 and 2, respectively. This numerical treatment of these data accentuates the sensitivity of the solution lifetime values to the final pressure in the freeze-pump-thaw cell. It should further be noted that the lifetime value obtained in solution may not reflect the intrinsic lifetime of the chromophore but the maximum obtainable lifetime value at the given oxygen concentration, particularly for chromophores with very long triplet lifetimes. With this in mind, the lowest achieved vacuum pressure in the freeze-pump-thaw degassed cycles is recorded along with the reported phosphorescence lifetime. This vacuum pressure was replicated for all subsequent measurements where freeze-pump-thaw deaeration was utilized.

Nanosecond Transient Absorption Spectroscopy and Delayed Fluorescence

Figure 4:
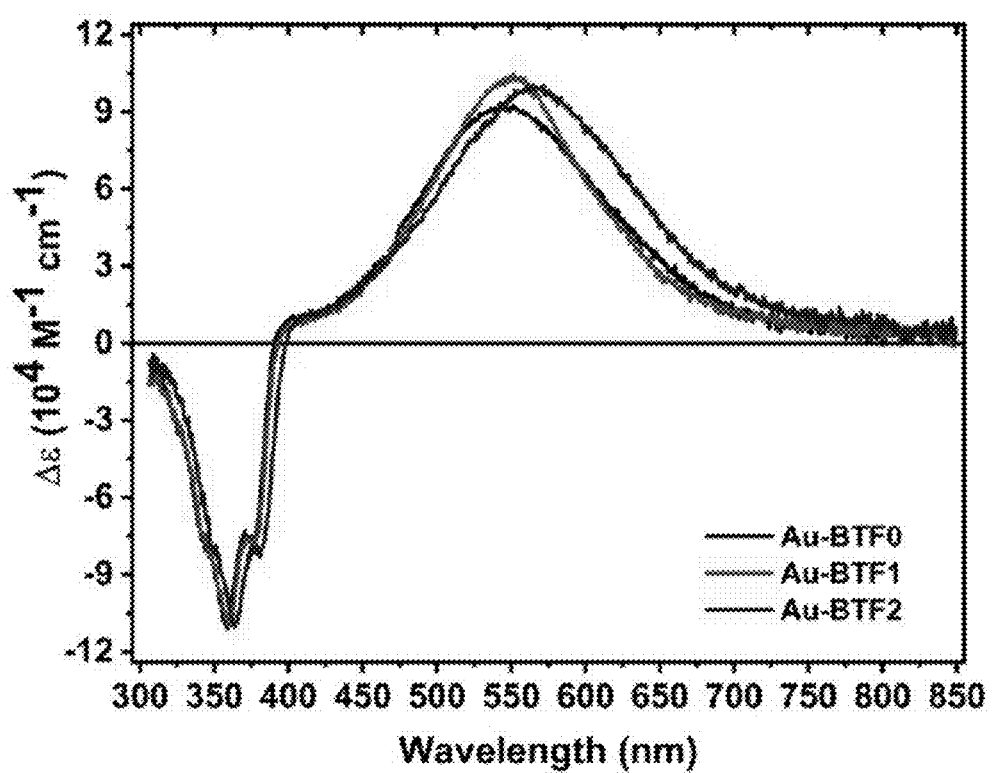
FIG. 4 illustrates nanosecond transient absorption difference spectra AuBTF0, AuBTF1, and AuBTF2 collected following three freeze-pump-thaw cycles in toluene. All samples were excited at 355 nm. The spectra were collected 100 ns after the laser pulse. Spectra were converted to units of Δε using relative actinometry measurements with a [Ru(bpy)$_3$]$^{2+}$ standard.

Nanosecond transient absorption difference spectra of all three complexes in units of $\Delta\varepsilon$ (the difference between the excited and ground-state extinction coefficients) vs. wavelength are shown in FIG. 4. The values of $\Delta\varepsilon$ for each of the chromophores are given in Table 1. The spectra were collected and converted from units of $\Delta OD$ to units of $\Delta\varepsilon$ using $[Ru(bpy)3]^{2+}$ as a relative actinometer. This method is described in detail in the Supporting Information. The nanosecond transient absorption spectra are characterized by a bleach of all of the ground-state absorption features below 400 nm with broad positive absorption from 400-800 nm. The maxima of the positive absorption features are slightly different for the three complexes. The observed maximum in the triplet-triplet absorption spectrum is similar for AuBTF0 and AuBTF1 but is slightly red-shifted for AuBTF2. The triplet states of all of the AuBTF complexes possess strong excited-state absorption; the excited-state extinction coefficients ( ) for all three molecules $\Delta\varepsilon T1-Tn$ are on the order of $1\times10^{5} \ M^{-1} \ cm^{-1}$. Initial kinetic decay traces were collected for the molecules at the maximum of the positive excited-state absorption feature. The data show that an increase in laser pulse energy results in an increase in the initial rate of excited-state decay. Delayed fluorescence is also observed in these complexes. This combination of laser-energy-dependent kinetic behavior and delayed fluorescence implies that triplet-triplet annihilation contributes to the deactivation of the triplet excited-states. To this end, the influence of incident laser pulse energy on the integrated delayed fluorescence intensity was explored. Plots of the delayed luminescence signal obtained at various incident laser pulse energies are shown in FIG. 13. The luminescence intensity at each laser power is normalized to the maximum of the phosphorescence signal in order to demonstrate the effect of variations in the laser pulse energy on the observed delayed fluorescence intensity. A plot of the normalized delayed fluorescence intensity vs. the incident laser pulse energy for AuBTF0 is shown in FIG. 5. The fit line represents the best quadratic fit of the data. The double logarithm plot of this data is shown in the inset. The slope of the linear fit of the log data is 1.69. The slope of this fit should be equal to 2 if the delayed fluorescence is the result of triplet-triplet annihilation. The corresponding data for AuBTF1 and AuBTF2 are shown in FIG. 14. Interestingly, the linear fits of the log plots for AuBTF1 and AuBTF2 also return slope values significantly less than 2 with values of 1.66 and 1.80, respectively. We believe this discrepancy between the observed and expected slope values to be due to the fast and efficient intersystem crossing in these AuBTF complexes discussed above. This causes the conversion of a significant number of the upconverted singlets back to the triplet state, resulting in a lower than expected integrated delayed fluorescence signal. This is supported by the fact that AuBTF0 and AuBTF1 (kisc~$9\times10^{9}$) have lower slope values than AuBTF2 (kisc~$2\times10^{9}$).

The rate constants for triplet-triplet annihilation (kTT) and can be determined by the fitting kinetic decay traces obtained from nanosecond transient absorption measurements following the conversion of the data from units of $\Delta OD$ to concentration. A detailed discussion of this process and the fit equation are provided in the ESI. Excited-state decay traces obtained from AuBTF0 in toluene at two different laser energies and the corresponding triplet-triplet annihilation fits are shown in FIG. 5. The residuals for the fits are displayed in the inset. The fits of excited-state decay traces for AuBTF1 and AuBTF2 are shown in FIG. 14. The values for kTT obtained from the representative fits of the decay traces are reported in Table 1. All of the datasets are fit well using this kinetic treatment. For all three chromophores, the rate constant for triplet-triplet annihilation is on the order of $1\times10^{10} \ M^{-1} \ s^{-1}$. This value approaches the diffusion limit in toluene73, signifying that triplet-triplet annihilation is a diffusion controlled process in these AuBTF complexes in toluene at room temperature.

Picosecond Transient Absorption Measurements

Figure 6:
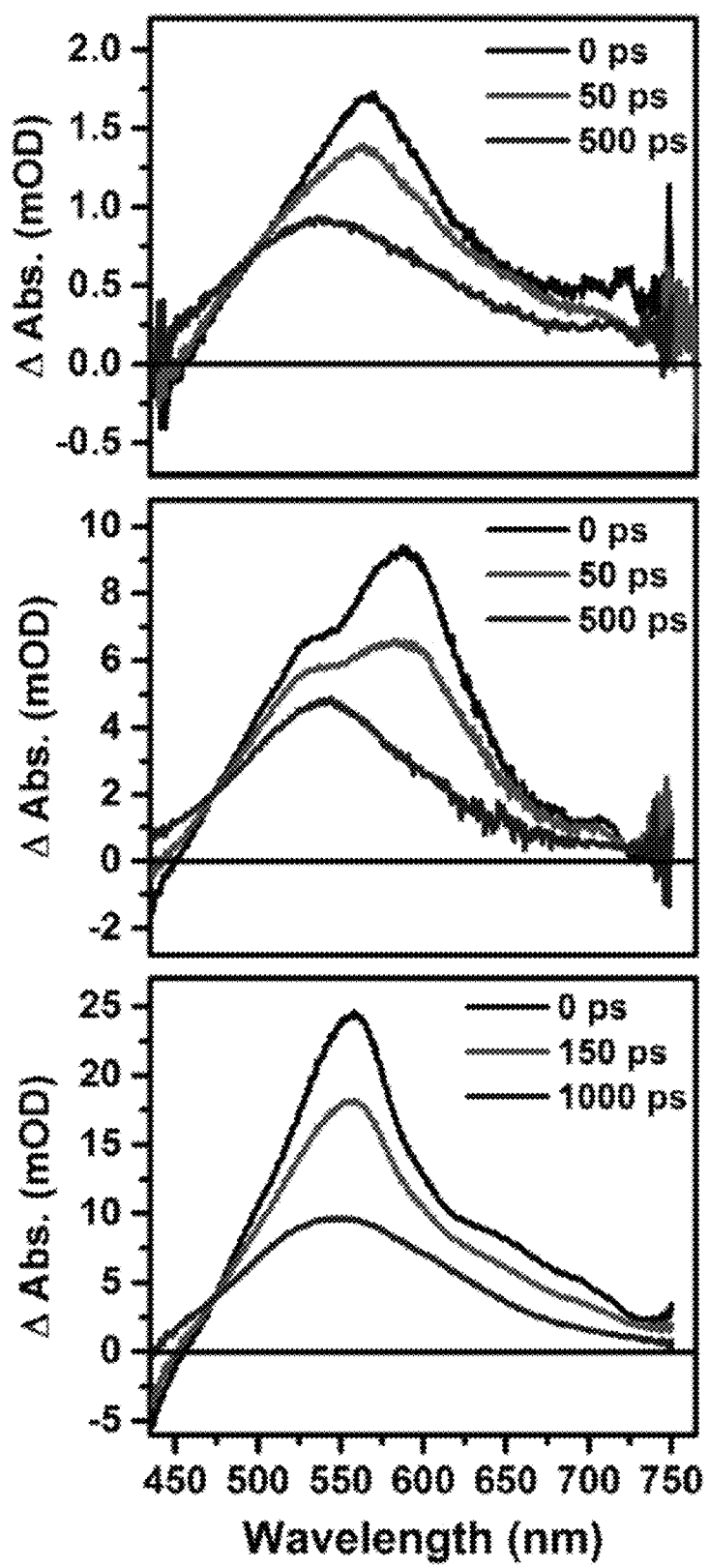
FIG. 6 illustrates picosecond transient absorption difference spectra collected at various time delays (see inset) for (top) AuBTF0, (middle) AuBTF1, and (bottom) AuBTF2 in aerated toluene. All samples were excited using the frequency doubled output of Ti:sapphire.

Picosecond transient absorption measurements were used to investigate the absorption properties of the singlet excited-state and the evolution from the singlet excited-state to the triplet excited-state. The picosecond transient absorption difference spectra of all three complexes are shown in FIG. 6. The singlet lifetime values obtained from these picosecond transient absorption experiments are presented in Table 1. The values given in Table 1 are the average of the lifetime at 10 unique wavelengths in the transient absorption spectrum using the Surface Xplorer software. The S1–Sn absorption transitions are represented by the 0 ps spectra and T1–Tn absorption transitions are represented by the 500 ps spectra for AuBTF0 and AuBTF1 and the 1000 ps spectrum for AuBTF2 in FIG. 6. The picosecond transient absorption spectra are dominated by positive transient absorption from 450-750 nm. The S1→Sn absorption transitions are particularly strong; their transient absorption signals are ≈ two times greater than the signal corresponding to the T1→Tn transitions. The previously determined values of $\Delta\varepsilon$T1–Tn and $\phi$TRIPLET allow for the determination of the singlet excited-state extinction coefficient ($\Delta\varepsilon$S1–Sn value. A) detailed discussion of this process is included in the Supporting Information. The calculated values are reported in Table 1. All three AuBTF complexes have $\Delta\varepsilon$S1–Sn values on the order of $1.5\times10^5$ M$^{-1}$ cm$^{-1}$. In all of the complexes, the progression from the singlet excited-state to the triplet excited-state is well-represented with a single exponential decay kinetic model and the presence of a single isosbestic point at ≈475 nm. There is no evidence of fast kinetic components corresponding to internal conversion (IC) or intramolecular vibrational energy redistribution (IVR). The lifetime values obtained from fits of the picosecond transient absorption kinetic decay traces are in good agreement with the fluorescence lifetime values obtained in TCSPC experiments.

Calculations

Density-functional theory calculations were performed to analyze the bonding and Franck-Condon excited states of AuBTF1 and AuBTF2. Geometries were fully optimized from the crystal structures of both compounds; harmonic vibrational frequency calculations revealed the converged structures to be minima of the potential energy hypersurfaces. Computed metrics are in good agreement with crystallographic values. All calculations proceeded with a continuum dielectric treatment of toluene solvation.

Figure 7A:
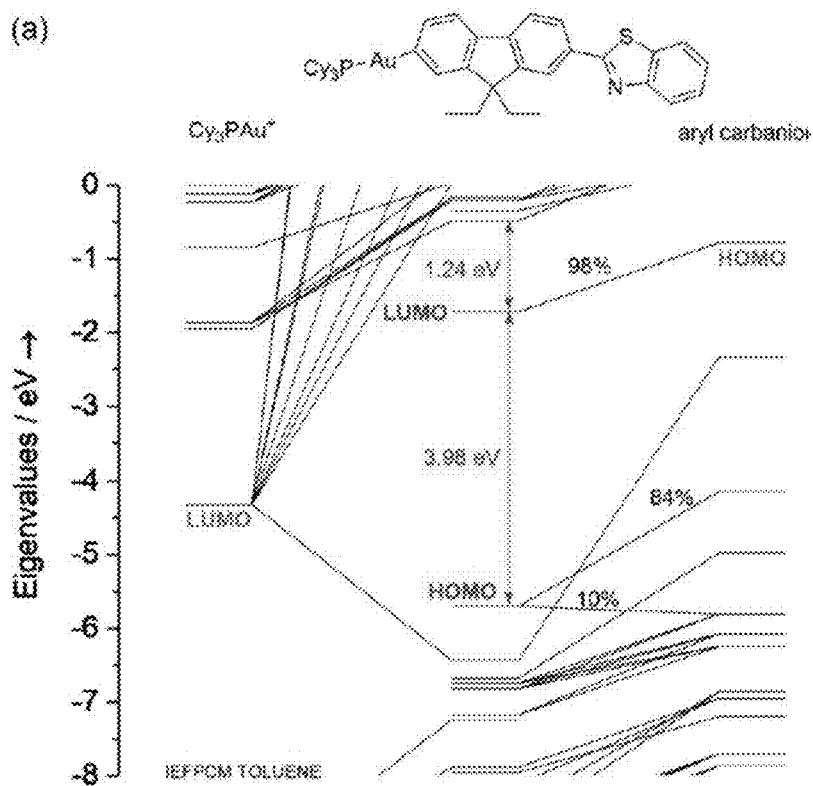
FIGS. 7(A-B) illustrate (A) frontier orbital energy level diagram of AuBTF1. (B) Plots of frontier Kohn-Sham orbitals (HOMO) and (LUMO) (Percentages are of electron density).
Figure 7B:
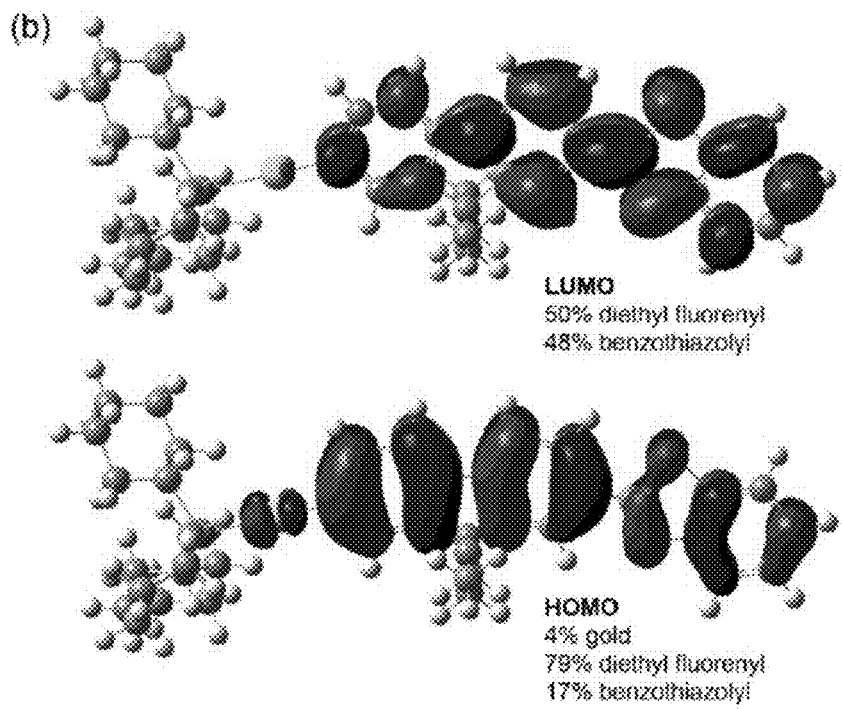

FIG. 7 depicts a frontier orbital energy level diagram of AuBTF1 along with plots of selected orbitals. The highest occupied Kohn-Sham orbital (HOMO) is localized primarily on the carbanionic ligand, with a small contribution from gold. The diethylfluorenyl moiety accounts for some 79% of electron density of the HOMO; the benzothiazolyl contributes 17%. Density in the lowest unoccupied Kohn-Sham orbital (LUMO) is 50% localized on the fluorenyl, with 48% on Transactions 17 the benzothiazolyl. The tricyclohexylphosphine ligand is optically innocent, and contributes 0.5% (of density) to both HOMO and LUMO.

Figure 8A:
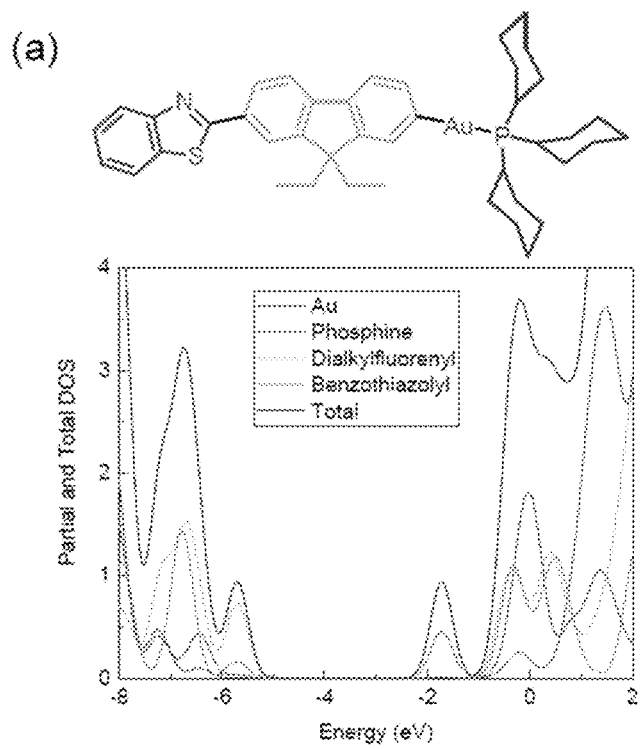
FIGS. 8(A-B) illustrate partial and total density-of-states plot for AuBTF1. (B) Partial and total density-of states plot for benzothiazole-2,7-fluorenyl ligand.
Figure 8B:
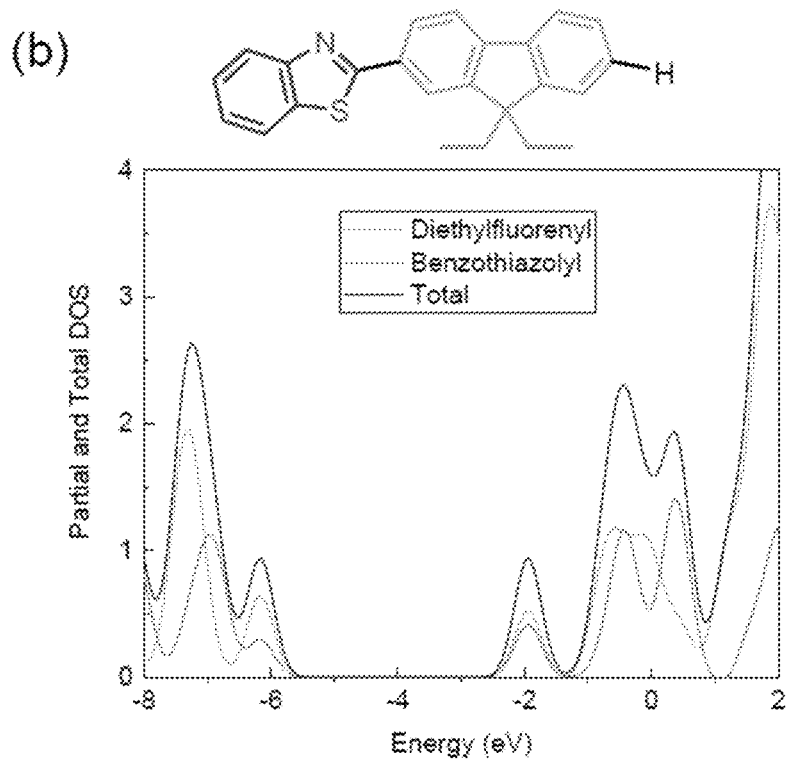

FIG. 8 depicts a density-of-states plot of AuBTF1 and that of the unmetallated arene. The figure shows contributions of gold, tricyclohexylphosphine, diethylfluorenyl, and benzothiazolyl moieties to the total density-of-states. Similar partitioning for the arene ligand (where a hydrogen atom replaces gold at carbon) is also shown. States attributable to the HOMO and LUMO derive almost wholly from the aryl ligand with little contribution from either the phosphine or gold. The LUMO is visibly separated from higher-energy orbitals, and the HOMO less so. Binding of the (phosphine) gold(I) fragment constricts the HOMO-LUMO gap: occupied orbitals are raised in energy, and vacant orbitals are lowered. Apart from this, the gross features of the ligand's density of states survive in the complex.

These results concur with our earlier observations that (organophosphine)- and (N-heterocyclic carbene)gold(I) fragments are spectators that lend spin-orbit coupling to conjugated systems to which they are σ-bonded. The carbon-gold bond itself is non-chromophoric.66, 68, 69, 75 This observation echoes earlier results by Schanze and co-workers, who found gold(I) alkynyls to have greater linear transparency than analogous alkynyls of platinum(II) .76, 77 Table I (Supplementary Information) collects results of time-dependent density-functional theory on the Franck-Condon singlet excited states of AuBTF1. The calculations include a continuum solvation model of toluene. The calculations find that the first excited singlet state derives (98%) from a LUMO←HOMO excitation. The calculated transition wavelengths are in fair agreement with the absorption onset near 360 nm, FIG. 2. Higher-lying singlet states are composed of multiple one-particle transitions that engage in configuration interaction.

Figure 9:
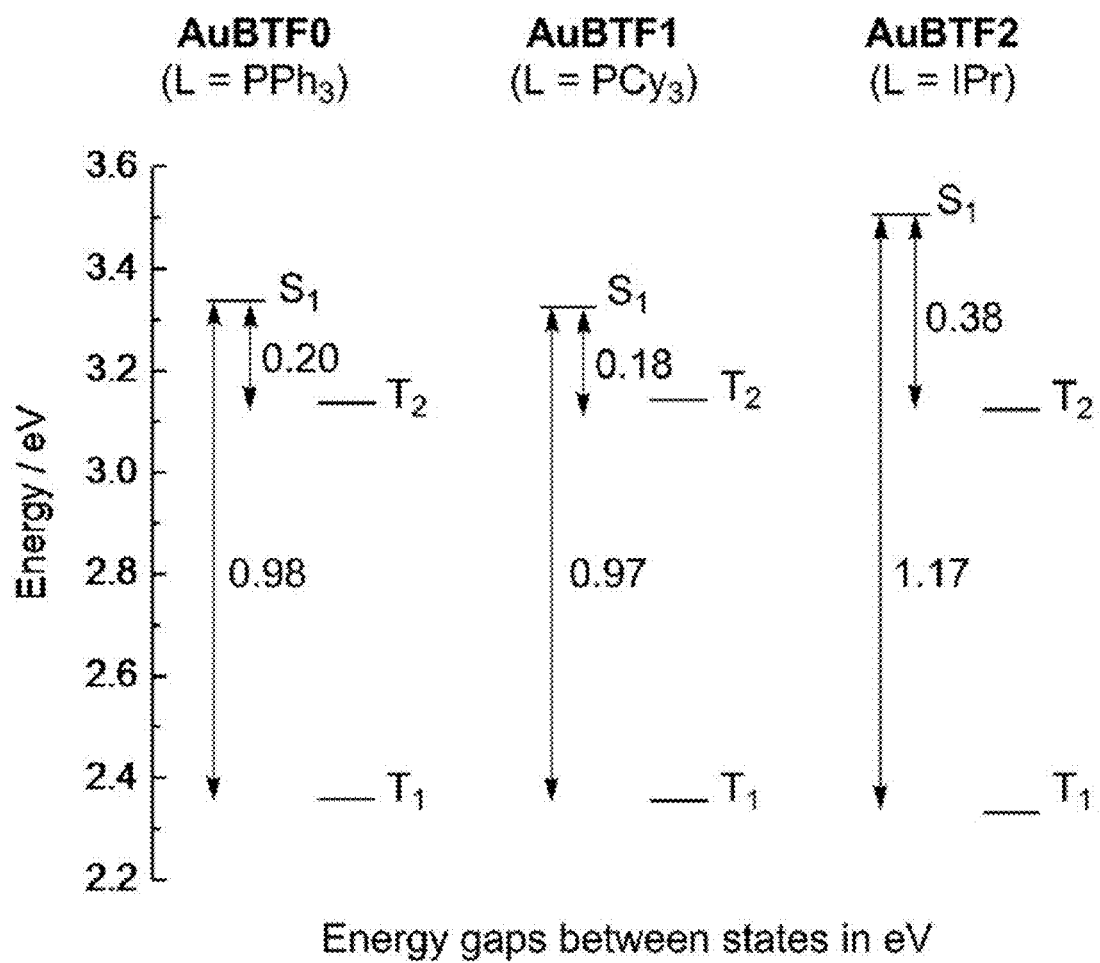
FIG. 9 illustrates time-dependent density-functional theory (TD-DFT) state plot showing S1, T1, and T2 states and their corresponding energies in electron volts (eV).

FIG. 9 shows a comparison of time-dependent density-functional theory (TD-DFT) state plots for all three compounds. These plots support the experimental results observed in which the phosphine complexes are more efficient at facilitating intersystem crossing than the carbene complex. Calculated energy gaps between the first singlet and nearest triplet state for the three compounds are consistent with faster intersystem crossing for the phosphine complexes. The carbene complex has what is essentially twice the energy gap between the S1 and T2 states when compared to the phosphine complexes. This is a feasible explanation for the enhanced intersystem crossing rate constants in the phosphine complexes compared to carbene complex. Photophysical experiments comparing the rates of intersystem crossing in other organogold (I) complexes while varying the ancillary ligand from an N-heterocyclic carbene to an organophosphine are on-going. These further experimental results will provide a more thorough understanding of the nature of intersystem crossing in organogold (I) complexes.

Example 2

This Example describes the synthesis, structural authentication, and optical characterization of dinuclear gold(I) complexes of benzothiazolyl-substituted fluorophores. Ancillary ligands on gold are organophosphines and an N-heterocyclic carbene.

Materials and Methods

All experimental procedures were carried out under an inert atmosphere of argon using standard Schlenk line techniques. All purchased chemicals were used as received without any further manipulation. Microanalyses (C, H, and N) were undertaken by Atlantic Microlab. Mass spectrometry was performed at the University of Cincinnati Mass Spectrometry facility. (Phosphine)gold(I) chlorides and (IMesNHC)AuCl were prepared according to literature procedures. BTF Dialkyne was synthesized according to a modified literature procedure that was referenced in the manuscript. Dry MeOH, dichloromethane, pentanes, diethyl ether, THF, DMF, 1.6 M n-butyl lithium in hexanes, KOH, diethyl bromide, Pd(dba)$_2$, CuI, PPh$_3$, Copper turnings were purchased from Sigma Aldrich. DMSO, tert-butanol, and sodium hydroxide were purchased from Fisher Scientific. Dibromofluorene was purchased from Accela. TMS-acetylene, triethylamine, and benzyl azide were purchased from Alfa Aesar. Tetrabutylammonium fluoride was purchased from TCI. 2-amino-5-bromobenzenethiol was purchased from AChemBlock. $^1$H NMR experiments were performed on a Bruker-500 Ascend Advanced III HD NMR spectrometer operating at 500.24 MHz. $^1$H chemical shifts are reported in parts per million (δ) with integration and multiplicity (s=singlet, d=doublet, t=triplet, q=quartet, dd=doublet of doublets, dt=doublet of triplets, td=triplet of doublets, ddd=doublet of doublet of doublets, and m=multiplet), measured from tetramethylsilane (0 ppm) and are referenced to residual solvent in CDCl$_3$ (7.26$_{31\ 1}$ ppm). P{H} NMR, chemical shifts were determined relative to concentrated H$_3$PO$_4$.

Instrumentation

A brief summary of the instrumentation and methodology used in this work follows. Thermogravimetric analysis of the gold complexes were carried out using a TA Q500. Samples were heated at a ramp rate of 10° C. min$^{-1}$ to a final temperature of 600° C. or 800° C. under constant nitrogen gas flow at a rate of 90 mL min$^{-1}$. A Cary 5000 UV-Vis spectrophotometer was used to obtain ground-state absorption spectra. Luminescence spectra and fluorescence lifetimes were obtained using an Edinburgh Instruments FLS980 spectrometer. Fluorescence lifetimes were excited at 404 nm and detected at the maximum fluorescence wavelength. The lifetimes were fit using an IRF reconvolution fit provided by the Edinburgh Instruments software. Fluorescence quantum yields were obtained using an integrating sphere in the FLS980.

Absolute Luminescence Quantum Yields

The excitation slits were set to 5 nm, and the emission slits were adjusted to obtain 1 million counts on the PMT detector, where the final achieved emission slit width was 0.26 nm. The samples were excited at 366 nm, and the luminescence signals were collected from 350-650 nm using a 0.3 nm step size averaging three times for each trial. The excitation signal was integrated from 385-650 nm for Au-DiBTF0 and Au-DiBTF1, from 390-650 nm for Au-DiBTF2, and from 400-650 nm for Au-DiBTF3. The fluorescence signal was integrated from where the toluene blank and the sample intersected to 650 nm. A dilute sample was also measured to correct for reabsorption, where the dilute sample was diluted by a factor of 10 and tail matched to the concentrated solution. The average of two trials are shown in FIG. 12.

Relative Quantum Yields

Singlet oxygen phosphorescence was used to determine triplet quantum yields by measuring the emission intensity due to energy transfer from the triplet state of the sample to the triplet state of oxygen which yields excited singlet oxygen that phosphoresces at 1275 nm. A discussion of relevant luminescence quantum yield standards[A] and detailed overview of the collection of relative quantum yield measurements[B] are summarized elsewhere. Phenazine (Φ$_A$=0.83) was used as the reference standard. The samples were absorbance matched in the ground state at the wavelengths noted in FIG. 14. Excitation and emission slit widths were set at 3.0 and 21.0 nm, respectively. The emission spectra were averaged 50 times using 1 nm steps and the results were integrated from 1250-1330 nm. The equation used to determine the singlet oxygen phosphorescence quantum yield value using a reference standard is given below in equation 1.

$$\Phi_{f,x} = \Phi_{f,std} \frac{F_x}{F_{std}} \frac{f_{std}(\lambda_{ex,std})}{f_x(\lambda_{ex,x})} \frac{\eta_x^2}{\eta_{std}^2} \quad (1)$$

Φ$_{f,std}$ is the luminescence quantum yield of the reference standard, F$_x$ and F$_{std}$ are the integrated luminescence intensity values obtained from the unknown and reference standard, f$_x$ (λ$_{ex,x}$) and f$_{std}$ (λ$_{ex,std}$) represent the fraction of light absorbed by the unknown and reference standard, and η$^2_x$ and η$^2_{std}$ are the indices of refraction for the solvents used to collect the luminescence spectra of the unknown and reference. The index of fraction correction is only applied in instances when the solvent used to collect the luminescence spectra of the unknown and reference differ.

Rate Constant Determinations

Following the determination of the fluorescence lifetime, fluorescence quantum yield, and the intersystem crossing quantum yield. All relevant rate constants can be determined by solving the series of following equations:

$$\tau_{FL} = \frac{1}{k_r + k_{nr} + k_{ISC}}$$

$$\phi_{FL} = \frac{k_r}{k_r + k_{nr} + k_{ISC}}$$

$$\phi_{TRIPLET} = \frac{k_{ISC}}{k_r + k_{nr} + k_{ISC}}$$

Synthesis, NMR, Mass Spectrometry, and Elemental Analysis 6-bromo-2-(7-bromo-9,9-diethyl-9H-fluoren-2-yl)benzo[d]thiazole

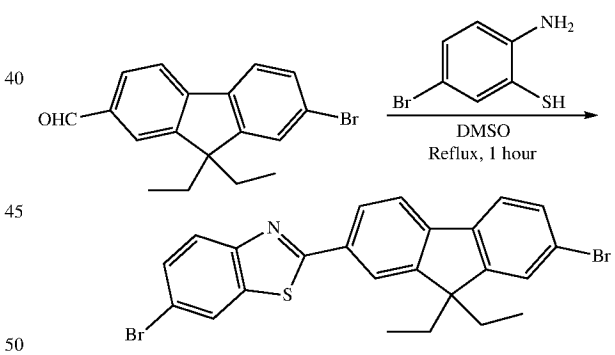

To a 100 mL flask equipped with a stir bar was added (2.00 g, 6.08 mmol) of aldehyde, and (1.54 g, 7.60 mmol) of 2-amino-5-bromobenzenethiol. DMSO (20 mL) was then added and a reflux condenser was attached. The vessel was allowed to heat at 195° C. for 1 hour (behind a blast shield). The mixture was then poured into DI water yielding a gray suspension. This suspension was then filtered under vacuum to yield the crude product as a dark gray solid. Purification via flash column chromatography was performed. Hexanes was used to elute the starting material and 7:3 DCM:Hexanes was used to elute the product as a white solid. (2.80 g, 90% yield). $^1$H NMR (500 MHz, Chloroform-d) δ 8.09-8.04 (m, 2H), 8.03-7.99 (m, 1H), 7.93 (d, J=8.6 Hz, 1H), 7.77 (d, J=7.9 Hz, 1H), 7.64-7.58 (m, 2H), 7.52-7.48 (m, 2H), 2.19-2.14 (m, 2H), 2.07 (dd, J=13.8, 7.2 Hz, 2H), 0.35 (t, J=7.3 Hz, 6H).

2-(9,9-diethyl-7-((trimethylsilyl)ethynyl)-9H-fluoren-2-yl) ((trimethylsilyl)ethynyl) benzo [d]thiazole

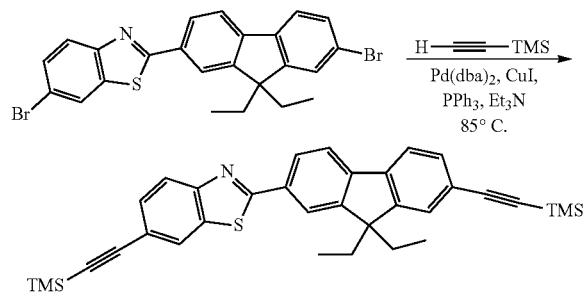

To a flame-dried 50 mL round bottom flask equipped with a stir bar was added (200 mg, 0.390 mmol) of dibromo species, (8.9 mg, 0.0156 mmol) of palladium source, (8.2 mg, 0.0312 mmol) of triphenylphosphine, and (3.0 mg, 0.0156 mmol) of copper(I) iodide. A reflux condenser was then added and the system was purged with argon for 20 min. 10 mL of triethyl amine (which was deareated by three freeze-pump-thaw cycles) was then cannulated into the flask containing all other reactants. (0.162 mL, 1.17 mmol) of TMS acetylene was quickly added to the flask via syringe. The flask was then heated at 85° C. for 48 h. The contents were then concentrated on a roto-evaporator. Dichloromethane was then added and the suspension was filtered over a silica plug to yield a red/orange solution. The crude mixture was purified by flash column chromatography using 7:3 DCM:Hexanes as an eluent to afford product as an off-white solid (202 mg, 95% Yield). $^1$H NMR (500 MHz, Chloroform-d) δ 8.09 (s, 1H), 8.04-8.01 (m, 2H), 7.98 (d, J=8.4 Hz, 1H), 7.77 (d, J=7.9 Hz, 1H), 7.69 (d, J=7.8 Hz, 1H), 7.58 (d, J=9.6 Hz, 1H), 7.52-7.46 (m, 2H), 2.15 (dd, J=13.8, 7.2 Hz, 2H), 2.08 (dd, J=13.8, 7.2 Hz, 2H), 0.31 (t, J=7.4 Hz, 6H), 0.29 (s, 9H), 0.28 (s, 9H).

2-(9,9-diethyl-7-ethynyl-9H-fluoren-2-yl)-6-ethynyl-benzo[d]thiazole

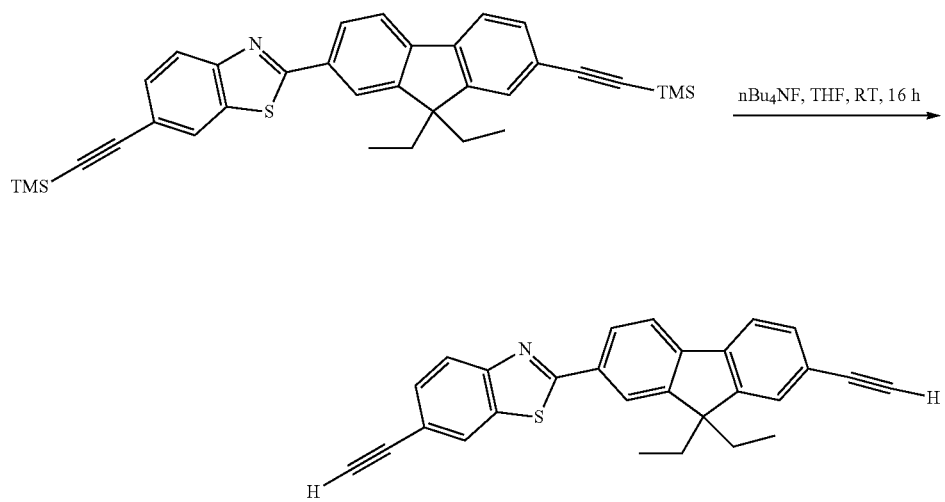

To a 25 mL round bottom flask equipped with a stir bar was added (174 mg, 0.318 mmol) of dialkyne. 10 mL of THF was then added creating an orange solution. (186 mg, 0.796 mmol) of tetrabutyl ammonium fluoride was then added and the solution turned wine red almost immediately. This solution was allowed to stir overnight. The solution was then concentrated on a roto-evaporator and purified by flash column chromatography using 9:1 DCM: Hexanes as an eluent to yield an orange solid (129 mg, 81% yield). $^1$H NMR (500 MHz, Chloroform-d) δ 8.11 (s, 1H), 8.07-8.04 (m, 1H), 8.04-7.99 (m, 2H), 7.80 (d, J=7.9 Hz, 1H), 7.72 (d, J=7.8 Hz, 1H), 7.63-7.59 (m, 1H), 7.54-7.49 (m, 2H), 3.17 (s, 2H), 2.19-2.08 (m, 4H), 0.34 (t, J=7.3 Hz, 6H).

Au-DiBTF0

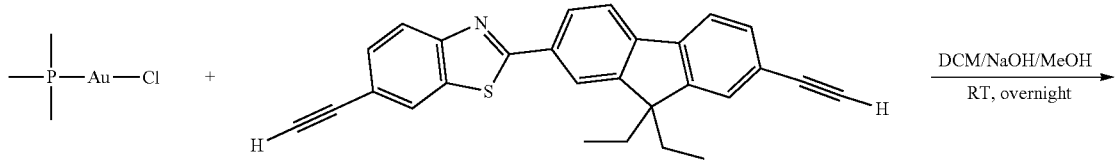

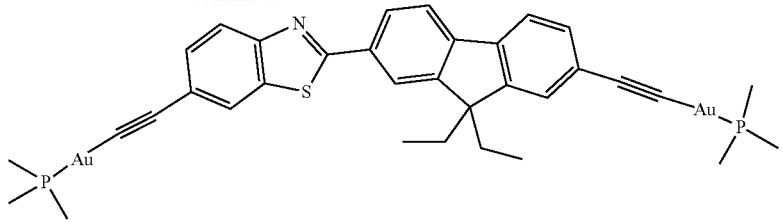

BTF Dialkyne ligand (65.8 mg, 0.163 mmol) was added to a flame-dried 25 mL round bottom flask equipped with a stir bar. After purging with argon for 20 minutes, 10 mL of dry dichloromethane was added. Then, NaOMe (6 mL, 1.63 mmol) (prepared from dissolving 42.7 mg of NaOH in 25 mL dry MeOH) was added and the solution was allowed to stir for 15 min. To a separate 50 mL flask that was flame-dried and equipped with a stir bar was added (100 mg, 0.326 mmol) of PMe$_3$AuCl, the flask was then purged with argon for 20 minutes. After 20 minutes, 2 mL of dry MeOH was added. The basic solution was then added dropwise to the suspension of Me$_3$PAuCl while stirring. After complete addition, the contents were allowed to stir at RT for 16 h. The mixture was then concentrated on a roto-evaporator, dissolved in DCM and passed through a Celite plug. This orange-ish solution was then concentrated to dryness. Analytically pure material was obtained through either washing with copious amounts of pentanes/diethyl ether, or by vapor diffusion of diethyl ether into a concentrated dichloromethane solution (82 mg, 53% Yield). $^1$H NMR (500 MHz, Chloroform-d) δ 8.05 (s, 1H), 8.00-7.95 (m, 2H), 7.91 (d, J=8.5 Hz, 1H), 7.72 (d, J=8.0 Hz, 1H), 7.63 (s, 1H), 7.57 (d, J=8.5 Hz, 1H), 7.50-7.45 (m, 2H), 2.07 (ddt, J=28.6, 13.6, 7.1 Hz, 4H), 1.55 (s, 9H), 1.53 (s, 9H), 0.31 (t, J=7.3 Hz, 6H). $^{31}$P NMR (202 MHz, CDCl$_3$) δ 0.09, 0.00. HRMS (FT-ICR, [M+H]$^+$) m/z calcd for MH$^+$ C$_{34}$H$_{38}$NP$_2$SAu$_2^+$, 948.15257 found 948.15257. Anal. Calcd for: C$_{34}$H$_{37}$Au$_2$NP$_2$S: C, (43.09); H, (3.94); N, (1.48). Found: C, (43.34); H, (4.08); N, (1.37).
Au-DiBTF1

BTF Dialkyne ligand (49.3 mg, 0.122 mmol) was added to a flame-dried 25 mL round bottom flask equipped with a stir bar. After purging with argon for 20 minutes, 10 mL of dry dichloromethane was added. Then, NaOMe (6 mL, 1.63 mmol) (prepared from dissolving 42.7 mg of NaOH in 25 mL dry MeOH) was added and the solution was allowed to stir for 15 min. To a separate 50 mL flask that was flame-dried and equipped with a stir bar was added (83.6 mg, 0.163 mmol) of Cy$_3$PAuCl, the flask was then purged with argon for 20 minutes. After 20 minutes, 2 mL of dry MeOH was added. The basic solution was then added dropwise to the suspension of Cy$_3$PAuCl while stirring. After complete addition, the contents were allowed to stir at RT for 16 h. The mixture was then concentrated on a roto-evaporator, dissolved in DCM and passed through a Celite plug. This orange-ish solution was then concentrated to dryness. Analytically pure material was obtained through either washing with copious amounts of pentanes/diethyl ether, or by vapor diffusion of diethyl ether into a concentration dichloromethane solution (100 mg, 60% Yield). $^1$H NMR (500 MHz, Chloroform-d) δ 8.02 (d, J=14.0 Hz, 2H), 7.99-7.95 (m, 1H), 7.90 (d, J=8.5 Hz, 1H), 7.71 (d, J=8.0 Hz, 1H), 7.63-7.58 (m, 2H), 7.53-7.48 (m, 2H), 2.10-1.97 (m, 22H), 1.86 (d, J=7.9 Hz, 12H), 1.74 (s, 6H), 1.50 (d, J=11.4 Hz, 11H), 1.28 (p, J=13.9, 13.3 Hz, 19H), 0.29 (t, J=7.3 Hz, 6H). $^{31}$P NMR (202 MHz, CDCl3) δ 56.40, 56.32. HRMS (FT-ICR, [M+H]$^+$) m/z calcd for MH$^+$ C$_{64}$H$_{86}$NP$_2$SAu$_2$, 1356.52818 found 1356.53847. Anal. Calcd for: C$_{64}$H$_{85}$Au$_2$NP$_2$S: C, (56.68); H, (6.32); N, (1.03).
Found: C, (56.63); H, (6.34); N, (1.17).

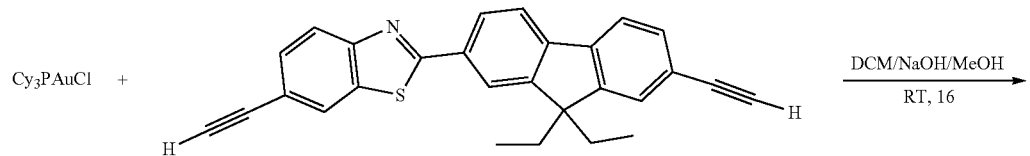

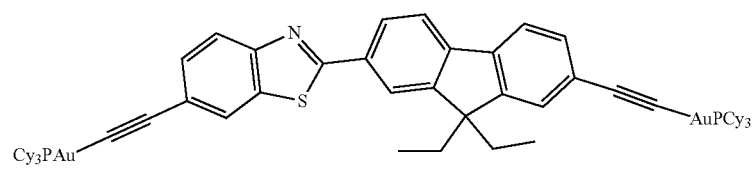

Au-DiBTF2:

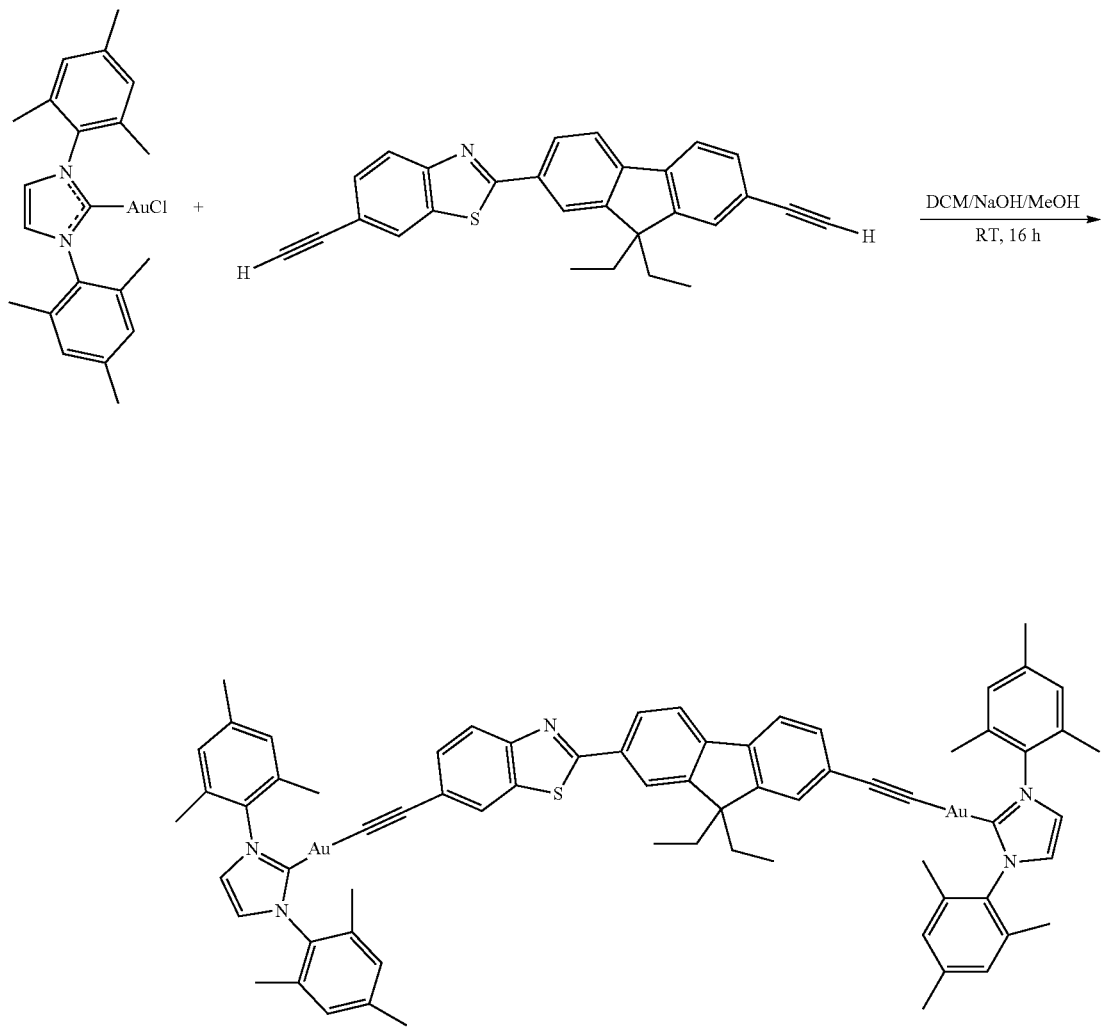

BTF Dialkyne ligand (65.8 mg, 0.163 mmol) was added to a flame-dried 25 mL round bottom flask equipped with a stir bar. After purging with argon for 20 minutes, 10 mL of dry dichloromethane was added. Then, NaOMe (6 mL, 1.63 mmol) (prepared from dissolving 42.7 mg of NaOH in 25 mL dry MeOH) was added and the solution was allowed to stir for 15 min. To a separate 50 mL flask that was flame-dried and equipped with a stir bar was added (175 mg, 0.326 mmol) of IMesAuCl, the flask was then purged with argon for 20 minutes. After 20 minutes, 2 mL of dry MeOH was added. The basic solution was then added dropwise to the suspension of IMesAuCl while stirring. After complete addition, the contents were allowed to stir at RT for 16 h. The mixture was then concentrated on a roto-evaporator, dissolved in DCM and passed through a Celite plug. This yellow-ish solution was then concentrated to dryness. Analytically pure material was obtained through either washing with copious amounts of pentanes/diethyl ether, or by vapor diffusion of diethyl ether into a concentration dichloromethane solution (185 mg, 81% yield). $^1$H NMR (500 MHz, Chloroform-d) δ 7.95 (s, 1H), 7.90 (d, J=8.0 Hz, 1H), 7.84 (s, 1H), 7.79 (d, J=8.6 Hz, 1H), 7.62 (d, J=8.0 Hz, 1H), 7.50 (d, J=7.9 Hz, 1H), 7.43 (d, J=10.0 Hz, 1H), 7.34 (d, J=10.2 Hz, 2H), 7.07 (d, J=1.7 Hz, 4H), 6.99 (s, 8H), 2.35 (s, 12H), 2.13 (s, 24H), 2.05-2.00 (m, 2H), 1.96-1.92 (m, 2H), 0.19 (t, J=7.3 Hz, 6H). HRMS (FT-ICR, [M+H]$^+$) m/z calcd for MH$^+$ C$_{70}$H$_{68}$N$_5$SAu$_2{}^+$ 1404.45178 found 1404.45210. Anal. Calcd for:C$_{74}$H$_{67}$Au$_2$N$_5$S: C, (59.87); H, (4.81); N, (4.99). Found: C, (59.86); H, (4.98); N, (5.07).

Au-DiBTF3

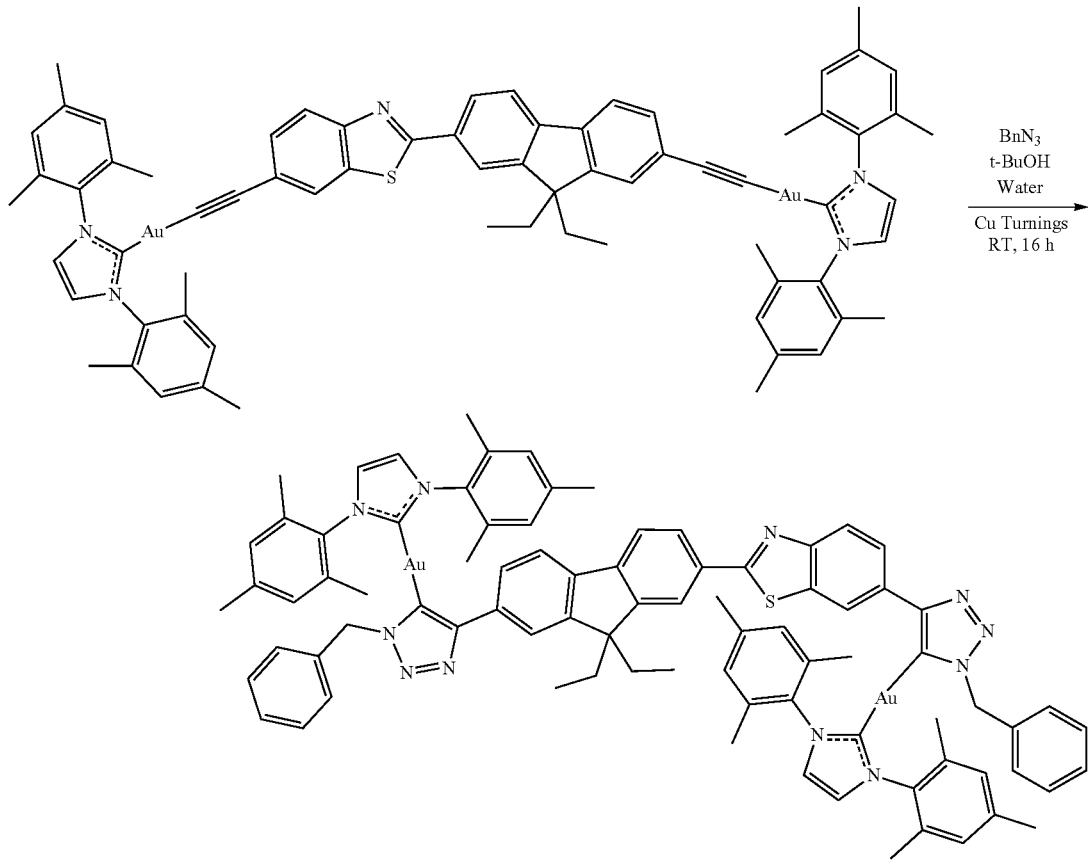

To a 50 mL flask equipped with a stir bar was added (89 mg, 0.064 mmol) of Au-DiBTF2. 10 mL of tert-butanol was then added along with 5.0 mL of DI water. (0.516 mL, 0.362 mmol) of benzyl azide was then added dropwise and allowed to stir for 5 min. An excess of copper turnings (around 4 times the stoichiometry of the starting material) was then added and the suspension was allowed to stir overnight. After 16 h, DCM was added and an extraction was performed twice. These extracts were dried over magnesium sulfate and filtered. Concentration in vacuo yielded a tan solid which was washed with pentanes and dried. The compound was purified by slow diffusion of pentanes into a concentrated solution of dichloromethane to yield tan crystals (78 mg, 73% Yield). $^1$H NMR (500 MHz, Chloroform-d) δ 8.58 (s, 1H), 8.18 (s, 1H), 8.09 (s, 1H), 8.07-8.04 (m, 1H), 7.99 (d, J=8.5 Hz, 1H), 7.87 (d, J=8.0 Hz, 1H), 7.73 (dd, J=20.5, 8.2 Hz, 3H), 7.17 (dd, J=14.3, 4.5 Hz, 12H), 7.03 (s, 10H), 5.15 (s, 2H), 5.11 (s, 2H), 2.40 (s, 6H), 2.37 (s, 6H), 2.17-2.11 (m, 28H), 0.31 (t, J=7.3 Hz, 6H). HRMS (FT-ICR, [M+H]$^+$) m/z calcd for MH$^+$ $C_{84}H_{82}N_{11}SAu_2^+$, 1671.58345 found 1671.58275. Anal. Calcd for: $C_{84}H_{81}N_{11}SAu_2$: C, (60.39); H, (4.89); N, (9.22). Found: C, (60.27); H, (4.88); N, (9.34).

Calculations

Spin-restricted static and time-dependent density-functional theory computations proceeded in Gaussian16 rev. A.03. Model complexes were calculated for computational tractability. Fluorenyl ethyl groups and carbene mesityls were modeled as methyl, as were triazolyl benzyls. Geometries were optimized without constraint with the 6-31G(d) basis set for nonmetal atoms and the Stuttgart-Dresden effective core potential and basis set for Au. Final single-point calculations employed the exchange and correlation functionals of Perdew, Burke, and Ernzerhof (PBE0), and the TZVP basis set of Godbelt, Andzelm, and co-workers for nonmetals. For metal atoms, the Stuttgart-Dresden effective core potential and basis set were used; scalar relativistic effects are included implicitly. Continuum solvation in toluene was imposed using the integral equation formalism of the polarizable continuum model. Population analyses were performed with the AOMix-CDA program of Gorelsky. Calculations of Franck-Condon triplet excited states proceeded at the optimized ground-state geometries, and are spin-unrestricted.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, the following is claimed:

1. A compound comprising:
   Au(I) complexed with a benzothiazolyl-substituted fluorophore, wherein the benzothiazolyl-substituted fluorophore is bound to the Au(I) through a Au—C σ-bond.

2. The compound of claim 1, wherein the benzothiazolyl-substituted fluorophore comprises a benzothiazole-fluorenyl moiety.

3. The compound of claim 1, further comprising an organophosphine ligand or an N-heterocyclic carbene ligand.

4. The compound of claim 1, having a formula of:

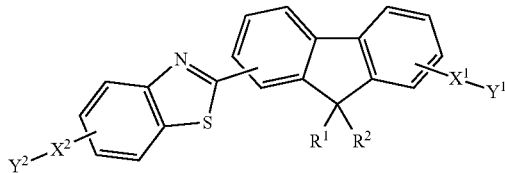

wherein:
- $R^1$ and $R^2$ are each independently H, an alkyl, haloalkyl, cycloalkyl, alkylene-cycloalkyl, aryl, heteroaryl, alkylene-alkoxy, heterocyclyl, or alkylene-heterocyclyl;
- $X^1$ and $X^2$ are each independently absent or a linker that includes an alkylene, alkenylene, or alkynylene group;
- $Y^1$ and $Y^2$ are each independently absent or Au(I) linked to an organophosphine ligand or an N-heterocyclic carbene ligand; and
- at least one of $Y^1$ and $Y^2$ is Au(I) linked to the organophosphine ligand or Au(I) linked to the N-heterocyclic carbene ligand.

5. The compound of claim 4, wherein $R^1$ and $R^2$ are each independently a $C^1$-$C^6$ alkyl.

6. The compound of claim 4, wherein $X^1$ and $X^2$ and $Y^2$ are absent and $Y^1$ is Au(I) linked to the organophosphine ligand or Au(I) linked to the N-heterocyclic carbene ligand.

7. The compound of claim 4, wherein $X^1$ and $X^2$ each independently include an alkylene, alkenylene, or alkenylene group and $Y^1$ and $Y^2$ are each independently Au(I) linked to the organophosphine ligand or Au(I) linked to the N-heterocyclic carbene ligand.

8. The compound of claim 1, selected from the group consisting of:

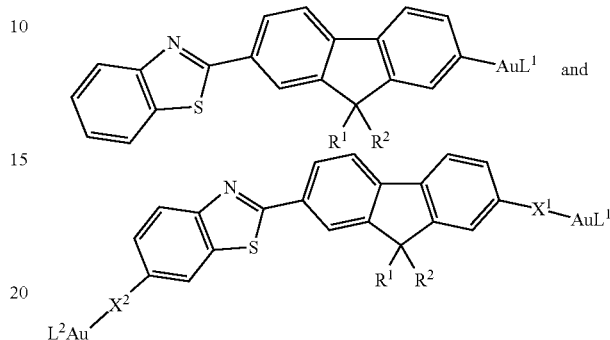

wherein $R^1$ and $R^2$ are each independently H, an alkyl, haloalkyl, cycloalkyl, aryl, heteroaryl, alkylene-cycloalkyl, alkylene-alkoxy, heterocyclyl, or alkylene-heterocyclyl;
$X^1$ and $X^2$ are each independently a linker that includes an alkylene, alkenylene, or alkynylene group; and
$L^1$ and $L^2$ are each independently an organophosphine ligand or an N-heterocyclic carbene ligand.

9. The compound of claim 1, selected from the group consisting of:

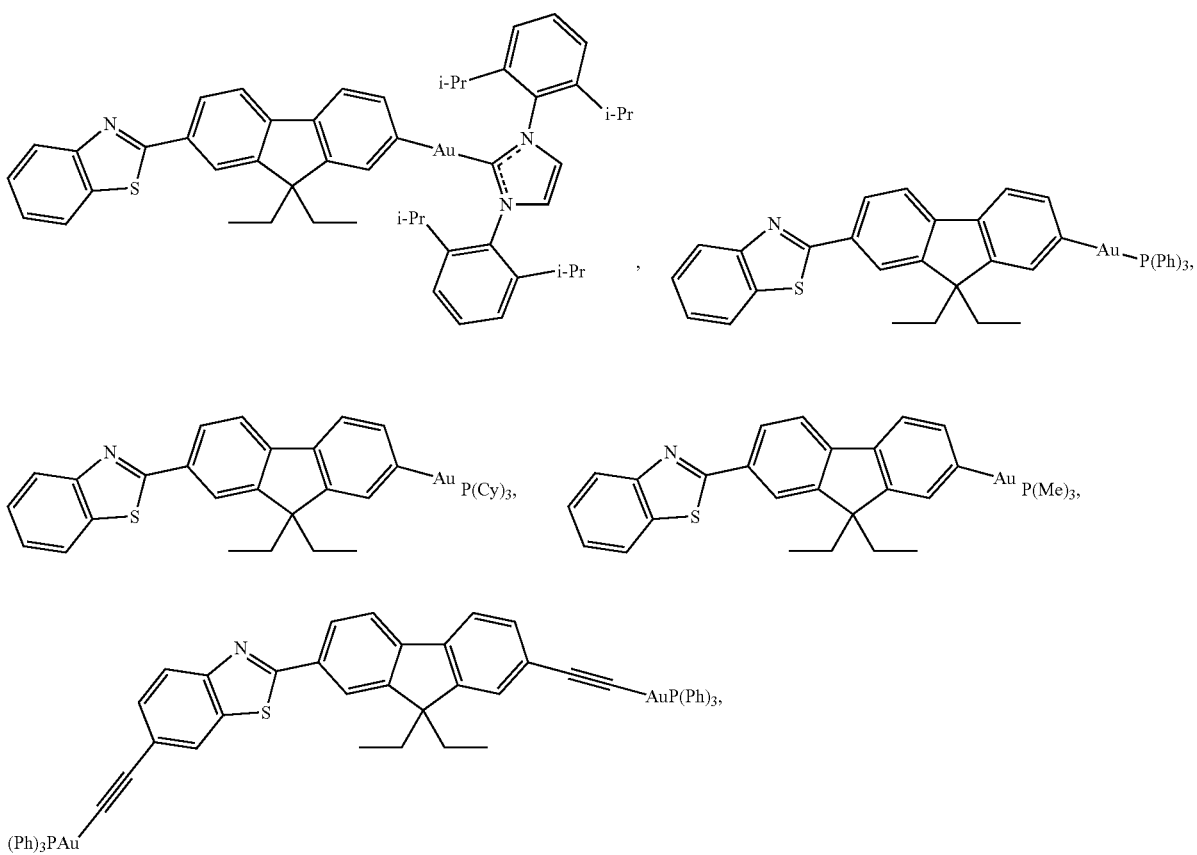

-continued
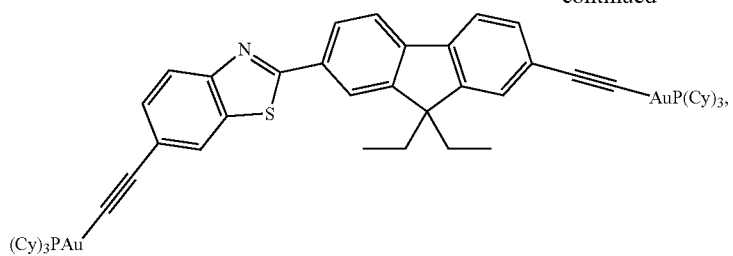
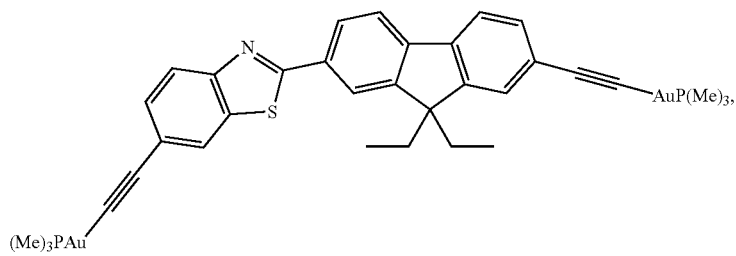
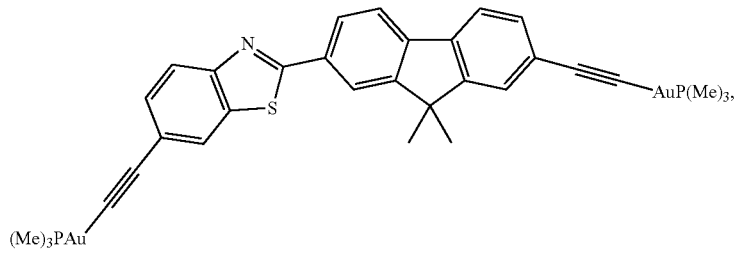
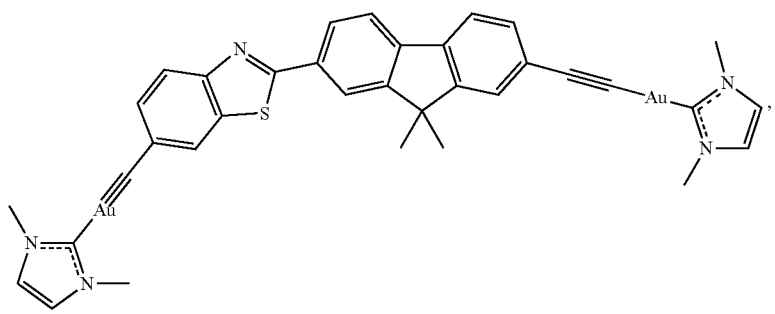
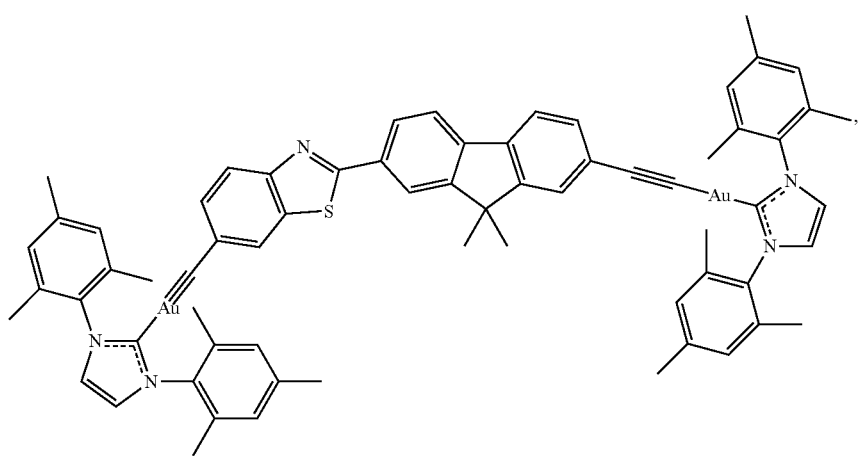

-continued

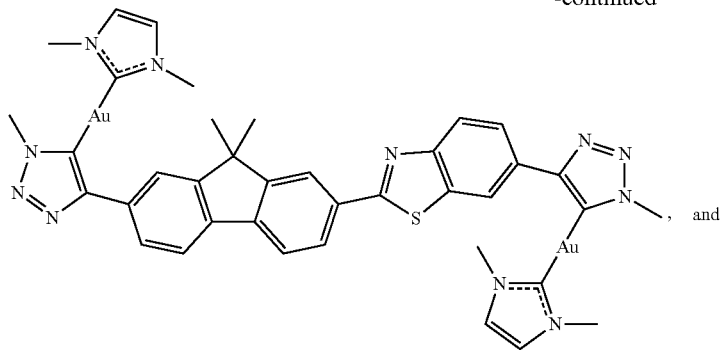

, and

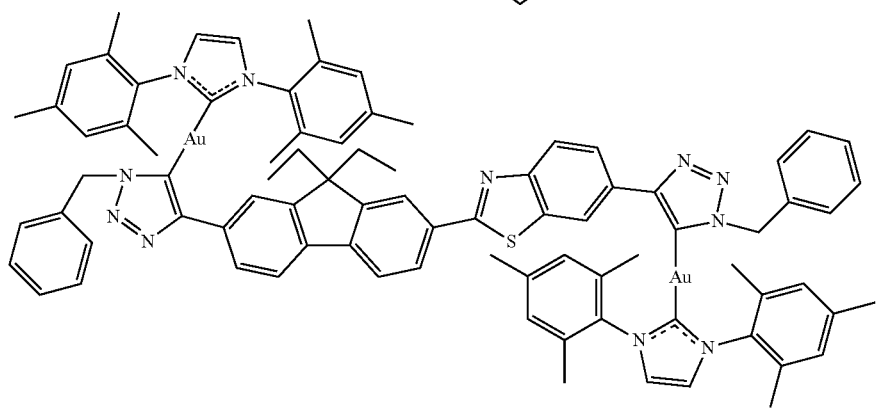

.

10. A single molecule light emitter, comprising:
a complex exhibiting non-excimeric state light emission, the complex including Au(I) complexed with a benzothiazolyl-substituted fluorophore, wherein the benzothiazolyl-substituted fluorophore is bound to the Au(I) through a Au—C σ-bond.

11. The emitter of claim 10, wherein the benzothiazolyl-substituted fluorophore comprises a benzothiazole-fluorenyl moiety.

12. The emitter of claim 10, further comprising an organophosphine ligand or an N-heterocyclic carbene ligand.

13. The emitter of claim 10, having a formula of:

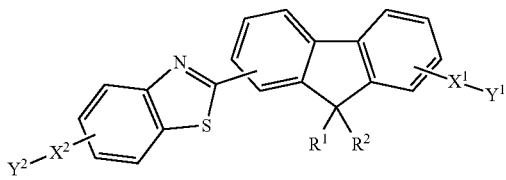

wherein:
$R^1$ and $R^2$ are each independently H, an alkyl, haloalkyl, cycloalkyl, aryl, heteroaryl, alkylene-cycloalkyl, alkylene-alkoxy, heterocyclyl, or alkylene-heterocyclyl;
$X^1$ and $X^2$ are each independently absent or a linker that includes an alkylene, alkenylene, or alkynylene group;
$Y^1$ and $Y^2$ are each independently absent or Au(I) linked to an organophosphine ligand or an N-heterocyclic carbene ligand; and
at least one of $Y^1$ and $Y^2$ is Au(I) linked to the organophosphine ligand or Au(I) linked to the N-heterocyclic carbene ligand.

14. The emitter of claim 13, wherein $R^1$ and $R^2$ are each independently a $C^1$-$C^6$ alkyl.

15. The compound of claim 13, wherein $X^1$ and $X^2$ and $Y^2$ are absent and $Y^1$ is Au(I) linked to the organophosphine ligand or Au(I) linked to the N-heterocyclic carbene ligand.

16. The emitter of claim 13, wherein $X^1$ and $X^2$ each independently include an alkylene, alkenylene, or alkenylene group and $Y^1$ and $Y^2$ are each independently Au(I) linked to the organophosphine ligand or Au(I) linked to the N-heterocyclic carbene ligand.

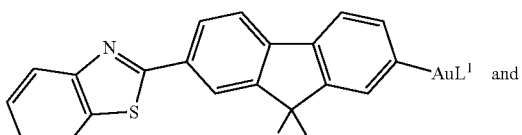

wherein $R^1$ and $R^2$ are each independently H, an alkyl, haloalkyl, cycloalkyl, aryl, heteroaryl, alkylene-cycloalkyl, alkylene-alkoxy, heterocyclyl, or alkylene-heterocyclyl;
$X^1$ and $X^2$ are each independently a linker that includes an alkylene, alkenylene, or alkynylene group; and $L^1$ and $L^2$ are each independently an organophosphine ligand or an N-heterocyclic carbene ligand.
18. The emitter of claim 10, selected from the group consisting of:
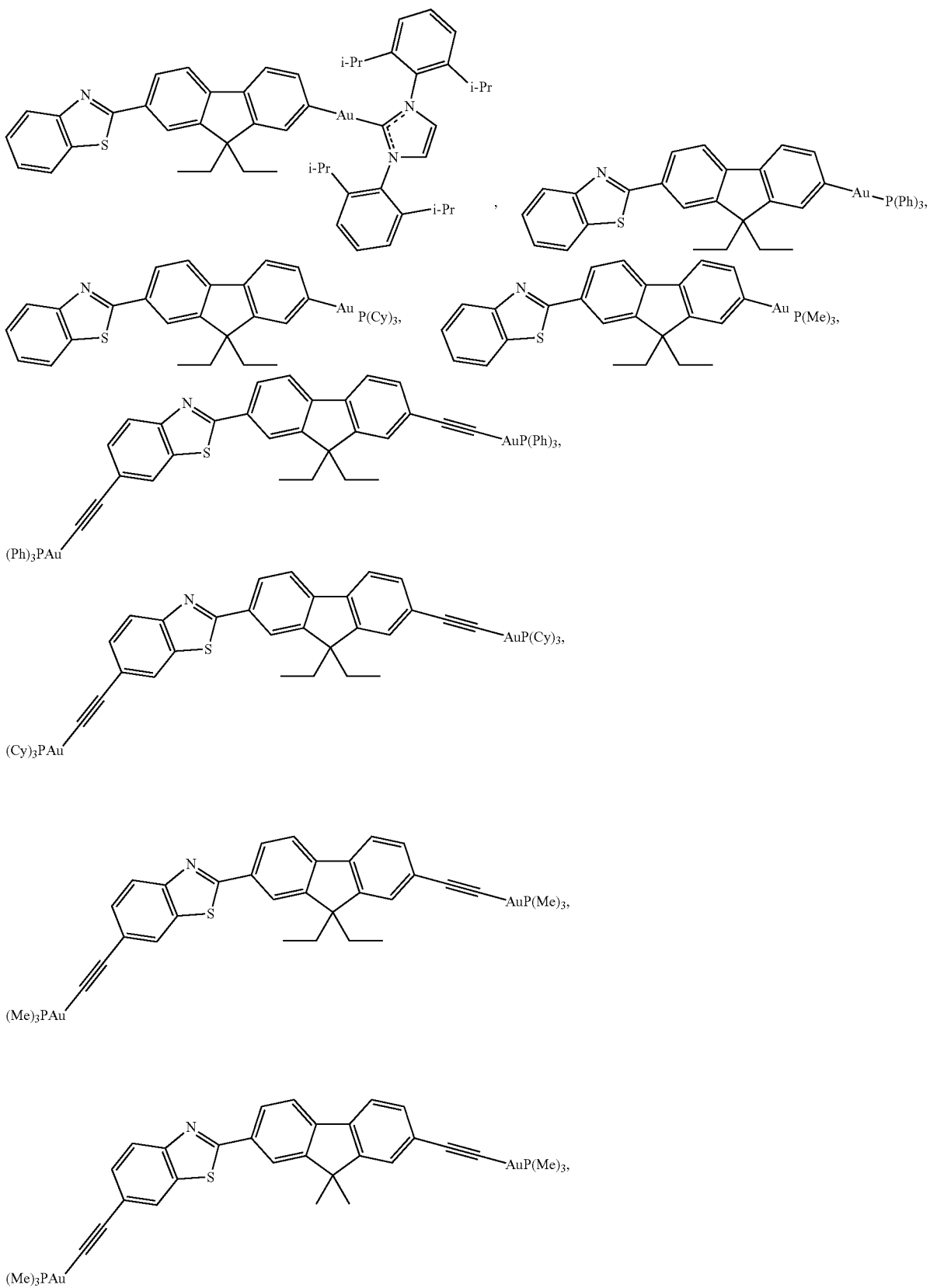

-continued
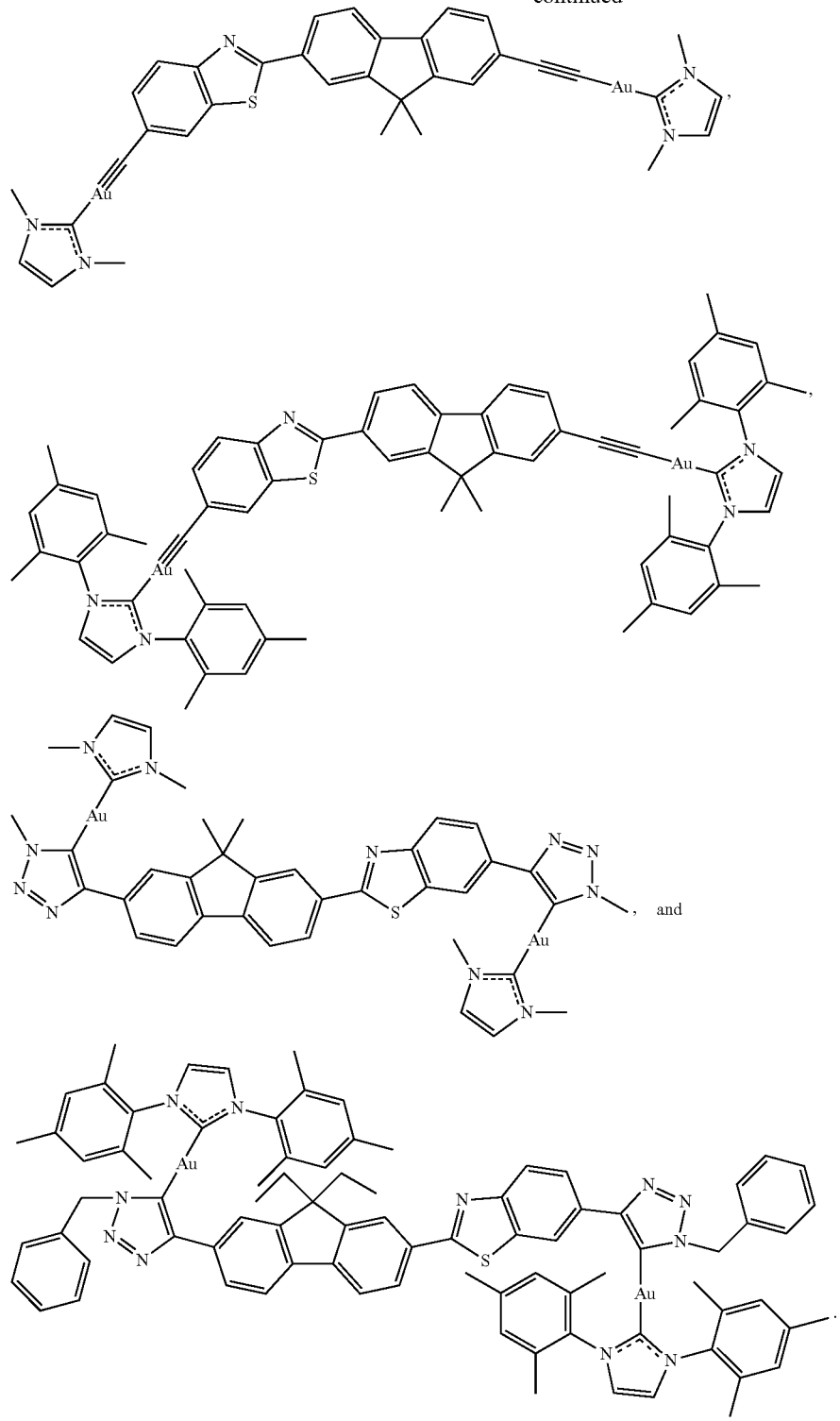

17. The emitter of claim 10, selected from the group consisting of: